US012801872B2

(12) United States Patent
Cui et al.

(10) Patent No.: US 12,801,872 B2
(45) Date of Patent: Nov. 17, 2026

(54) COMMUNICATION STATE INDICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shengjiang Cui, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 161 days.

(21) Appl. No.: 18/784,415

(22) Filed: Jul. 25, 2024

(65) Prior Publication Data

US 2024/0378402 A1 Nov. 14, 2024

Related U.S. Application Data

(63) Continuation of application No. PCT/CN2022/074741, filed on Jan. 28, 2022.

(51) Int. Cl.

| | |
|---|---|
| ***G06K 7/10*** | (2006.01) |
| ***H02J 50/00*** | (2016.01) |
| ***H04B 5/24*** | (2024.01) |
| ***H04B 5/45*** | (2024.01) |

(52) U.S. Cl.

CPC ..... *G06K 7/10158* (2013.01); *G06K 7/10217* (2013.01); *H02J 50/001* (2020.01); *H04B 5/24* (2024.01); *H04B 5/45* (2024.01)

(58) Field of Classification Search

None

See application file for complete search history.

(56) References Cited

U.S. PATENT DOCUMENTS

2012/0115471 A1* 5/2012 Awoniyi ............... H04W 76/28 455/435.1

FOREIGN PATENT DOCUMENTS

| | | | | |
|---|---|---|---|---|
| CN | 112637857 A | 4/2021 | | |
| CN | 113382423 A | 9/2021 | | |
| WO | 2018034439 A1 | 2/2018 | | |
| WO | WO-2021057473 A1 * | 4/2021 | .......... | H04W 72/542 |
| WO | 2021163971 A1 | 8/2021 | | |

OTHER PUBLICATIONS

International Search Report and Written Opinion of the International Searching Authority regarding International Patent Application No. PCT/CN2022/074741 mailed on Jun. 29, 2022, 14 pages.

"EPC™ Radio-Frequency Identity Protocols Generation-2 UHF RFID Standard", Specification for RFID Air Interface Protocol for Communications at 860 MHz-960 MHz, Release 2.1, Ratified, Jul. 2018, 157 pages.

Extended European search report issued by the EPO for Application No. EP22922814.3 dated Nov. 13, 2025, 12 pages.

* cited by examiner

*Primary Examiner* — Thomas S Mccormack

(74) *Attorney, Agent, or Firm* — Sheppard, Mullin, Richter & Hampton LLP

(57) ABSTRACT

A communication state indication method includes: indicating, by a terminal device by whether to send target indication information and/or a content indicated by the target indication information, the communication state of the terminal device to a network device, where the terminal device communicates with the network device through backscattering.

20 Claims, 13 Drawing Sheets

| Symbol | A number of Tari |
| --- | --- |
| 0 | 1 |
| 1 | 2 |
| SOF | 4 |
| EOF | 4 |

COMMUNICATION STATE INDICATION METHOD, TERMINAL DEVICE, AND NETWORK DEVICE

CROSS-REFERENCE TO RELATED APPLICATION

This application is a Continuation Application of International Application No. PCT/CN2022/074741 filed on Jan. 28, 2022, which is incorporated herein by reference in its entirety.

TECHNICAL FIELD

Embodiments of the present application relate to the field of communication, and in particular to, a communication state indication method, a terminal device, and a network device.

BACKGROUND

In zero-power communication, a zero-power terminal can be driven to work with the requirement of harvesting a radio wave sent by a network device to obtain energy. Since energy harvesting needs to be performed for communication, an energy problem may result in the zero-power terminal being in various communication states. How to indicate the communication state of a terminal device to the network device is a problem that needs to be solved urgently.

SUMMARY

The present application provides a communication state indication method, a terminal device and a network device.

In a first aspect, a communication state indication method is provided, where the method includes: indicating, by a terminal device by whether to send target indication information and/or a content indicated by the target indication information, the communication state of the terminal device to a network device, where the terminal device communicates with the network device through backscattering.

In a second aspect, a communication state indication method is provided, where the method includes: determining, by a network device, a communication state of a terminal device according to whether target indication information of the terminal device and/or a content indicated by the target indication information is received, where the terminal device communicates with the network device through backscattering.

In a third aspect, a terminal device is provided for performing the method in the above-mentioned first aspect or respective implementations thereof.

In some embodiments, the terminal device includes a functional module for performing the method in the above-mentioned first aspect or various implementations thereof.

In a fourth aspect, a network device is provided for performing the method in the above-mentioned second aspect or various implementations thereof.

In some embodiments, the network device includes a functional module for performing the method in the above-mentioned second aspect or various implementations thereof.

In a fifth aspect, a terminal device is provided and includes a memory and a processor. The memory is configured to store a computer program, and the processor is configured to call and run the computer program stored in the memory to perform the method in the above-mentioned first aspect or various implementations thereof.

In a sixth aspect, a network device is provided, and includes: a processor and a memory. The memory is configured to store a computer program, and the processor is configured to call and run the computer program stored in the memory to perform the method in the above-mentioned second aspect or various implementations thereof.

In a seventh aspect, a chip is provided to implement the method in any one of the first aspect to the second aspect or various implementations thereof.

In some embodiments, the chip includes: a processor, configured to call a computer program from a memory and run the computer program, so as to enable a device equipped with the apparatus to perform the method in any one of the above first aspect to the second aspect or various implementations thereof.

In an eighth aspect, a non-transitory computer readable storage medium is provided to store a computer program. The computer program enables a computer to perform the method in any one of the above-mentioned first aspect to the second aspect or various implementations thereof.

In a ninth aspect, a computer program product is provided, and includes computer program instructions. The computer program instructions enable a computer to perform the method in any one of the above-mentioned first aspect to the second aspect or various implementations thereof.

In a tenth aspect, a computer program is provided. The computer program, upon being executed on a computer, enables a computer to perform the method in any one of the above-mentioned first aspect to the second aspect or various implementations thereof.

DETAILED DESCRIPTION

Figure 1:
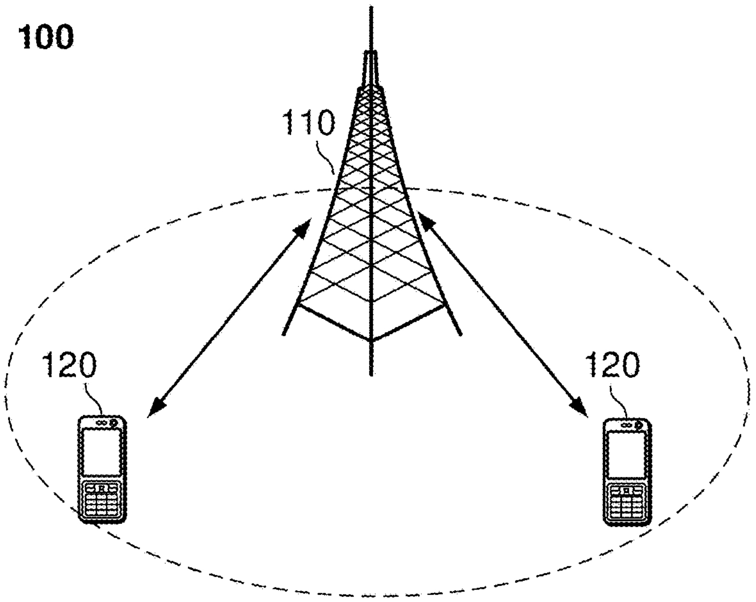
FIG. 1 is a schematic diagram of an architecture of a communication system provided in the embodiments of the present application.

Technical solutions in the embodiments of the present application will be described below with reference to the accompanying drawings in the embodiments of the present application. Obviously, the described embodiments are merely some but not all of embodiments of the present application. For the embodiments of the present application, all other embodiments obtained by the ordinary skilled in the art without paying creative effort belong to the protection scope of the present application.

Technical solutions according to embodiments of the present application may be applied to various communication systems, such as a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an advanced long term evolution (Advanced long term evolution, LTE-A) system, a new radio (New Radio, NR) system, an evolution system of the NR system, an LTE-based access to unlicensed spectrum (LTE-based access to unlicensed spectrum, LTE-U) system, an NR-based access to unlicensed spectrum (NR-based access to unlicensed spectrum, NR-U) system, a non-terrestrial networks (Non-Terrestrial Networks, NTN) system, a universal mobile telecommunications system (Universal Mobile Telecommunication System, UMTS), a wireless local area network (Wireless Local Area Networks, WLAN), a wireless fidelity (Wireless Fidelity, WiFi), a 5th-Generation (5th-Generation, 5G) communication system, a cellular Internet of Things system, a cellular passive Internet of Things system or other communication systems, etc.

Generally, traditional communication systems support a limited quantity of connections, and are easy to implement. However, with the development of communication technology, mobile communication systems will not only support traditional communication, but also support, for example, device to device (Device to Device, D2D) communication, machine to machine (Machine to Machine, M2M) communication, machine type communication (Machine Type Communication, MTC), vehicle to vehicle (Vehicle to Vehicle, V2V) communication, and vehicle to everything (Vehicle to everything, V2X) communication, and the embodiments of the present application may be applied to these communication systems as well.

Optionally, the communication systems in the embodiments of the present application may be applied to a carrier aggregation (Carrier Aggregation, CA) scenario, a dual connectivity (Dual Connectivity, DC) scenario, or a standalone (Standalone, SA) networking scenario.

Optionally, the communication system in the embodiments of the present application can be applied to an unlicensed spectrum, where the unlicensed spectrum can also be considered as a shared spectrum; or, the communication system in the embodiments of the present application can also be applied to an authorized spectrum, where the authorized spectrum can also be considered as an unshared spectrum.

The embodiments of the present application are described in combination with a network device and a terminal device. The terminal device may also be referred to as a user equipment (User Equipment, UE), an access terminal, a subscriber unit, a subscriber station, a mobile station, a mobile platform, a remote station, a remote terminal, a mobile device, a user terminal, a terminal, a wireless communication device, a user agent or a user apparatus.

In the embodiments of the present application, the network device may be a device used for communicating with a mobile device. The network device may be an access point (Access Point, AP) in WLAN, a base station (Base Transceiver Station, BTS) in GSM or CDMA, a base station (NodeB, NB) in WCDMA, an evolutional base station (Evolutional Node B, eNB or eNodeB) in LTE, or a relay station or access point, or a vehicle-mounted device, a wearable device, and a network device (gNB) in an NR network, or a network device in a cellular Internet of Things, or a network device in a cellular passive Internet of Things, or a network device in a future evolutional PLMN network, or a network device in an NTN network, etc.

As an example rather than a limitation, the network device in the embodiments of present application may have mobile characteristics. For example, the network device may be a mobile device. Optionally, the network device may be a satellite, or a balloon station. For example, the satellite may be a low earth orbit (low earth orbit, LEO) satellite, a medium earth orbit (medium earth orbit, MEO) satellite, a geostationary earth orbit (geostationary earth orbit, GEO) satellite, a high elliptical orbit (High Elliptical Orbit, HEO) satellite, or the like. Optionally, the network device may be a base station disposed in a position on land, in a water region and the like.

In the embodiments of the present application, the network device may provide a service for a cell, and the terminal device communicates with the network device through a transmission resource (e.g., a frequency-domain resource, which is also referred to as a spectrum resource) used by the cell. The cell may be a cell corresponding to the network device (e.g., a base station), and the cell may belong to a macro base station, or may belong to a base station corresponding to a small cell (Small cell). The small cells herein may include a metro cell (Metro cell), a micro cell (Micro cell), a pico cell (Pico cell), a femto cell (Femto cell), and the like. These small cells are characterized by a small coverage range and a low transmission power, and are suitable for providing high-speed data transmission services.

The terminal device may be a station (STATION, ST) in the WLAN, or may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or another processing device connected to a wireless modem, a vehicle-mounted device, a wearable device, a terminal device in a next generation communication system (e.g., an NR network), or a terminal device in a future evolved public land mobile network (Public Land Mobile Network, PLMN) network, a terminal device in a cellular Internet of Things, a terminal device in a cellular passive Internet of Things, etc.

In some scenarios, the terminal device may be a zero-power device, for example, an electronic tag. As an example but not a limitation, the electronic tag may be an electronic tag in scenarios of a smart home, logistics warehousing, or a medical instrument.

Optionally, when the terminal device is a zero-power device, the network device may be any apparatus that sends a signal, or an apparatus that may actively send a signal. For example, the network device may be a signal transmitting apparatus, for example, a base station or a mobile phone. The zero-power device may perform backscattering based on the signal sent by the network device to obtain a backscattered signal.

In the embodiments of the present application, the terminal device may be deployed on land including indoor or outdoor, handheld, wearable or vehicle-mounted; alternatively, the terminal device may be deployed on water (such as on ships); alternatively, the terminal device may be deployed aerially (such as in airplanes, balloons and satellites).

In the embodiments of the present application, the terminal device may be a mobile phone (Mobile Phone), a pad (Pad), a computer with wireless transceiving function, a virtual reality (Virtual Reality, VR) terminal device, an augmented reality (Augmented Reality, AR) terminal device, a wireless terminal device in industrial control, a wireless terminal device in self driving (self driving), a wireless terminal device in remote medical (remote medical), a wireless terminal device in smart grid (smart grid), a wireless terminal device in transportation safety (transportation safety), a wireless terminal device in smart city (smart city), a wireless terminal device in smart home (smart home), or the like.

As an example rather than a limitation, the terminal device in the embodiments of the present application may be a wearable device. The wearable device may also be referred to as a wearable smart device, which is a general term of wearable devices developed by intelligent design and development on daily wear by applying wearable technology, such as glasses, gloves, watches, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices which are fully functional, have large sizes, and may implement complete or partial functions without relying on smart phones, such as smart watches or smart glasses, and devices (such as various smart bracelets, and smart pieces of jewelry for monitoring physical signs) which focus on a certain kind of application functions only and need to be used in conjunction with other devices (such as smart phones).

For example, a communication system 100 applied in the embodiments of the present application is shown in FIG. 1. The communication system 100 may include a network device 110, and the network device 110 may be a device that communicates with a terminal device 120 (also referred to as a communication terminal or a terminal). The network device 110 may provide communication coverage for a specific geographical area and may communicate with terminal devices located within the coverage area.

FIG. 1 exemplarily shows one network device and two terminal devices, and optionally, the communication system 100 may include a plurality of network devices and a coverage range of each network device may include another number of terminal devices, the embodiments of the present application are not limited thereto.

Optionally, the communication system 100 may also include other network entities such as a network controller and a mobility management entity, etc., which are not limited in the embodiments of the present application.

It should be understood that devices with communication functions in the network/system in the embodiments of the present application can be called communication devices. Taking the communication system 100 shown in FIG. 1 as an example, the communication device may include a network device 110 and the terminal devices 120 with communication functions. The network device 110 and the terminal devices 120 may be the exemplary devices described above and will not be repeated herein. The communication device may further include other devices in the communication system 100, for example, other network entities (e.g., a network controller, a mobile management entity, etc.), which is not limited in the embodiments of the present application.

It should be understood that the terms "system" and "network" are often used interchangeably herein. The term "and/or" herein is only an association relationship to describe associated objects, which indicates that there may be three kinds of relationships, for example, A and/or B may indicate three cases where: A exists alone, both A and B exist, and B exists alone. In addition, a character "/" herein generally indicates that related objects before and after "/" are in an "or" relationship. It should be understood that "indication" involved in embodiments of the present application may be a direct indication, may be an indirect indication, or may represent an association relationship. For example, A indicating B may mean that A indicates B directly, for example, B can be acquired through A; or A indicating B may mean that A indicates B indirectly, for example, A indicates C, and B can be acquired through C; or A indicating B may mean that there is an association between A and B.

In the description of the embodiments of the present application, the term "correspond" may mean that there is a directly corresponding relationship or an indirectly corresponding relationship between two parties, or mean that there is an association between two parties, or mean a relationship such as indicating and being indicated, or configuring and being configured.

In the embodiments of the present application, the term "predefined" may be achieved by pre-storing corresponding codes, tables or other approaches that can be used to indicate relevant information in the devices (for example, including the terminal device and the network device), and the implementation is not limited in the present application. For example "predefined" may refer to what is defined in the protocol.

In the embodiments of the present application, the "protocol" may refer to a standard protocol in the field of communication, which may include, for example, an LTE protocol, an NR protocol, and related protocols applied in a future communication system, which will not be limited thereto in the present application.

In order to facilitate the understanding of the technical solutions of the embodiments of the present application, the related technologies of the present application are explained.

I. Zero-Power Communication

The zero-power communication adopts energy harvesting and backscattering communication technology. A zero-power communication network consists of a network device and a zero-power terminal.

Figure 2:
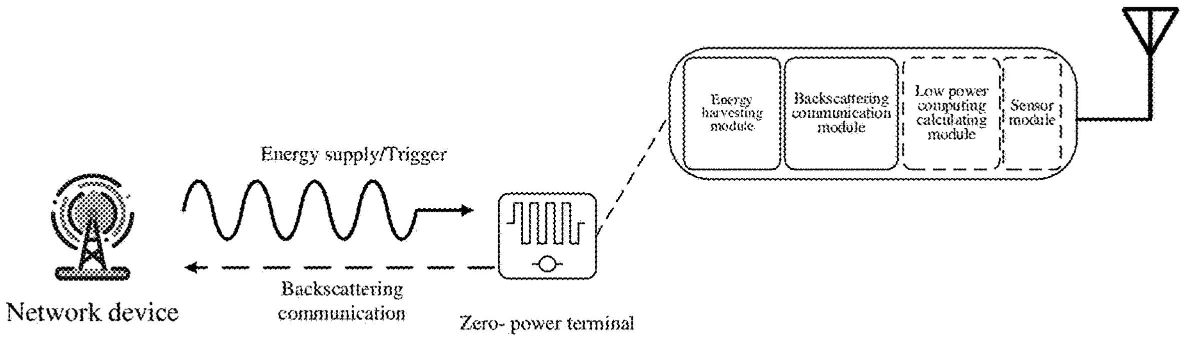
FIG. 2 is a schematic diagram of a zero-power communication system according to an example of the present application.

As shown in FIG. 2, the network device is configured to send a wireless energy supply signal, a downlink communication signal to the zero-power terminal, and receive a backscattered signal from the zero-power terminal. A basic zero-power terminal includes an energy harvesting module, a backscattering communication module, and a low-power calculation module. In addition, the zero-power terminal may also have a memory or sensor for storing some basic information (e.g., an object identification, etc.) or acquiring sensing data (e.g., ambient temperature, ambient humidity, etc.), respectively.

The following describes the key technologies in zero-power communication.

1. Radio Frequency Energy Harvesting (RF Power Harvesting)

Figure 3:
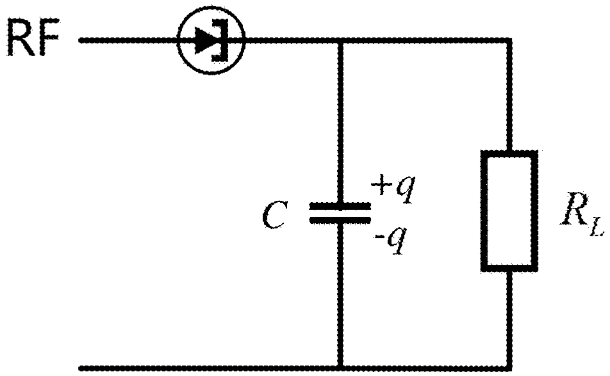
FIG. 3 is a principle diagram of energy harvesting according to an embodiment of the present application.

As shown in FIG. 3, an RF energy harvesting module harvests electromagnetic wave energy in space based on the principle of electromagnetic induction, and then obtains energy required to drive the zero-power terminal to work, for example, for driving a low-power demodulation and modulation module, a sensor, and memory reading. Therefore, the zero-power terminal does not need a traditional battery.

2. Backscattering Communication (Back Scattering)

Figure 4:
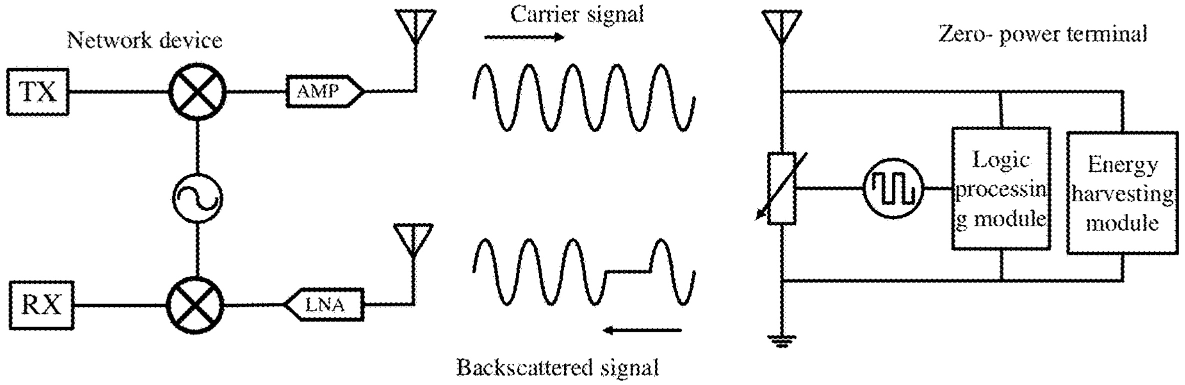
FIG. 4 is a principle diagram of backscattering communication according to an embodiment of the present application.
Figure 5:
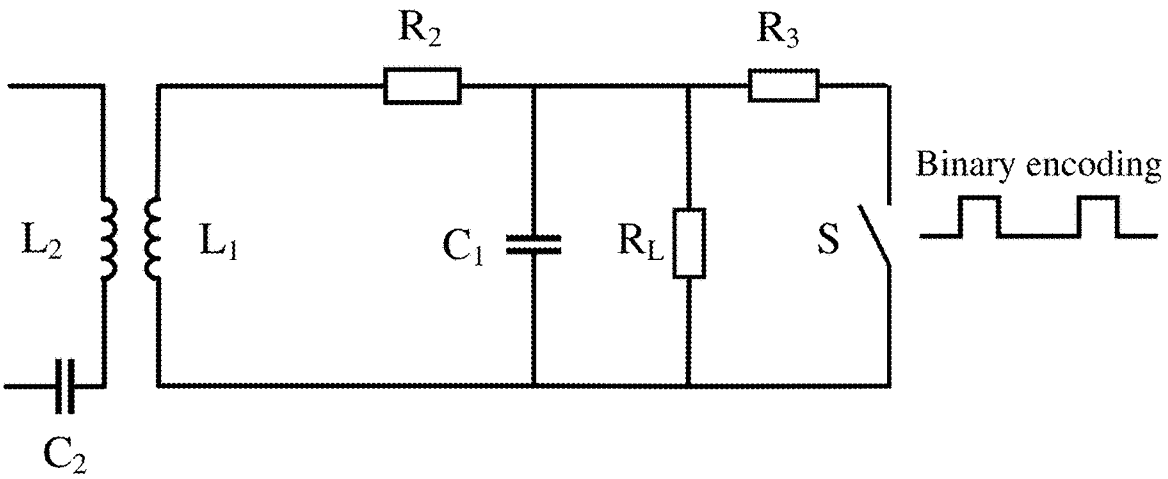
FIG. 5 is a circuit principle diagram of resistive load modulation according to an embodiment of the present application.

As shown in FIG. 4, the zero-power terminal receives a carrier signal sent from the network device, modulates the carrier signal to load information to be sent and radiates a modulated signal from an antenna. This information transmission process is referred as to backscattering communication. Backscattering and load modulation functions are inseparable from each other. Load modulation adjusts and controls a circuit parameter of an oscillation loop of the zero-power terminal according to a beat of data stream, so as to change a parameter, such as a size of an impedance of an electronic tag, etc., thereby completing a process of modulation. Load modulation technology mainly includes two manners, i.e., resistive load modulation and capacitive load modulation. In resistive load modulation, a load is connected in parallel with a resistor, and the resistor is switched on or off based on a control of a binary data stream, as shown in FIG. 5. The on and off of the resistor will cause a circuit voltage to change, and thus an amplitude shift keying (ASK) modulation is achieved, that is, modulation and transmission of a signal is achieved by adjusting an amplitude of the backscattered signal of the zero-power terminal. Similarly, in capacitive load modulation, a resonant frequency of a circuit may be changed by switching on or off a capacitor, and a frequency shift keying (FSK) modulation is achieved, that is, modulation and transmission of a signal is achieved by adjusting a working frequency of the backscattered signal of the zero-power terminal.

It can be seen that the zero-power terminal performs information modulation of an incoming signal by means of load modulation, thereby achieving a backscattering communication process. Therefore, the zero-power terminal has significant advantages.

(1) The terminal does not actively transmit a signal, and thus a complex radio frequency link is not required, for example, a PA, a radio frequency filter, etc.;

(2) The terminal does not need to actively generate a high-frequency signal, and thus a high-frequency crystal oscillator is not required;

(3) With the help of backscattering communication, terminal signal transmission does not require to consume the terminal's own energy. 2. Radio frequency energy harvesting (RF Power Harvesting).

3. Coding Technology

Data transmitted by an electronic tag may be represented by binary "1" and "0" using different forms of codes. A radio frequency identification system usually uses one of the following encoding methods: reverse non-return-to-zero inverted (NRZ) encoding, Manchester (Manchester) encoding, unipolar return to zero encoding, differential bi-phase (differential bi-phase, DBP) encoding, differential encoding, pulse interval encoding (PIE), bidirectional space encoding (bidirectional spatial encoding, FM0), Miller (Miller) encoding, differential encoding, etc. Generally speaking, different encoding technologies adopt different pulse signals to represent 0 and 1.

3.1 Non-Return-to-Zero Inverted (Non-Return-to-Zero Inverted, NRZ) Encoding

Figure 6:
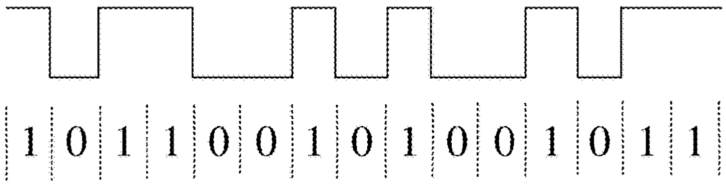
FIG. 6 is an example of an NRZ encoding rule.

The non-return-to-zero inverted encoding uses a high level to represent binary 1 and a low level to represent binary 0. FIG. 6 is an example of an NRZ encoding rule. The waveform shown in FIG. 6 has no gap between symbols and transfers a code within the entire symbol time, so the waveform is referred to as a non-return-to-zero inverted encoding.

3.2 Unipolar Return-to-Zero Encoding

Figure 7:
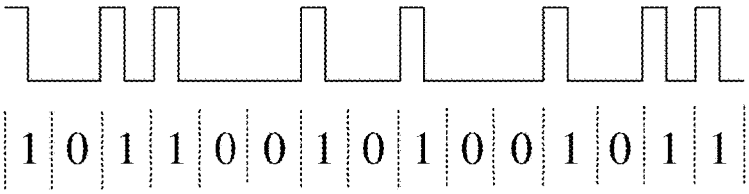
FIG. 7 is an example of a Unipolar RZ encoding rule.

For the unipolar return-to-zero (Unipolar Return to Zero) encoding, when a code of 1 is sent, a positive current is emitted, but the duration of the positive current is shorter than a time width of a symbol, that is, a narrow pulse is emitted; and when a code of 0 is sent, no current is sent at all. FIG. 7 is an example of a Unipolar RZ encoding rule.

By comparing the NRZ encoding and the Unipolar RZ encoding, it can be seen that both are unipolar codes, but the NRZ has a duty cycle of 100%, and the Unipolar RZ has a duty cycle of 50%.

3.3 Manchester Encoding

Figure 8:
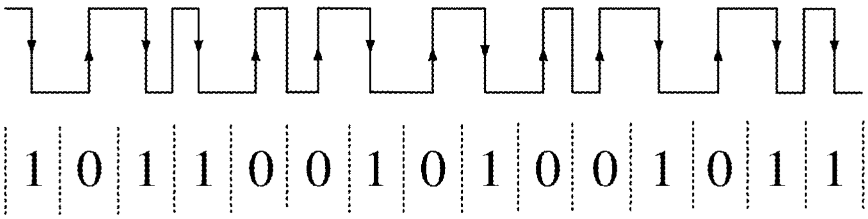
FIG. 8 is an example of a Manchester encoding rule.

The Manchester encoding is also referred to as a split-phase encoding or a bi-phase code. In the Manchester encoding, a phase difference of voltage jumping is used to distinguish 1 and 0. Herein, the jumping from high to low represents 1, and the jumping from low to high represents 0. FIG. 8 is an example of a Manchester encoding rule.

3.4 Miller (Miller) Encoding

Figure 9:
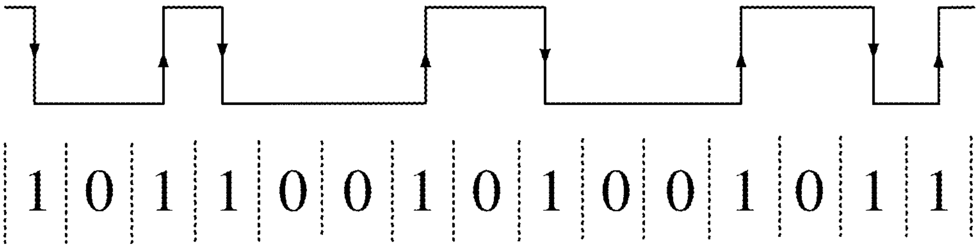
FIG. 9 is an example of a Miller encoding rule.

The Miller is a modified Manchester encoding. In Miller encoding, any edge within half a bit period represents a binary 1, and an unchanged level in a next bit period represents a binary 0. In other words, the Miller encoding represents data 1 with a level transition at a center of a bit, and no level transition at the center of the bit represents data 0. In addition, when continuous binary 0s occur, the level transition occurs at an end of the bit. FIG. 9 is an example of a Miller encoding rule. As shown in FIG. 9, the Miller encoding generates a level alternating at a beginning of a bit period, and a bit beat is relatively easy to be reconstructed for a receiver.

3.5 Differential Bi-Phase (Differential Bi-Phase, DBP) Encoding

Figure 10:
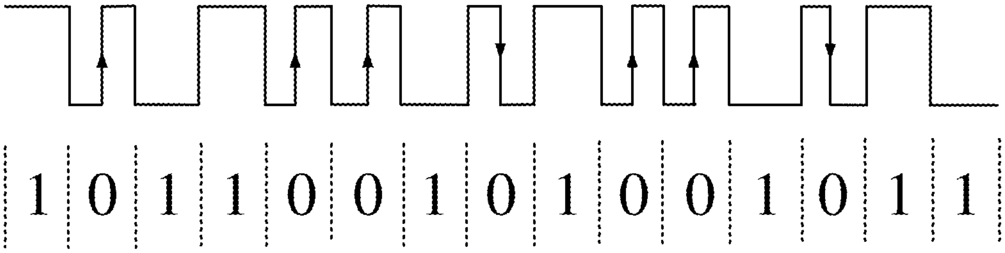
FIG. 10 is an example of a DBP encoding rule.

The differential bi-phase (DBP) encoding uses any edge in half a bit period to represent a binary 0, and no edge represents a binary 1. In addition, at a beginning of each bit period, the voltage level is reversed. FIG. 10 is an example of a DBP encoding rule.

3.6 Differential Encoding

Figure 11:
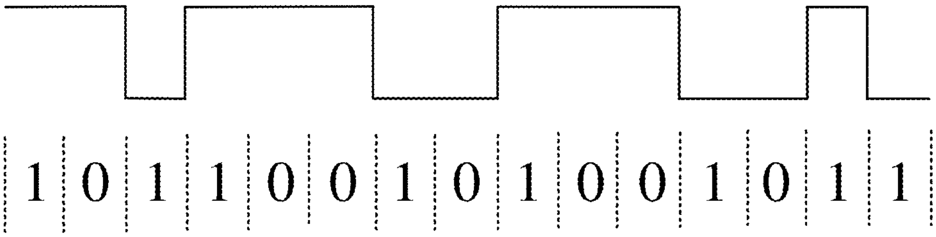
FIG. 11 is an example of a differential encoding rule.

In differential encoding, each binary 1 to be transmitted will cause a change in a signal level, while for a binary 0 the signal level remains constant. FIG. 11 is an example of a differential encoding rule.

3.7 Pulse Interval Encoding (Pulse Interval Encoding, PIE)

The pulse interval encoding is an encoding method used by a reader-writer to transfer data to an electronic tag. The PIE encoding is an encoding manner in which "0" has a time interval different from that of "1", and is based on a continuous fixed-interval pulse; and a repetition period of the pulse is different according to "0" and "1". Normally, a continuous interval of each binary code is an integer multiple of a clock period.

Figure 12:
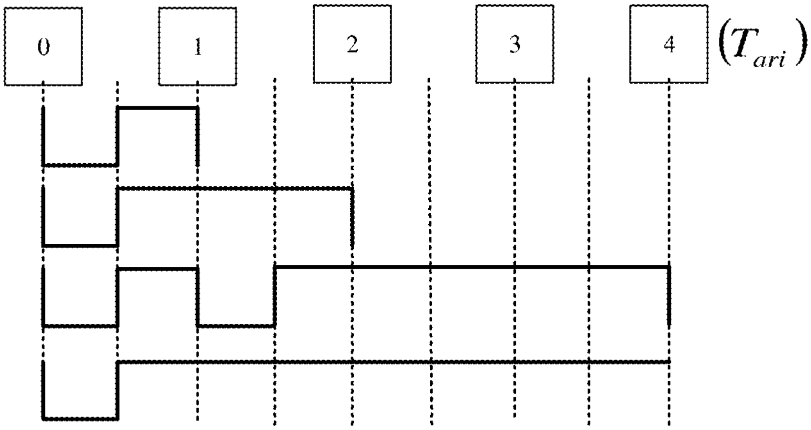
FIG. 12 is an example of a pulse interval encoding rule.

There are four PIE encoding symbols, namely data 0, data 1, starting of a data frame (SOF) and ending of a data frame (EOF) having encoding symbols of 1, 2, 4 and 4 times of a time interval Tari, respectively. The definitions of data 0, data 1, SOF, and EOF are shown in FIG. 12. It can be seen that the PIE encoding may easily define situations other than data 0 and data 1. In order to determine a type of a transmitted symbol, the electronic tag needs to measure the interval of the high/low pulse transition shown in the figure.

3.8 Bidirectional Space Encoding (FM0)

Figure 13:
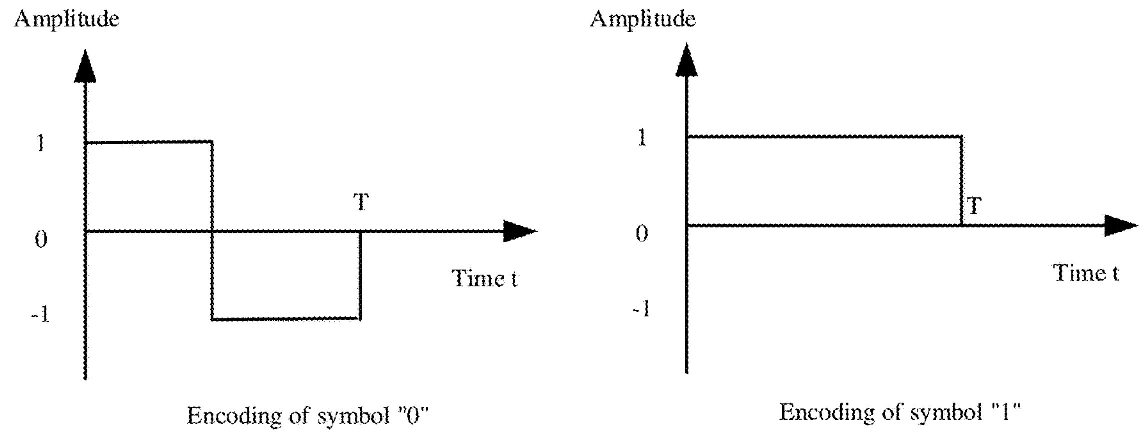
FIG. 13 is an example of an FM0 encoding rule.

Bidirectional space encoding (FM0) is an encoding manner used by an electronic tag to transfer data to a reader-writer. The FM0 encoding rule is that a level of a symbol "0" is changed both in a middle and at an edge of time; and a level of a symbol "1" is changed only at an edge of time. FIG. 13 is an example of an FM0 encoding rule.

FM0 encoding may have the following characteristics.

1. The symbol "0" has 3 transitions, including one transition at a starting bit of a bit time and one transition in a middle of the bit time;
2. The symbol "1" has 1 transition, which is at a starting bit of a bit time.

Figure 14:
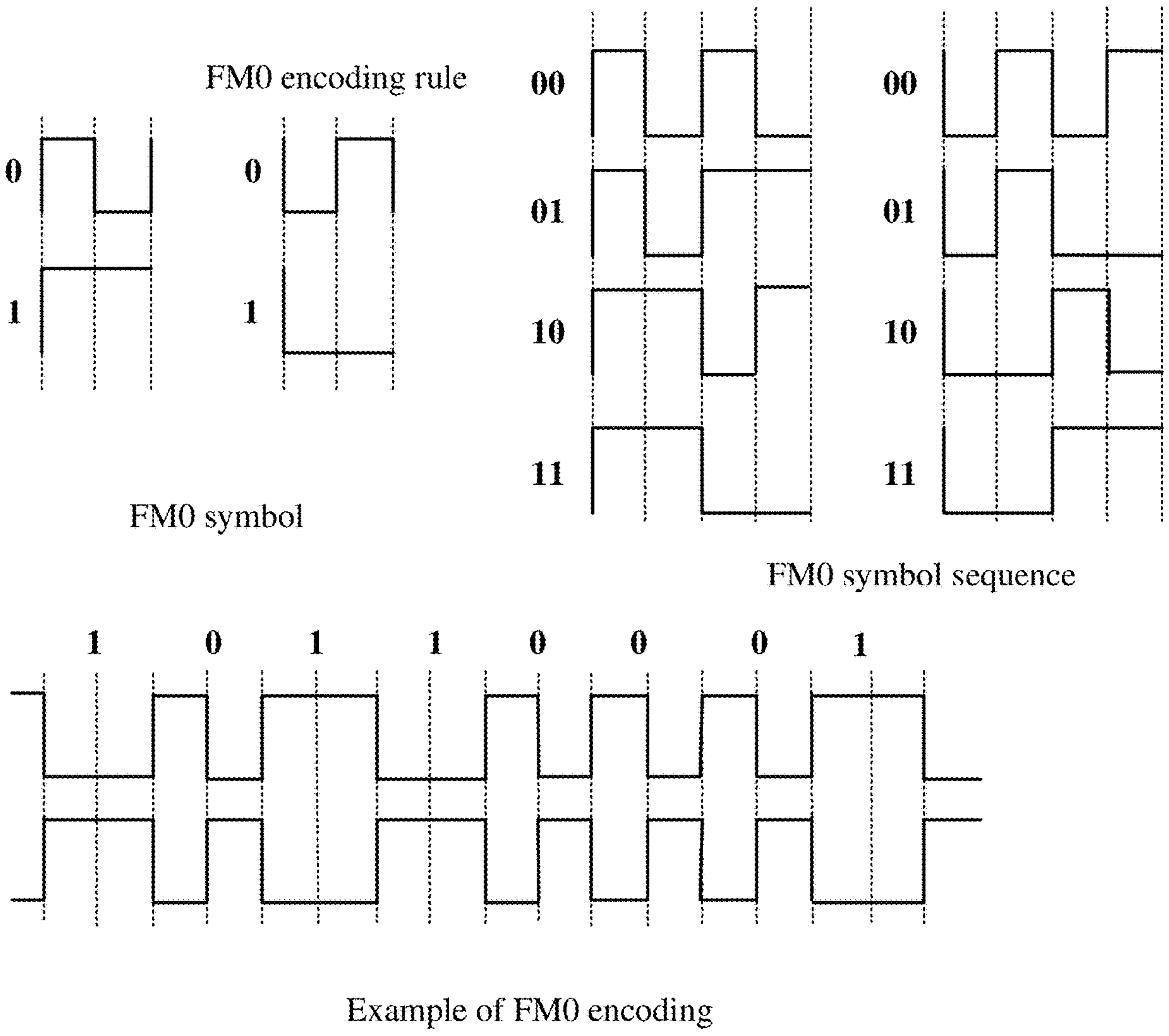
FIG. 14 is an example of an FM0 symbol, an FM0 symbol sequence, and an FM0 encoding.

FIG. 14 is an example of an FM0 symbol, an FM0 symbol sequence, and an FM0 encoding.

In some scenarios, based on an energy source and usage method of a zero-power terminal, zero-power terminals may be divided into the following types.

1. Passive Zero-Power Terminal

The zero-power terminal (e.g., a tag in an RFID system) does not need a built-in battery. When the zero-power terminal approaches a network device (e.g., a reader-writer in an RFID system), the zero-power terminal is within a near field range formed by a radiation of an antenna of the network device. Therefore, the antenna of the zero-power terminal generates an induced current through electromagnetic induction, and the induced current drives a low-power consumption chip circuit of the zero-power terminal. Works, such as demodulation of a forward link signal and modulation of a reverse link signal, etc., are achieved. For a backscattering link, the zero-power terminal uses the backscattering implementation to transmit a signal.

It can be seen that the passive zero-power terminal does not need a built-in battery to drive either the forward link or the reverse link, and is a true zero-power terminal.

The passive zero-power terminal does not need a battery, and a radio frequency circuit and a baseband circuit is very simple. For example, a device, such as a low-noise amplifier (low-noise amplifier, LNA), a power amplifier (power amplifier, PA), a crystal oscillator, an analog-to-digital converter (Analog-to-Digital Converter, ADC), etc., is not required. Therefore, the passive zero-power terminal has many advantages, such as a small size, light weight, a very low price, and a long service life, etc.

2. Semi-Passive Zero-Power Terminal

The semi-passive zero-power terminal itself does not have a conventional battery installed, but may use an RF energy harvesting module to harvest radio wave energy and store harvested energy in an energy storage unit (e.g., a capacitor)

at the same time. The energy storage unit obtains energy, and then, may drive a low-power consumption chip circuit of the zero-power terminal. Works, such as demodulation of a forward link signal and modulation of a reverse link signal, etc., are achieved. For a backscattering link, the zero-power terminal uses the backscattering implementation to transmit a signal.

It can be seen that the semi-passive zero-power terminal does not need a built-in battery to drive either the forward link or the reverse link. Although energy stored in the capacitor is used in the operation of the semi-passive zero-power terminal, the energy comes from the radio energy harvested by the energy harvesting module. Therefore, the semi-passive zero-power terminal is also a true zero-power terminal.

The semi-passive zero-power terminals inherit many advantages of the passive zero-power terminal, thereby having many advantages such as a small size, light weight, a very low price and a long service life, etc.

3. Active Zero-Power Terminal

The zero-power terminal used in some scenarios may also be an active zero-power terminal, and such terminals may have a built-in battery. The battery is configured to drive a low-power consumption chip circuit of the zero-power terminal. Works, such as demodulation of a forward link signal and modulation of a reverse link signal, etc., are achieved. However, for a backscattering link, the zero-power terminal uses the backscattering implementation to transmit a signal. Therefore, the zero-power of this type of terminals is mainly reflected in the fact that the signal transmission of the reverse link signal does not need the terminal's own power, but uses the backscattering manner.

II: Cellular Passive Internet of Things

With the increasing of applications in 5G industry, there are more and more types and application scenarios of connected objects, and there will be a higher requirement on cost and power consumption of a communication terminal. An application of a battery-free, low-cost passive Internet of Things device becomes a key technology for a cellular Internet of Things, thereby enriching types and a number of 5G network-linked terminals and further, truly achieving the Internet of Everything. A passive Internet of Things device may be based on a zero-power communication technology, such as an RFID technology, and extend on this basis to be suitable for cellular Internet of Things.

In order to facilitate the understanding of the embodiments of the present application, an energy supply signal, a scheduling signal and a carrier signal related to zero-power communication are explained.

1. Energy Supply Signal

The energy supply signal is an energy source for the zero-power terminal to harvest energy.

In terms of a bearer of the energy supply signal, the bearer may be a base station, a smart phone, a smart gateway, a charging station, a micro base station, etc.

In terms of a frequency band, the frequency band of a radio wave used for energy supply may be a low frequency, a medium frequency, a high frequency, etc.

In terms of a waveform, a radio wave used for energy supply may be a sine wave, a square wave, a triangle wave, a pulse, a rectangular wave, etc.

In addition, the energy supply signal may be a continuous wave or a discontinuous wave (i.e., a certain time interruption is allowed).

Optionally, the energy supply signal may be an existing signal in the 3GPP standard, for example, a sounding reference signal (Sounding Reference Signal, SRS), a physical uplink shared channel (Physical Uplink Shared Channel, PUSCH), a physical random access channel (Physical Random Access Channel, PRACH), a physical uplink control channel (Physical Uplink Control Channel, PUCCH), a physical downlink control channel (Physical Downlink Control Channel, PDCCH), a physical downlink shared channel (Physical Downlink Shared Channel, PDSCH), a physical broadcast channel (Physical Broadcast Channel, PBCH), etc., or may be a WIFI signal or a Bluetooth signal.

Optionally, the energy supply signal may also be implemented by newly adding a signal, for example, newly adding a signal dedicated to energy supply.

2. Trigger Signal or Scheduling Signal

A trigger signal is used to trigger or schedule a zero-power terminal to transmit data.

In terms of a bearer of the trigger signal, the bearer may be a base station, a smart phone, a smart gateway, etc.

In terms of a frequency band, a radio wave used for triggering or scheduling may be a low frequency, a medium frequency, a high frequency, etc.

In terms of a waveform, a radio wave used for triggering or scheduling may be a sine wave, a square wave, a triangle wave, a pulse, a rectangular wave, etc.

In addition, the trigger signal may be a continuous wave or a discontinuous wave (i.e., a certain time interruption is allowed).

Optionally, the trigger signal may be an existing signal in the 3GPP standard, for example, an SRS, a PUSCH, a PRACH, a PUCCH, a PDCCH, a PDSCH, a PBCH, or a WIFI signal or a Bluetooth signal, etc.

Optionally, the trigger signal may also be implemented by newly adding a signal, for example, newly adding a signal dedicated to triggering or scheduling.

3. Carrier Signal

A carrier signal is used by a zero-power terminal to generate a backscattered signal. For example, the zero-power terminal may modulate a received carrier signal according to the information to be sent to form a backscattered signal.

In terms of a bearer of the carrier signal, the bearer may be a base station, a smart phone, a smart gateway, etc.

In terms of a frequency band, a radio wave used as a carrier signal may be a low frequency, a medium frequency, a high frequency, etc.

In terms of a waveform, a radio wave used as a carrier signal may be a sine wave, a square wave, a triangle wave, a pulse, a rectangular wave, etc.

In addition, the carrier signal may be a continuous wave or a discontinuous wave (i.e., a certain time interruption is allowed).

Optionally, the carrier signal may be an existing signal in the 3GPP standard, for example, an SRS, a PUSCH, a PRACH, a PUCCH, a PDCCH, a PDSCH, a PBCH, or a WIFI signal or a Bluetooth signal, etc.

Optionally, the carrier signal may also be implemented by newly adding a signal, for example, newly adding a carrier signal dedicated to generating a backscattered signal.

It should be noted that in the embodiments of the present application, the energy supply signal, the scheduling signal and the carrier signal may be the same signal, or may be different signals. For example, the energy supply signal may be used as a carrier signal, and the scheduling signal may also be used as a carrier signal, etc.

In an actual network deployment, a technical bottleneck faced by the passive zero-power communication technology is a limited coverage distance of the forward link, for which a main reason is that a communication distance of the forward link is limited by a signal strength of a wireless signal reaching the zero-power terminal and based on existing implementation techniques, generally the zero-power terminal need to consume 10 uw (micro watts) of power to drive the low-power circuit. This means that a signal power reaching the zero-power terminal needs to be at least −20 dBm. Due to a limitation of requirements of radio regulation, a transmission power of the network device generally cannot be too high. For example, in an ISM frequency band where an RFID works, a maximum transmission power is 30 dBm. Therefore, considering the radio propagation loss in space, a transmission distance of the passive zero-power terminal is generally in a range of 10 m to several tens of meters.

The semi-passive zero-power terminal has a potential to significantly extend a communication distance. This is because the semi-passive zero-power terminal may use an energy harvesting module to harvest a radio wave, thus continuously acquiring radio energy and storing the radio energy in an energy storage unit. The energy storage unit obtains enough energy, and then, may drive the low-power circuit to work for operations, such as demodulation of a forward link signal and modulation of a reverse link signal. Therefore, at this time, the semi-passive zero-power terminal is equivalent to an active terminal, whose downlink coverage depends on a sensitivity of a receiver for a downlink signal (usually far below an RF energy harvesting threshold). Based on the current technology, the energy harvesting module may harvest energy and input electrical energy into the energy storage unit when a signal strength of a received radio signal is not less than −30 dBm. Therefore, the coverage of the forward link of the semi-passive zero-power terminal depends on the energy harvesting threshold (e.g., −30 dBm), and a strength of a received radio signal is relaxed from −20 dBm to −30 dBm compared with the passive zero-power terminal, so a link budget gain of 10 dB may be obtained and a downlink coverage may be promoted by more than 3 times.

However, while promoting the coverage of the forward link, the semi-passive zero-power terminal also faces the problem of reduced charging efficiency. As the strength of the received signal decreases, the energy that can be harvested and stored by the energy harvesting module is greatly reduced. For example, when the strength of the received signal is −30 dBm, namely 1 microwatt, the energy that can be harvested and stored is far less than 1 microwatt (the energy harvesting efficiency is greatly reduced). On the other hand, as mentioned above, the low-power circuit of the zero-power terminal may need to consume an average power of 10 uW.

In summary, when the zero-power terminal is far away from the network device, a rate for obtaining and storing energy through energy harvesting is very slow. Therefore, when this type of zero-power terminal performs communication, energy needs to be used efficiently. When the terminal device stores energy for a period of time and is ready for performing communication, they should avoid long-term ineffective monitoring of a downlink scheduling signal should be avoided to reduce energy consumption. Different from a traditional active terminal, the power of the zero-power terminal is relatively unstable. During the communication process, communication may be interrupted due to energy shortage or other abnormalities. Therefore, how the terminal device indicates the communication state of the terminal device to the network device, assists the communication between the network device and the zero-power terminal, and further promotes the communication performance is an urgent problem to be solved.

In the embodiments, a communication state indication method is provided, which including:

- indicating, by a terminal device by whether to send target indication information and/or a content indicated by the target indication information, the communication state of the terminal device to a network device, where the terminal device communicates with the network device through backscattering.

In some embodiments, the target indication information includes a first type of indication information, where the first type of indication information is used to indicate a data transmission state of the terminal device.

In some embodiments, the data transmission state of the terminal device includes at least one of:

- a start of data transmission, an end of data transmission, or data transmission abnormality.

In some embodiments, the first type of indication information includes at least one of:

- first indication information, used to indicate the terminal device to start data transmission;
- second indication information, used to indicate the terminal device to end data transmission;
- third indication information, used to indicate that data transmission abnormality is caused due to power fluctuation; or
- fourth indication information, used to indicate the data transmission abnormality is caused due to insufficient power.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments, the method further includes:

- sending, by the terminal device, a target information set on a first time domain resource;
- where the target information set includes first data information and the first type of indication information, and the first data information includes all of to-be-transmitted data; or,
- the target information set includes second data information and the first type of indication information, and the second data information includes a part of the to-be-transmitted data.

In some embodiments, in a case where the target information set includes the first data information, the target information set further includes padding data information.

In some embodiments, the padding data information includes at least one of:

- at least one zero, check data, or a part of the to-be-transmitted data.

In some embodiments, the target information set includes the first indication information and the first data information, where the first indication information precedes the first data information; or the target information set includes the first indication information, the first data information and padding data information, where the first indication information precedes the first data information and the padding data information follows the first data information; or the target information set includes the first data information and the second indication information, where the first data information precedes the second indication information; or the target information set includes the first indication information, the first data information, and the second indication information, where the first indication information precedes the first data information, and the second indication information follows the first data information.

In some embodiments, a starting position and a length of the first time domain resource are indicated by the network device; or the first time domain resource is preconfigured; or the starting position of the first time domain resource is indicated by the network device through a scheduling signal; or the first time domain resource is selected by the terminal device.

In some embodiments, there is a first time interval between the first indication information and the first data information.

In some embodiments, the first time interval is 0.

In some embodiments, the first time interval is predefined or configured by the network device.

In some embodiments, a unit of the first time interval is a minimum time unit for the terminal device to perform data communication.

In some embodiments, there is a second time interval between the first data information and the second indication information.

In some embodiments, the second time interval is 0.

In some embodiments, the second time interval is predefined or configured by the network device.

In some embodiments, a unit of the second time interval is a minimum time unit for the terminal device to perform data communication.

In some embodiments, a length of the second indication information is fixed; or a length of the second indication information is variable.

In some embodiments, a length of the first indication information is fixed; or a length of the first indication information is variable.

In some embodiments, in a case where the terminal device needs to indicate an ending position of data transmission through the second indication information, but the target information set does not comprise the second indication information, the data transmission abnormality is represented, or there is still data to be transmitted.

In some embodiments, in a case where the terminal device needs to indicate a starting position of data transmission through the first indication information, and the target information set includes a plurality pieces of first indication information, the data transmission abnormality is represented.

In some embodiments, the target information set includes a first information set and a second information set, where the first information set is sent by the terminal device before a power fluctuates, and the second information set is sent by the terminal device after a power stabilizes, where the first information set includes the second data information, and the second information set includes the first data information.

In some embodiments, the first information set further includes the first indication information.

In some embodiments, the second information set further includes the first indication information and the second indication information, where the first indication information precedes the first data information, and the second indication information follows the first data information.

In some embodiments, a starting position and a length of the first time domain resource are indicated by the network device; or the first time domain resource is preconfigured; or a starting position of the first time domain resource is indicated by the network device through a scheduling signal; or the first time domain resource is selected by the terminal device.

In some embodiments, the target information set includes the second data information and the third indication information, the second data information is sent by the terminal device in a case where a power fluctuates, and the third indication information is sent by the terminal device in a case where a power stabilizes.

In some embodiments, the target information set further includes the first indication information, where the first indication information precedes the second data information.

In some embodiments, a starting position and a length of the first time domain resource are indicated by the network device through a scheduling signal; or the first time domain resource is preconfigured; or a starting position of the first time domain resource is indicated by the network device through a scheduling signal.

In some embodiments, in a case of insufficient power, the target information set includes the second data information and the fourth indication information; or in a case of insufficient power, the target information set includes the fourth indication information.

In some embodiments, there is a third time interval between the fourth indication information and the second data information.

In some embodiments, the third time interval is 0.

In some embodiments, the third time interval is predefined or configured by the network device.

In some embodiments, a unit of the third time interval is a minimum time unit for the terminal device to perform data communication.

In some embodiments, the method further includes:

in a case where there is data transmission abnormality on the terminal device, indicating a data transmission abnormality state of the terminal device by using the third indication information or the fourth indication information according to an energy harvesting capability of the terminal device.

In some embodiments, the indicating the data transmission abnormality state by using the third indication information or the fourth indication information according to the energy harvesting capability of the terminal device includes:

in a case where the terminal device has a first energy harvesting capability, indicating the data transmission abnormality by using the third indication information, or in a case where the terminal device has a second energy harvesting capability, indicating the data transmission abnormality by using the fourth indication information, where the first energy harvesting capability is higher than the second energy harvesting capability.

In some embodiments, the target indication information includes a second type of indication information, where the second type of indication information is used to indicate a data transmission requirement state of the terminal device.

In some embodiments, the second type of indication information includes fifth indication information, where the fifth indication information is used to indicate that the terminal device has a data transmission requirement.

In some embodiments, the fifth indication information is sent by the terminal device in a case where an energy harvesting is completed.

In some embodiments, the terminal device monitors scheduling information of the network device in a first duration after an energy harvesting is completed, and in a case where the scheduling information of the network device is not monitored and data transmission is required, the terminal device sends the fifth indication information to the network device.

In some embodiments, the method further includes:

after sending the fifth indication information, sending, by the terminal device, third data information to the network device, where the third data information includes an identifier of the terminal device.

In some embodiments, there is a fourth time interval between the fifth indication information and the third data information.

In some embodiments, the fourth time interval is 0.

In some embodiments, the fourth time interval is predefined or configured by the network device.

In some embodiments, a unit of the fourth time interval is a minimum time unit for the terminal device to perform data communication.

In some embodiments, the fifth indication information is further used to indicate identification information of the terminal device.

In some embodiments, the fifth indication information includes a fifth sequence, where the fifth sequence is generated according to a cell identifier to which the terminal device belongs and/or an identifier of the terminal device.

In some embodiments, the method further includes:

receiving, by the terminal device, a first scheduling signal sent from the network device to the terminal device, where the first scheduling signal includes transmission resource information for data transmission.

In some embodiments, the method further includes:

receiving, by the terminal device, a second scheduling signal broadcast by the network device, where the second scheduling signal includes a transmission resource for data transmission.

In some embodiments, the second type of indication information includes sixth indication information, where the sixth indication information is used to indicate that the terminal device performs data transmission on an available time domain resource successfully and there is to-be-transmitted data.

In some embodiments, the method further includes:

sending, by the terminal device, a third information set on a second time domain resource, where the third information set includes fourth data information and the sixth indication information, where the sixth indication information follows the fourth data information, and the fourth data information includes a part of to-be-transmitted data;

sending, by the terminal device, a fourth information set on a third time domain resource, where the fourth information set includes remaining to-be-transmitted data, and the third time domain resource follows the second time domain resource.

In some embodiments, the second time domain resource and the third time domain resource are resources scheduled by the network device; or the second time domain resource and the third time domain resource are schedule-free resources.

In some embodiments, the sixth indication information includes a sixth sequence.

In some embodiments, the terminal device obtains energy for communication through energy harvesting.

In the embodiments, a communication state indication method is provided, which including:

determining, by a network device, a communication state of a terminal device according to whether target indication information of the terminal device and/or a content indicated by the target indication information is received, where the terminal device communicates with the network device through backscattering.

In some embodiments, the target indication information includes a first type of indication information, where the first type of indication information is used to indicate a data transmission state of the terminal device.

In some embodiments, the data transmission state of the terminal device includes at least one of:

a start of data transmission, an end of data transmission, or data transmission abnormality.

In some embodiments, the first type of indication information includes at least one of:

first indication information, used to indicate the terminal device to start data transmission;

second indication information, used to indicate the terminal device to end data transmission;

third indication information, used to indicate that data transmission abnormality is caused due to power fluctuation; or fourth indication information, used to indicate the data transmission abnormality is caused due to insufficient power.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments, the determining, by the network device, the communication state of the terminal device according to whether the target indication information of the terminal device and/or the content indicated by the target indication information is received includes:

receiving, by the network device, a target information set on a first time domain resource, where the target information set is used to transmit target data information; and determining, by the network device, a data transmission state of the terminal device according to whether the target information set includes the first type of indication information or a content indicated by the first type of indication information.

In some embodiments, the determining, by the network device, the data transmission state of the terminal device according to whether the target information set includes the first type of indication information or the content indicated by the first type of indication information, includes:

in a case where the target information set includes the first indication information, taking a position of a first time interval after the first indication information in the target information set as a starting position of data transmission; or in a case where the target information set does not includes the first indication information, taking a starting position of the first time domain resource as the starting position of data transmission.

In some embodiments, the determining, by the network device, the data transmission state of the terminal device according to whether the target information set includes the first type of indication information or the content indicated by the first type of indication information includes:

in a case where the terminal device needs to indicate a starting position of data transmission through the first indication information, and the target information set includes only one piece of the first indication information, taking a position of a first time interval after the first indication information in the target information set as the starting position of data transmission; or in a case where the terminal device needs to indicate the starting position of data transmission through the first indication information, and the target information set includes a plurality pieces of first indication information, taking a position of a first time interval after a last first indication information in the target information set as the starting position of data transmission.

In some embodiments, the determining, by the network device, the data transmission state of the terminal device according to whether the target information set includes the first type of indication information or the content indicated by the first type of indication information includes:

determining that data transmission is abnormal, in a case where the terminal device needs to indicate a starting position of data transmission through the first indication information and the target information set includes a plurality pieces of first indication information.

In some embodiments, the terminal device needing to indicate the starting position of data transmission through the first indication information, includes:

the terminal device needing to indicate the starting position of data transmission through the first indication information under at least one condition of:

a starting position and a length of the first time domain resource being scheduled by the network device;

the first time domain resource being preconfigured;

a starting position of the first time domain resource being indicated by the network device through a scheduling signal; or the first time domain resource being a time domain resource selected by the terminal device.

In some embodiments, the determining, by the network device, the data transmission state of the terminal device according to whether the target information set includes the first type of indication information or the content indicated by the first type of indication information includes:

in a case where the target information set includes the second indication information, taking a position of a second time interval before the second indication information in the target information set as an ending position of data transmission; or in a case where the target information set does not comprise the second indication information, taking an ending position of the first time domain resource as an ending position of data transmission.

In some embodiments, the determining, by the network device, the data transmission state of the terminal device according to whether the target information set includes the first type of indication information or the content indicated by the first type of indication information, includes:

in a case where the terminal device needs to indicate an ending position of data transmission through the second indication information, and the target information set includes the second indication information, taking a position of a second time interval before the second indication information in the target information set as an ending position of data transmission.

In some embodiments, the determining, by the network device, the data transmission state of the terminal device according to whether the target information set includes the first type of indication information or the content indicated by the first type of indication information includes:

in a case where the terminal device needs to indicate an ending position of data transmission through the second indication information, but the target information set does not comprise the second indication information, determining that data transmission is abnormal, or there is still data to be transmitted.

In some embodiments, the terminal device needing to indicate the ending position of data transmission through the second indication information, includes:

the terminal device needing to indicate the ending position of data transmission through the second indication information under at least one condition of:

a starting position and a length of the first time domain resource being scheduled by the network device;

the first time domain resource being preconfigured;

a starting position of the first time domain resource being indicated by the network device through a scheduling signal; or the first time domain resource being a time domain resource selected by the terminal device.

In some embodiments, the first time interval is 0.

In some embodiments, the second time interval is 0.

In some embodiments, the first time interval is predefined or configured by the network device.

In some embodiments, the second time interval is predefined or configured by the network device.

In some embodiments, a unit of the first time interval is a minimum time unit for the terminal device to perform data communication.

In some embodiments, a unit of the second time interval is a minimum time unit for the terminal device to perform data communication.

In some embodiments, a length of the second indication information is fixed; or a length of the second indication information is variable.

In some embodiments, a length of the first indication information is fixed; or a length of the first indication information is variable.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments, the determining, by the network device, the data transmission state of the terminal device according to whether the target information set includes the first type of indication information or the content indicated by the first type of indication information includes:

in a case where the target information set includes data information and the third indication information, determining that data transmission is abnormal due to power fluctuation; or in a case where the target information set includes data information and the fourth indication information, determining that data transmission is abnormal due to insufficient power.

In some embodiments, there is a third time interval between the fourth indication information and the data information.

In some embodiments, the third time interval is 0.

In some embodiments, the third time interval is pre-defined or configured by the network device.

In some embodiments, a unit of the third time interval is a minimum time unit for the terminal device to perform data communication.

In some embodiments, the method further includes:

in a case where the target information set includes data information and the third indication information, sending, by the network device, a third scheduling signal to the terminal device after receiving the third indication information or after a second duration, where the third scheduling signal is used to schedule the terminal device to retransmit data; or in a case where the target information set includes data information and the fourth indication information, sending, by the network device, a fourth scheduling signal to the terminal device after a third duration, where the fourth scheduling signal is used to schedule the terminal device to retransmit data, and the second duration is less than the third duration.

In some embodiments, the second duration and the third duration are predefined; or the second duration and the third duration are determined according to an energy harvesting capability of the terminal device.

In some embodiments, the target indication information includes a second type of indication information, where the second type of indication information is used to indicate a data transmission requirement state of the terminal device.

In some embodiments, the determining, by the network device, the communication state of the terminal device according to whether the target indication information of the terminal device and/or the content indicated by the target indication information is received includes:

determining, by the network device, whether the terminal device has the data transmission requirement according to whether the second type of indication information is received.

In some embodiments, the determining, by the network device, whether the terminal device has the data transmission requirement according to whether the second type of indication information is received includes:

in a case where the second type of indication information is received, determining that the terminal device has the data transmission requirement; or in a case where the second type of indication information is not received, determining that the terminal device has no data transmission requirement.

In some embodiments, the second type of indication information includes fifth indication information, where the fifth indication information is used to indicate that the terminal device has a data transmission requirement.

In some embodiments, the fifth indication information is further used to indicate identification information of the terminal device.

In some embodiments, the fifth indication information includes a fifth sequence, where the fifth sequence is generated according to a cell identifier to which the terminal device belongs and/or an identifier of the terminal device.

In some embodiments, the method further includes:

after receiving the fifth indication information, receiving, by the network device, third data information sent from the terminal device, where the third data information includes an identifier of the terminal device.

In some embodiments, there is a fourth time interval between the fifth indication information and the third data information.

In some embodiments, the fourth time interval is 0.

In some embodiments, the fourth time interval is pre-defined or configured by the network device.

In some embodiments, a unit of the fourth time interval is a minimum time unit for the terminal device to perform data communication.

In some embodiments, the method further includes:

sending, by the network device, a first scheduling signal to the terminal device, where the first scheduling signal includes transmission resource information for data transmission.

In some embodiments, the method further includes:

broadcasting, by the network device, a second scheduling signal, where the second scheduling signal includes transmission resource information for data transmission, where a transmission resource indicated by the second scheduling information is only used for data transmission by the terminal device that sends the fifth indication information.

In some embodiments, the second type of indication information includes sixth indication information, where the sixth indication information is used to indicate that the terminal device performs data transmission on an available time domain resource successfully and there is to-be-transmitted data.

In some embodiments, the method further includes:

receiving, by the network device on a second time domain resource, a third information set sent from the terminal device, where the third information set includes fourth data information and the sixth indication information, where the sixth indication information follows the fourth data information, and the fourth data information includes a part of to-be-transmitted data;

sending, by the network device, a fourth scheduling signal to the terminal device according to the sixth indication information, where the fourth scheduling signal is used to indicate a third time domain resource; and receiving, by the network device on the third time domain resource, a fourth information set sent from the terminal device, where the fourth information set includes remaining to-be-transmitted data.

In some embodiments, the sixth indication information includes a sixth sequence.

In some embodiments, the terminal device obtains energy for communication through energy harvesting.

In order to facilitate the understanding of the technical solutions of the embodiments of the present application, the technical solutions of the present application are described in detail below through exemplary embodiments. The above-related technologies may be arbitrarily combined with the technical solutions of the embodiments of the present application as optional solutions, which all fall within the protection scope of the embodiments of the present application. The embodiments of the present application include at least part of the following contents.

Figure 15:
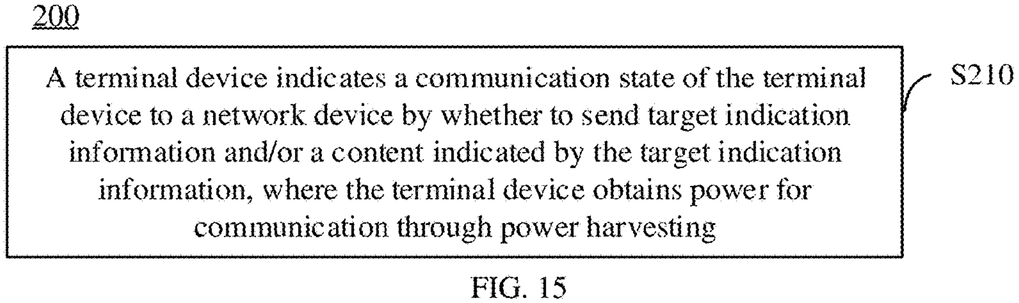
FIG. 15 is a schematic diagram of a communication state indication method provided according to the embodiments of the present application.

FIG. 15 is a schematic diagram of method 200 for indicating a communication state according to the embodiments of the present application. As shown in FIG. 15, the method 200 includes at least part of the following contents.

S210: a terminal device indicates a communication state of the terminal device to a network device by whether to send target indication information and/or a content indicated by the target indication information.

In some embodiments, the terminal device obtains energy for communication through energy harvesting. For example, the terminal device may be a zero-power terminal.

It should be understood that the present application does not limit a specific way in which the terminal device obtains energy through energy harvesting. As an example but not a limitation, the terminal device may obtain energy through a wireless energy supply way, such as an energy supply signal, solar energy, pressure or temperature.

In some embodiments, the energy supply signal is sent by the network device, or may be sent by a dedicated energy supply node, or may be sent by an active terminal. The active terminal may communicate with the network device without backscattering.

Optionally, the energy supply signal may be sent continuously or intermittently, and the terminal device harvests energy based on the energy supply signal. The terminal device obtains sufficient energy, and then may perform a corresponding communication process, such as measurement, sending of a signal, sending of a channel, reception of a signal, reception of a channel, etc.

In some embodiments, the terminal device is configured with an energy harvesting module for energy harvesting, for example, for harvesting energy from a radio wave, solar energy, etc., and further stores obtained energy in an energy storage unit. The energy storage unit obtains enough power, and then may drive a chip circuit inside the terminal device to perform operations, such as demodulation of a forward link signal and modulation of a reverse link signal.

It should be noted that the embodiments of the present application do not limit a specific way in which the terminal device communicates with the network device. For example, the terminal device may communicate with the network device through a zero-power communication manner. The zero-power communication manner may include a backscattering communication manner, or may also include other manners introduced in the standard evolution for the zero-power terminal to perform communication, but the present application is not limited thereto. The following takes the communication between the terminal device and the network device through backscattering as an example for explanation, but the present application is not limited thereto.

In some embodiments, the terminal device may receive a carrier signal and modulate the carrier signal to obtain a backscattered signal.

In some embodiments, the terminal device may send to-be-transmitted data on a preconfigured resource upon performing data transmission. For example, the network device may preconfigure different resources for terminal devices with different user identifications (ID) or user types. Or, the terminal device may also perform data transmission based on a scheduling of the network device. For example, the terminal device may receive a scheduling signal (or referred to as a trigger signal) of the network device. The scheduling signal may be used to schedule a resource for the terminal device to perform data transmission, and the terminal device further performs data transmission based on the resource scheduled by the network device.

It should be noted that in the embodiments of the present application, the energy supply signal and the scheduling signal may be the same signal. For example, the energy supply signal may also be used as the scheduling signal. Or, the energy supply signal and the scheduling signal may also be different signals. For example, the energy supply signal and the scheduling signal are not sent on the same frequency band.

Similarly, the energy supply signal and the carrier signal may be the same signal. For example, the energy supply signal may also be used as the carrier signal. Or, the energy supply signal and the carrier signal may also be different signals. For example, the energy supply signal and the carrier signal are not sent on the same frequency band. The scheduling signal and the carrier signal may be the same signal. For example, the scheduling signal may also be used as the carrier signal. Or, the power supply signal and the carrier signal may also be different signals. For example, the scheduling signal and the carrier signal are not sent on the same frequency band.

It should be understood that in the embodiments of the present application, the communication state of the terminal device may include a state related to data transmission, for example, a start of data transmission, an end of data transmission, a data transmission abnormality, etc. Or, the communication state of the terminal device may also include a power-related state, for example, a certain data transmission state due to a power problem of the terminal device, for example, interruption of data transmission due to power shortage or a power fluctuation of the terminal device. Or, the communication state of the terminal device may also include a transmission demand state or a communication demand state, etc., which is not limited in the present application.

Therefore, in the embodiments of the present application, the terminal device indicates the communication state of the terminal device to the network device through the target indication information, so that the network device can promptly learn the communication state of the terminal device to assist communication between the network device and the terminal device. For example, when data transmission is interrupted due to power shortage of the terminal device, the network device may schedule the terminal device again to complete a complete data transmission. For another example, when the terminal device has a data transmission requirement, the network device may send a scheduling signal to the terminal device to configure the terminal device with a resource for data transmission, etc.

In some embodiments, the target indication information may be a sequence (denoted as a target sequence). For example, different sequences may be designed to indicate different communication states of the terminal device.

In other embodiments, the target indication information may also be a special field in a data format. For example, part bits (e.g., first x bits) in the backscattered data are used as the target indication information.

It should be understood that when the target indication information is implemented through a sequence, the present application does not limit the generation manner of the sequence. For example, the target indication information may be generated based on a ZC sequence, or the target indication information may also be generated based on other manners.

In some implementations, the target sequence may be designed based on a method for designing a preamble in random access.

In other implementations, the target sequence is designed based on a PN sequence, a ZC sequence, etc.

For example, the target sequence may be a fixed combination of 0 and 1, for example, a combination of X continuous 0s, or Y continuous 1s, or X continuous 0s and 1s;

or the target sequence may be a combination of 0 and 1, etc. X and Y are positive integers greater than 1, as long as the target sequence is distinguishable from an existing sequence, which is not limited in the present application.

For another example, the target sequence may be a sequence including an abnormal value (the abnormal value is a level value that does not comply with an encoding rule).

As shown in FIG. 14, in FM0 encoding, the symbol "0" undergoes a level change both in the middle of the time and at the edge of the time; and the symbol "1" undergoes a level change only at the edge of the time. An example of an FM0 encoding sequence that follows the FM0 encoding rule is shown in FIG. 14.

Figure 16:
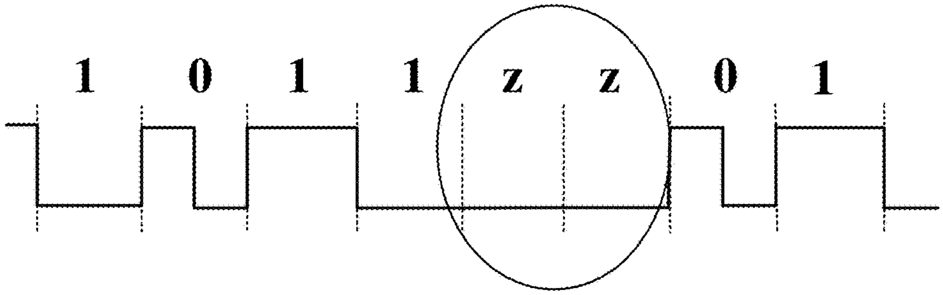
FIG. 16 is a schematic diagram for representing a target sequence by including an abnormal value z in an FM0 encoding sequence.

As an example, as shown in FIG. 16, an abnormal value z may be included in the FM0 encoding sequence to represent the target sequence.

It should be understood that the above designs of the target sequence are only examples. In an implementation, other manners may be used to generate the target sequence, as long as the target sequence and the existing sequence may be distinguished from each other and target sequences indicating different states may be distinguished from each other, which is not limited in the present application.

In some embodiments of the present application, the target indication information includes a first type of indication information, where the first type of indication information is used to indicate a data transmission state of the terminal device.

It should be understood that the first type of indication information may be used to indicate any data transmission state, and the data transmission state may be related to the power of the terminal device, or may be unrelated to the power of the terminal device.

In some embodiments, the data transmission state of the terminal device may include a normal data transmission state and/or an abnormal data transmission state.

That is, the first type of indication information may include indication information for indicating the normal data transmission state and/or indication information for indicating the abnormal data transmission state.

For the convenience of distinction and description, the indication information for indicating the normal data transmission state is recorded as first sub-type of indication information, and the indication information for indicating the abnormal data transmission state is recorded as the second sub-type of indication information.

For example, in a normal data transmission scenario, the terminal device may use the first sub-type of indication information to indicate the normal data transmission state, or, in an abnormal data transmission scenario, the terminal device may use the second sub-type of indication information to indicate the abnormal data transmission state.

In some embodiments, the normal data transmission state may include starting data transmission and/or ending data transmission.

For example, the first sub-type of indication information may include first indication information and/or second indication information. The first indication information is used to indicate the terminal device to start data transmission, or to start signal transmission; and the second indication information is used to indicate the terminal device to end data transmission, or to end signal transmission.

In some embodiments, the first indication information is sent before data transmission.

In some embodiments, the second indication information is sent after data transmission.

For example, the terminal device, before performing data transmission, first sends the first indication information; after the first indication information is sent, the terminal device performs data transmission; and after the data transmission is completed, the terminal device sends the second indication information. In some embodiments, the abnormal data transmission state may be related to the power of the terminal device, or may be unrelated to the power of the terminal device. That is, the data transmission abnormality may be caused by the power problem of the terminal device, or may be caused by other problems, for example, a resource conflict, interferences from other devices, etc.

In some embodiments, the second sub-type of indication information is sent when the problem of the data transmission abnormality is eliminated, or may be sent before the data transmission abnormality occurs.

For example, after the data transmission abnormality occurs, the terminal device sends the second sub-type of indication information to the network device, so as to indicate that an abnormality occurred in a previous data transmission; or, when a problem causing the data transmission abnormality occurs (e.g., the problem will cause subsequent data transmission to be interrupted), the terminal device sends the second sub-type of indication information to the network device, so as to indicate that the current data transmission is abnormal.

In some embodiments, the second type of indication information includes a plurality pieces of indication information, and the plurality of indication information corresponds to different sending occasions and/or terminal capabilities. That is, different indication information may be designed according to different sending occasions and/or terminal capabilities, so as to indicate the abnormal data transmission state.

For example, when the data transmission is abnormal, the terminal device may determine the indication information to be used based on its own capability.

Correspondingly, the network device may determine the capability of the terminal device according to the indication information used by the terminal device, and may further reasonably schedule the terminal device to promote the system performance.

As an example, the second type of indication information includes indication information A and indication information B. Indication information A is sent when the problem of the data transmission abnormality is eliminated; or in other words, indication information A is sent in a next data transmission after an abnormal data transmission. Indication information B is sent before the data transmission abnormality occurs; or in other words, indication information B is sent in the abnormal data transmission.

As an example, the second type of indication information includes indication information C and indication information D. Indication information C corresponds to a capability of a first terminal, and indication information D corresponds to a capability of a second terminal. The capability of the first terminal is higher than the capability of the second terminal.

Optionally, a capability of a terminal may include an energy harvesting capability (or charging efficiency) of the terminal device.

In some scenarios, a distance between the terminal device and the energy supply signal may also affect the charging efficiency of the terminal device. Therefore, the capability of the terminal may also consider the distance information between the terminal device and the energy supply signal.

In some scenarios, a sending occasion of the second type of indication information may be related to the terminal capability.

Optionally, indication information A and indication information C may be the same indication information, and indication information B and indication information D may be the same indication information.

For example, for a terminal device with a stronger capability, the charging efficiency is higher and thus, the abnormality caused by the power problem may be restored to normality quickly. Therefore, the terminal device may send indication information A in a next data transmission to indicate the abnormality of a previous data transmission.

For another example, for a terminal device with a weaker capability, the charging efficiency is lower, and thus, the abnormality caused by the power problem may be restored to normality for a long time. Therefore, the terminal device may send the indication information B in the current data transmission to indicate the data transmission abnormality.

In some embodiments, different indication information may be designed according to the cause of the data transmission abnormality.

Optionally, the cause of the data transmission abnormality may include the power problem of the terminal device, such as a power fluctuation or power shortage.

As an example, the second type of indication information includes indication information E and indication information F. Indication information E corresponds to a power fluctuation, and indication information F corresponds to power shortage.

Therefore, the terminal device may determine the indication information to be used according to the cause of the data transmission abnormality. Correspondingly, the network device may also determine the cause of the data transmission abnormality of the terminal device according to the indication information used by the terminal device, and may further reasonably schedule the terminal device to promote the system performance.

In summary, the indication information indicating the data transmission abnormality may be designed according to at least one of the sending occasion of the indication information, the terminal capability or the cause of the data transmission abnormality; or the indication information of the data transmission abnormality may be designed according to other related information, which is not limited in the present application.

It should be understood that the above-mentioned sending occasion, terminal capability, and cause of the data transmission abnormality may be related. For example, the cause of the data transmission abnormality is usually related to the terminal capability. For example, for a terminal device with a low charging efficiency, there is usually the problem of the data transmission abnormality due to an insufficient capability. Therefore, the terminal may choose to send the indication information to indicate the data transmission abnormality in the current data transmission. For another example, for a terminal device with a high charging efficiency, there may be the problem of the data transmission abnormality due to a capacity fluctuation. Therefore, the terminal may choose to send the indication information to indicate the data transmission abnormality in a next data transmission.

In some embodiments, the abnormal data transmission state may include:

- data transmission abnormality due to power fluctuation, and/or data transmission abnormality due to power shortage.

In some embodiments, the energy fluctuation may include power fluctuation, and the energy shortage may include a power shortage.

Optionally, the energy fluctuation may refer to any energy change that affects data transmission or energy supply.

For example, the energy fluctuation may include an interruption of the energy supply signal and/or the carrier signal due to obstruction or environmental changes; or the energy of the energy supply signal reaching the terminal device generates a fluctuation in a large range and the fluctuation may cause a backscattering communication distance to change, thereby resulting in that the backscattered signal fails to reach a receiving end and affecting data communication.

Optionally, the energy shortage may be determined by the terminal device before data transmission.

For example, the terminal device may determine a transmission duration that may be supported according to the current remaining power, and further determine whether there is energy shortage by combining a length of a time domain resource length and/or a size of to-be-transmitted data scheduled by the network device.

Optionally, in a case where the terminal device determines that there is an energy shortage, the terminal device may transmit only part of the to-be-transmitted data, and further send corresponding indication information to indicate that the energy shortage has caused the data transmission abnormality.

Optionally, in a case where the terminal device determines that there is an energy shortage, the terminal device may not send the to-be-transmitted data, but only send corresponding indication information to indicate that the data transmission abnormality is caused by insufficient power.

Optionally, the energy shortage may also be determined by the terminal during data transmission. For example, if the terminal device determines that the remaining energy is insufficient to transmit remaining to-be-transmitted data during data transmission, the data transmission is interrupted and corresponding indication information is sent.

In some embodiments, the data transmission abnormity may include data transmission interruption.

That is, the abnormal data transmission state may include:

- data transmission interruption due to power fluctuation, and/or data transmission interruption due to power shortage.

As an example but not limitation, the first type of indication information includes but is not limited to at least one of the following:

- first indication information, used to indicate the terminal device to start data transmission, or to start signal sending;
- second indication information, used to indicate the terminal device to end data transmission, or, to end signal sending;
- third indication information, used to indicate that data transmission abnormality is caused due to power fluctuation, or signal sending is abnormal due to power fluctuation; or
- fourth indication information, used to indicate that data transmission abnormality is caused due to power shortage, or signal sending is abnormal due to power shortage.

Optionally, the above signal may refer to a backscattered signal.

In some embodiments, the third indication information is used to indicate that data transmission abnormality is caused due to power fluctuation, and may include:

third indication information, used to indicate that data transmission interruption is caused due to power fluctuation.

In some embodiments, the fourth indication information is used to indicate that data transmission abnormality is caused due to power shortage, and may include:

fourth indication information, used to indicate that data transmission interruption is caused due to power shortage.

In backscattering communication, the terminal device sends relevant indication information before and/or after data transmission to mark the start and ending positions of the backscattered signal, which is beneficial for the network device to receive the backscattered signal.

In backscattering communication, in a case of data transmission abnormality, relevant indication information is sent to identify the data transmission abnormality and the cause of the data transmission abnormality, which is beneficial to subsequent scheduling of network devices.

In some embodiments, in a case where the problem of power fluctuation occurs, the terminal device may use the third indication information to indicate data transmission abnormality, or, in a case where the problem of the power shortage occurs, the terminal device may use the fourth indication information to indicate the data transmission abnormality.

It should be understood that in the above example, the third indication information and the fourth indication information are designed according to the cause of the data transmission abnormality. Alternatively, the third indication information and the fourth indication information may also be designed according to the sending occasion of the indication information or according to the terminal capability.

For example, the third indication information corresponds to a first energy harvesting capability, and the fourth indication information corresponds to a second energy harvesting capability. The first energy harvesting capability is higher than the second energy harvesting capability. That is, for a terminal device with a high energy harvesting capability, the third indication information may be used to indicate the data transmission abnormality, and for a terminal device with a low energy harvesting capability, the fourth indication information may be used to indicate the data transmission abnormality.

For another example, the third indication information is sent in a next data transmission after the data transmission abnormality, and the fourth indication information is sent in the data transmission where the abnormality occurs.

In summary, the third indication information and the fourth indication information may be designed according to at least one of:

a cause of data transmission abnormality, a sending occasion, or a terminal capability.

That is, the third indication information and the fourth indication information may both indicate the data transmission abnormality, and the data transmission abnormality may be caused by different causes, for example, caused by a power fluctuation and a power shortage, respectively; or the third indication information and the fourth indication information may be sent by terminal devices with different capabilities or sent at different occasions.

It should be understood that a design of the first type of indication information refers to a related design of the target indication information in the aforementioned embodiments, which will not be repeated herein for the sake of simplicity.

As an example, the first indication information includes a first sequence, the second indication information includes a second sequence, the third indication information includes a third sequence, and the fourth indication information includes a fourth sequence. The first sequence, the second sequence, the third sequence, and the fourth sequence are different from each other. That is, different communication states of the terminal device may be identified by different sequences.

In some embodiments, types of the first sequence, the second sequence, the third sequence and the fourth sequence may be the same, or may be different. For example, the first sequence, the second sequence, the third sequence and the fourth sequence may be generated based on the same sequence, for example, generated based on a ZC sequence; or may be generated based on different sequences, which is not limited in the present application.

In some embodiments, lengths of the first sequence, the second sequence, the third sequence and the fourth sequence may be the same, or may be different, which is not limited in the present application.

It should be understood that in the embodiments of the present application, the terminal device may send corresponding indication information in different communication states according to a specific rule. Correspondingly, the network device may interpret the indication information sent by the terminal device according to the specific rule, which is beneficial to ensuring that the network device and the terminal device have a consistent understanding of the communication state.

Optionally, the specific rule may be predefined, or may be configured by the network device. Optionally, the specific rule may include at least one of the following rules.

Rule 1: the terminal device needs to send the first indication information first to identify starting of the data transmission before performing the data transmission.

Rule 2: the terminal device needs to send a second indication message to indicate ending of data transmission after performing data transmission.

That is, the terminal device needs to identify starting of the data transmission through the first indication information, and/or needs to identify ending of the data transmission through the second indication information.

Correspondingly, the network device may determine a starting position of the data transmission by detecting the first indication information, and/or determine an ending position of the data transmission by detecting the second indication information.

Optionally, the specific rule may include at least one of the following rules.

Rule 3: before performing data transmission, the terminal device sending firstly the first indication information is optional.

Rule 4: after performing data transmission, the terminal device sending the second indication information is optional.

That is, before performing data transmission, the terminal device may send the first indication information or may not send the first indication information, and/or after data transmission, the terminal device may send the second indication information or may not send the second indication information.

Optionally, without any contradiction, the specific rule may include any combination of the above rules. For example, the specific rule may include rule 1 and rule 2; or may include rule 1 and rule 4 or rule 2 and rule 3.

In some embodiments, the specific rule may be related to the resource mode of the terminal device, or may be unrelated to the resource mode of the terminal device.

Optionally, the resource mode of the terminal device may include at least one of:

- a starting position and a length of a time domain resource used for data transmission being indicated by the network device, which is denoted as mode 1;
- a starting position of a time domain resource used for data transmission being indicated by the network device, which is denoted as a mode 2;
- a time domain resource used for data transmission being schedule-free, or pre-configured, which is denoted as a mode 3; or
- a time domain resource used for data transmission being determined by the terminal device (or selected by the terminal device itself), which is recorded as mode 4.

For example, in mode 1 and in mode 3, the network device may learn the starting position and the ending position of the time domain resource, and thus, is equivalent to being able to learn a starting position and an ending position of the data transmission. In this case, whether to indicate the starting of the data transmission through the first indication information may be optional, and whether to indicate the ending of the data transmission through the second indication information may be optional. That is, before performing the data transmission, the terminal device may send the first indication information or may not send the first indication information, and after the data transmission, the terminal device may send the second indication information or may not send the second indication information. Or, indicating the starting of the data transmission through the first indication information may also be mandatory, and indicating the ending of the data transmission through the second indication information may also be mandatory. That is, before the data transmission is performed, the first indication information needs to be sent first to identify the starting of the data transmission; and after the data transmission, the second indication information needs to be sent to identify the ending of the data transmission.

For another example, in mode 2, since the network device may learn the starting position of the time domain resource but does not learn the ending position of the data transmission, in this case, whether to identify the starting of the data transmission through the first indication information may be optional, and indicating the ending of the data transmission through the second indication information may be mandatory. That is, before performing data transmission, the terminal device may send the first indication information or may not send the first indication information; and after data transmission, the second indication information needs to be sent to identify the ending of the data transmission. Or, the indicating the starting of the data transmission through the first indication information may also be mandatory, that is, before the data transmission is performed, the first indication information needs to be sent first, so as to identify the starting of the data transmission.

For another example, in mode 4, since the network device cannot learn the starting position and the ending position of the time domain resource, in this case, the indicating the starting of the data transmission through the first indication information may be mandatory, and the indicating the ending of the data transmission through the second indication information may be mandatory. That is, before the data transmission is performed, the first indication information needs to be sent first to identify the starting of the data transmission; and after the data transmission, the second indication information needs to be sent to identify the ending of the data transmission.

In summary, the rules corresponding to mode 1 and mode 3 may be: rule 1 and rule 2, rule 1 and rule 4, and rule 2 and rule 3;

- the rule corresponding to mode 2 may be: rule 1 and rule 2, and rule 3 and rule 2; and
- the rule corresponding to mode 4 may be: rule 1 and rule 2.

In some embodiments of the present application, the method 200 further includes:

- sending, by the terminal device, a target information set on a first time domain resource.

In some embodiments, the first time domain resource may be a resource scheduled by the network device, or may be a resource that is schedule-free, or may be a resource that is autonomously selected by the terminal device. For example, the first time domain resource may be a resource in the aforementioned four modes.

In some embodiments, information composition of the target information set may include the following cases.

Case 1: the target information set includes first data information, or the target information set includes first data information and padding data information, where the first data information includes all of to-be-transmitted data. That is, the terminal device sends all of to-be-transmitted data, but does not send the first type of indication information.

Case 2: the target information set includes first data information and the first type of indication information, and the first data information includes all of to-be-transmitted data.

For example, in a case where a first time domain resource is sufficient to transmit all of to-be-transmitted data and the first type of indication information, the target information set is composed of information in the case 2.

Case 3: the target information set includes second data information and the first type of indication information, and the second data information includes part of to-be-transmitted data.

For example, in a case where the first time domain resource is insufficient to transmit all of to-be-transmitted data and the first type of indication information, or in a case where data transmission is interrupted, the target information set is composed of information in the case 3.

It should be understood that in the embodiments of the present application, the target information set may be considered to correspond to a backscattered signal, or respective pieces of information in the target information set may be considered to correspond to different backscattered signals. In other words, the target information set may be considered as a data packet, or each piece of information in the target information set may be considered as an independent data packet, which is not limited in the present application.

It should to be noted that in the embodiments of the present application, the to-be-transmitted data may refer to data that currently needs to be sent. In different embodiments, the to-be-transmitted data may be the same or different, which depends on a specific transmission situation.

For example, the terminal device sends data A on a time domain resource, and then sends data B on another time domain resource. Data A and data B may be the same, or may be different from each other. For example, both data A and data B may be newly transmitted data, or data B may be retransmitted data of data A.

In some embodiments of the present application, a length of the first indication information is fixed or variable.

In some embodiments, the first indication information is determined according to a length of the first time domain resource and/or a size of the to-be-transmitted data.

For example, first indication information with an appropriate length is generated according to the length of the first time domain resource and/or the size of the to-be-transmitted data, where the sum of the required lengths of the generated first indication information and the to-be-transmitted data is less than or equal to the length of the first time domain resource.

As an example, the length of the first time domain resource is L, and the required length of the to-be-transmitted data is L1, then first indication information with a length less than or equal to L-L1 may be generated.

In other embodiments, the terminal device may learn a plurality of first indication information, and the plurality pieces of first indication information correspond to different lengths. The terminal device may determine used target first indication information among the plurality pieces of first indication information according to the length of the first time domain resource and/or the size of the to-be-transmitted data. Optionally, a sum of the required lengths of the selected target first indication information and the to-be-transmitted data is less than or equal to a length of the first time domain resource.

Optionally, the plurality pieces of first indication information may be predefined, or may be configured by the network device.

In some embodiments of the present application, the length of the second indication information is fixed or variable.

In some embodiments, the second indication information is determined according to the length of the first time domain resource and/or the size of the to-be-transmitted data, or is determined according to the length of the first time domain resource, the size of the to-be-transmitted data and a size of the first indication information.

For example, second indication information with an appropriate length is generated according to the length of the first time domain resource and the size of the to-be-transmitted data, where the sum of the required lengths of the generated second indication information and the to-be-transmitted data is less than or equal to the length of the first time domain resource.

As an example, the length of the first time domain resource is L, and the required length of the to-be-transmitted data is L1, then second indication information with a length less than or equal to L-L1 may be generated.

For another example, second indication information with an appropriate length is generated according to the length of the first time domain resource, the size of the to-be-transmitted data and the first indication information, where the sum of the required lengths of the generated second indication information, the first indication information and the to-be-transmitted data is less than or equal to a length of the first time domain resource.

As an example, the length of the first time domain resource is L, the required length of the to-be-transmitted data is L1, and the required length of the first indication information is L2, then second indication information with a length less than or equal to L-L1-L2 may be generated.

In other embodiments, the terminal device may learn a plurality of second indication information, and the plurality pieces of second indication information correspond to different lengths. The terminal device may determine used target second indication information among the plurality pieces of second indication information according to the length of the first time domain resource and/or the size of the to-be-transmitted data. Optionally, a sum of required lengths of the selected target second indication information and the to-be-transmitted data is less than or equal to the length of the first time domain resource, or a sum of required lengths of the selected target second indication information, the target first indication information and the to-be-transmitted data is less than or equal to the length of the first time domain resource.

It should be understood that when there is a time interval between the first indication information and the to-be-transmitted data, and when there is a time interval between the second indication information and the to-be-transmitted data, the length design of the first indication information and the second indication information may also need to consider the time interval.

For example, the length of the first time domain resource is L, the required length of the to-be-transmitted data is L1, and a length of the interval between the first indication information and the data to be transmitted is G1, then first indication information with a length less than or equal to L-L1-G1 may be generated.

For another example, the length of the first time domain resource is L, the required length of the to-be-transmitted data is L1, and the interval length between the second indication information and the to-be-transmitted data is G2, then second indication information with a length less than or equal to L-L1-G2 may be generated.

For another example, the length of the first time domain resource is L, the required length of the to-be-transmitted data is L1, the required length of the first indication information is L2, a length of the interval between the first indication information and the to-be-transmitted data is G1, and a length of the interval between the second indication information and the to-be-transmitted data is G2, then second indication information with a length less than or equal to L-L1-L2-G1-G2 may be generated.

Optionally, the plurality pieces of second indication information may be predefined, or may be configured by the network device.

In some embodiments of the present application, a length of the third indication information is fixed or variable.

In some embodiments of the present application, a length of the fourth indication information is fixed or variable.

In the following, indication manners of the normal data transmission state and the abnormal data transmission state of the terminal device are respectively described by combining embodiment 1 and embodiment 2.

Embodiment 1: indication of a normal data transmission state, that is, indicating a starting of data transmission and an ending of the data transmission.

It should be understood that in the embodiments of the present application, the terminal device may indicate the starting and the ending of the data transmission through explicit indication information, or, in a case where the terminal device and the network device have a consistent understanding of a starting position and an ending position of the data transmission, the terminal device may not need to indicate the starting and the ending of the data transmission.

The following describes the indication manner of the starting and the ending of the data transmission in conjunction with some exemplary scenarios.

Scenario 1: the network device is able to learn the starting position and the ending position of the first time domain resource.

Scenario 1 may include the aforementioned mode 1 and mode 3.

For example, the starting position(S) and the length (L) of the first time domain resource are indicated by the network device, or the starting position and the ending position of the first time domain resource are indicated by the network device. For another example, the first time domain resource is preconfigured, that is, the first time domain resource is a schedule-free resource.

In this scenario 1, the information composition of the target information set may be any one of the aforementioned case 1, case 2 or case 3.

The following describes the indication manner of the starting state and the ending state of the data transmission in scenario 1, or a sending manner of the target indication information in combination with manner 1 to manner 4.

Manner 1: the target information set includes the first data information, or the target information set includes the first data information and padding data information. That is, in manner 11, the terminal device does not send the first indication information and the second indication information.

Manner 1-1: the target information set includes first data information. That is, the terminal device only sends the to-be-transmitted data.

Optionally, in a case where the length of the first time domain resource is equal to the required length of the to-be-transmitted data, the target information set may only include all of the to-be-transmitted data.

In this case, the network device may use the starting position of the first time domain resource as the starting position of data transmission, and use the ending position of the first time domain resource as the ending position of data transmission.

Figure 17:
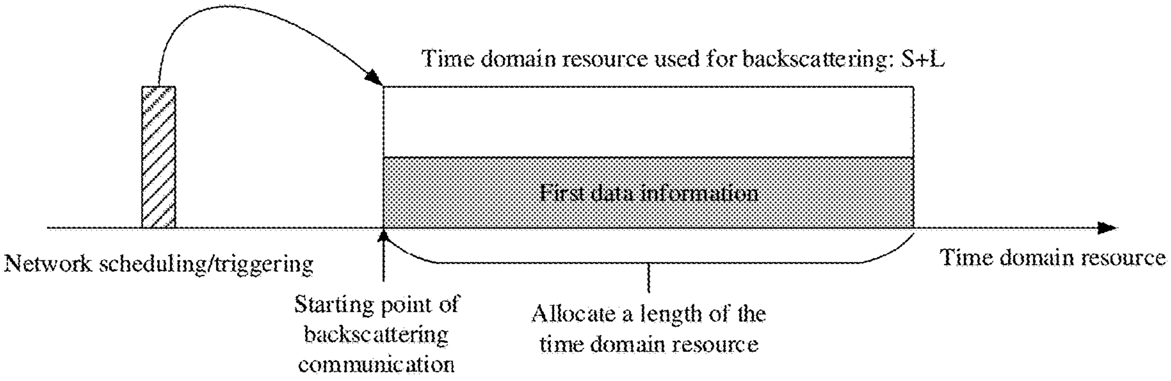
FIG. 17 is a schematic composition diagram of a target information set in mode 1 provided in the embodiments of the present application.

Taking the mode 1 as an example, as shown in FIG. 17, the terminal device receives a scheduling signal from the network device, and the scheduling signal is used to schedule or trigger the starting position(S) and the length (L) of the time domain resource used for backscattering, then when performing the backscattering communication, the terminal device may start sending the to-be-transmitted data at the starting position of the time domain resource, and ending the data transmission when the sending of the to-be-transmitted data is completed for the reason that the required length of the to-be-transmitted data is equal to the length of the time domain resource allocated by the network device.

Manner 1-2: the target data set includes the first data information and the padding data information, where the padding data information follows the first data information. That is, the terminal device sends the to-be-transmitted data and the padding data information.

For example, in a case where the length of the first time domain resource is greater than the required length of the to-be-transmitted data, the target information set may include the first data information and the padding data information. In other words, in a case where the terminal device has a remaining available resource after transmitting all of the to-be-transmitted data by using the first time domain resource, the terminal device may also send the padding data information.

It should be understood that the present application does not specifically limit the manner of padding data. For example, at least one zero may be adopted for padding, or at least one 1 may be adopted for padding, or verification data of the to-be-transmitted data may be adopted for padding, or part of the to-be-transmitted data may be adopted for padding, that is, part of the to-be-transmitted data may be repeated, etc., which will not be limited in the present application.

Figure 18:
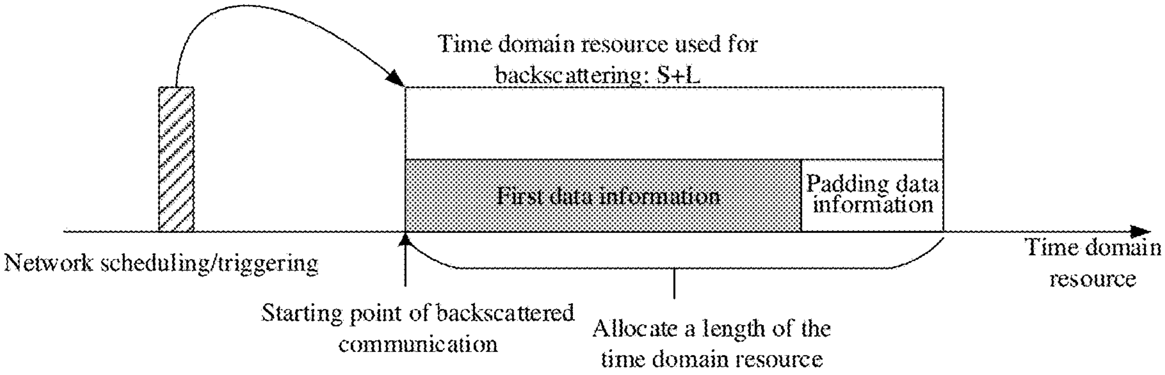
FIG. 18 is another schematic composition diagram of a target information set in mode 1 provided in the embodiments of the present application.

Taking mode 1 as an example, as shown in FIG. 18, the terminal device receives a scheduling signal from the network device, and the scheduling signal is used to schedule or trigger the starting position(S) and the length (L) of the time domain resource used for backscattering, then when performing the backscattering communication, the terminal device may start sending the to-be-transmitted data at the starting position of the time domain resource, and continue to send the padding data information when the sending of the to-be-transmitted data is completed and end the data transmission until the ending position of the first time domain resource, for the reason that the required length of the to-be-transmitted data is less than the length of the time domain resource allocated by the network device.

Manner 2: the target information set includes the first data information and the second indication information, where the first data information precedes the second indication information. That is, in manner 2, the terminal device only uses the second indication information to indicate the ending position of the data transmission.

In other words, in this manner 2, the terminal device indicates the ending position of the data transmission based on the aforementioned rule 2.

For example, the to-be-transmitted data starts to be sent at the starting position of the first time domain resource, and the second indication information is then sent after the sending of the to-be-transmitted data d is completed.

Therefore, in this manner 2, a complete data transmission includes all of the to-be-transmitted data and the second indication information.

Optionally, in this manner 2, the terminal device indicates the starting position of the data transmission based on the aforementioned rule 1 or rule 3, or may not indicate the starting position of the data transmission.

Optionally, in this manner 2, the starting position of the data transmission may be determined according to the starting position of the first time domain resource.

Optionally, in a case where the terminal device indicates the ending position of the data transmission based on the aforementioned rule 2, that is, the terminal device indicates the ending position of the data transmission through the second indication information, and the length of the first time domain resource is greater than the required length of the to-be-transmitted data, the target information set includes the first data information and the second indication information.

Further optionally, in a case where the terminal device indicates the ending position of the data transmission based on the aforementioned rule 2, and the length of the first time domain resource is sufficient to transmit all of the to-be-transmitted data and the second indication information, the target information set includes the first data information and the second indication information.

In some embodiments, the length of the second indication information is variable.

In some embodiments, the length of the second indication information is determined according to a length of the remaining available resource after all of the to-be-transmitted data are sent completely by using the first time domain resource. For example, the terminal device may generate a second sequence with a corresponding length according to the length of the remaining available resource, thereby completing padding of the first time domain resource.

Figure 19:
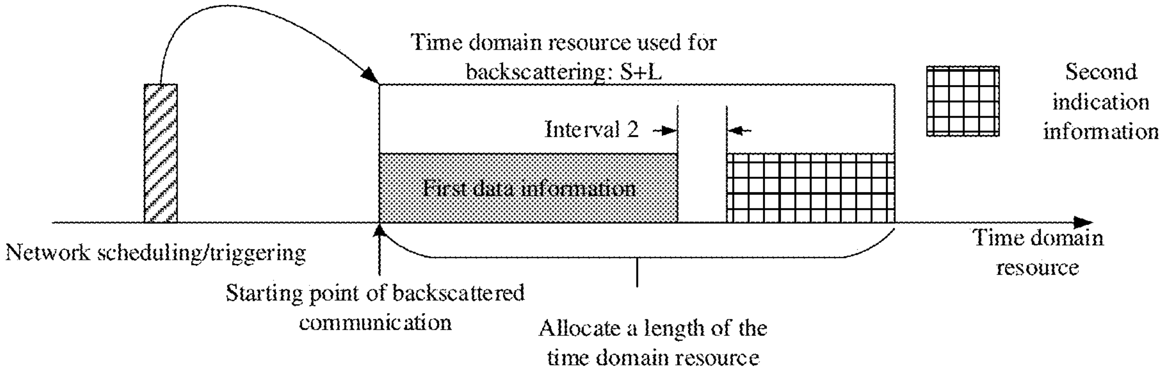
FIG. 19 is yet another schematic composition diagram of a target information set in mode 1 provided in the embodiments of the present application.

Taking mode 1 as an example, as shown in FIG. 19, the terminal device receives a scheduling signal from the network device, and the scheduling signal is used to schedule or trigger the starting position(S) and the length (L) of the time domain resource used for backscattering, then when performing the backscattering communication, the terminal device may start sending the to-be-transmitted data at the starting position of the time domain resource, and when the length of the time domain resource allocated by the network device is greater than the required length of the to-be-transmitted data, the terminal device may send second indication information with a corresponding length to identify the ending of the data transmission after the to-be-transmitted data is sent completely.

In other embodiments, the length of the second indication information is fixed.

As an implementation, the data transmission is ended regardless of whether there is a remaining available resource after the to-be-transmitted data and the second indication information are sent completely. Optionally, in this implementation, a length of the remaining available resource after the to-be-transmitted data is sent completely by using the first time domain resource is greater than or equal to the required length of the second indication information.

Figure 20:
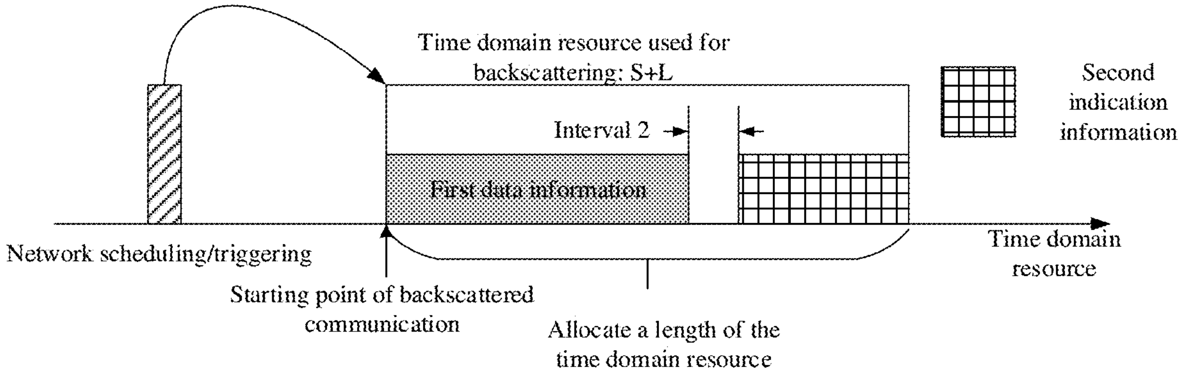
FIG. 20 is yet another schematic composition diagram of a target information set in mode 1 provided in the embodiments of the present application.

Taking the mode 1 as an example, as shown in FIG. 20, the terminal device receives a scheduling signal from the network device, and the scheduling signal is used to schedule or trigger the starting position(S) and the length (L) of the time domain resource used for backscattering, then when performing the backscattering communication, the terminal device may start sending the to-be-transmitted data at the starting position of the time domain resource, and when the length of the time domain resource allocated by the network device is greater than a length required by the to-be-transmitted data and the second indication information, the terminal device may send second indication information with a fixed length to identify the ending of data transmission after the to-be-transmitted data is sent completely, without padding the first time domain resource completely.

As another implementation, if the length of the remaining available resource after the to-be-transmitted data is sent completely by using the first time domain resource is greater than the required length of the second indication information, the second indication information is extended and the extended second indication information is further sent, where a length of the extended second indication information is determined according to the length of the remaining available resource. As an example, extending the second indication information may include but is not limited to repetition or partial repetition.

As another implementation, if the length of the remaining available resource after sending the to-be-transmitted data using the first time domain resource is less than the required length of the second indication information, the second indication information may not be used, but data padding may be performed according to the manner described in manners 1-2, that is, the second indication information is not sent, but padding data information is sent.

In some embodiments, there is a second time interval (denoted as interval 2) between the second indication information and the first data information, as shown in FIGS. 19 and 20.

Optionally, the second time interval may be 0, that is, the second indication information and the first data information are adjacent to each other.

In some embodiments, the second time interval is predefined or configured by the network device.

It should be understood that in the embodiment of the present application, the unit of the second time interval may be any time unit, and the present application does not limit this. As an example but not a limitation, a unit of the second time interval is a minimum time unit for the terminal device to perform data communication, or a unit of the second time interval may be a microsecond (μs), a millisecond (ms), a second(s), a time slot, a subframe, a frame, etc.

Manner 3: the target information set includes the first indication information and the first data information, where the first indication information precedes the first data information. That is, in manner 3, the terminal device only uses the first indication information to indicate the starting position of the data transmission.

For example, the first indication information is sent at the starting position of the first time domain resource, and then the to-be-transmitted data is sent.

Optionally, in this manner 3, the terminal device indicates the ending position of the data transmission based on the aforementioned rule 2 or rule 4, or may not indicate the ending position of the data transmission.

Optionally, in this manner 3, the ending position of the data transmission may be determined according to the ending position of the first time domain resource.

Optionally, in this manner 3, a case where the terminal device indicates the starting position of the data transmission based on the aforementioned rule 1, that is, the terminal device indicates the starting position of the data transmission through the first indication information, and the length of the first time domain resource is greater than the required length of the to-be-transmitted data, the target information set includes the first indication information and the first data information.

Further optionally, in a case where the terminal device indicates the starting position of the data transmission based on the aforementioned rule 1, and the first time domain resource is sufficient to transmit all of the to-be-transmitted data and the first indication information, the target information set includes the first indication information and the first data information.

Optionally, in this manner 3, if there is still an available resource remained in the first time domain resource after the first indication information and all of the to-be-transmitted data are transmitted completely, the target information set may further include the padding data information.

The target information set may include the first indication information, the first data information and padding data information, where the first indication information precedes the first data information and the padding data information follows the first data information.

The implementation of the padding data information refers to the related description of manners 1 to 2, which will not be repeated herein.

Optionally, in this manner 3, a complete data transmission includes the first indication information and all of the to-be-transmitted data, or includes the first indication information, all of the to-be-transmitted data and the padding data information.

Figure 21:
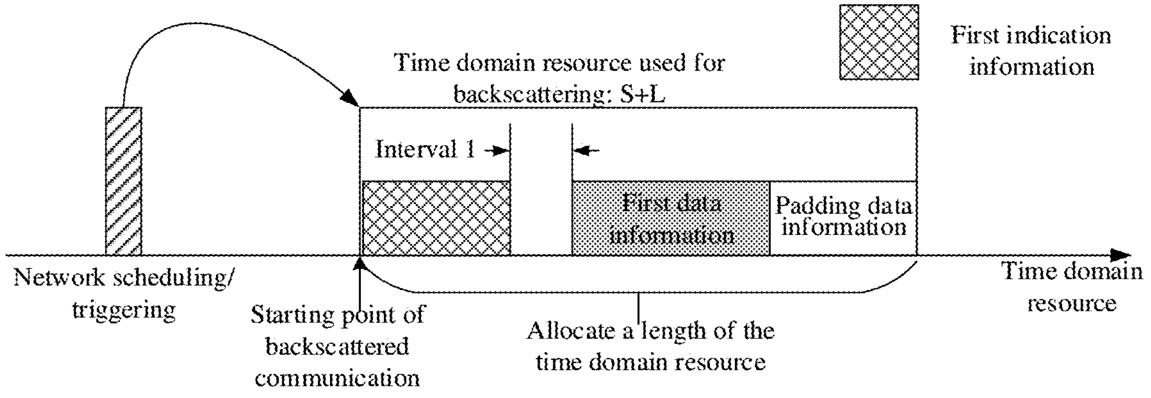
FIG. 21 is yet another schematic composition diagram of a target information set in mode 1 provided in the embodiments of the present application.

Taking mode 1 as an example, as shown in FIG. 21, the terminal device receives a scheduling signal from the network device, and the scheduling signal is used to schedule or trigger the starting position(S) and the length (L) of the time domain resource used for backscattering, then when performing the backscattering communication, the terminal device first starts sending the first indication information at the starting position of the time domain resource to identify the starting of the data transmission and then sends the to-be-transmitted data. Optionally, when the length of the time domain resource allocated by the network device is greater than a length required by the first indication information and the to-be-transmitted data, the padding data information may also be sent.

Figure 22:
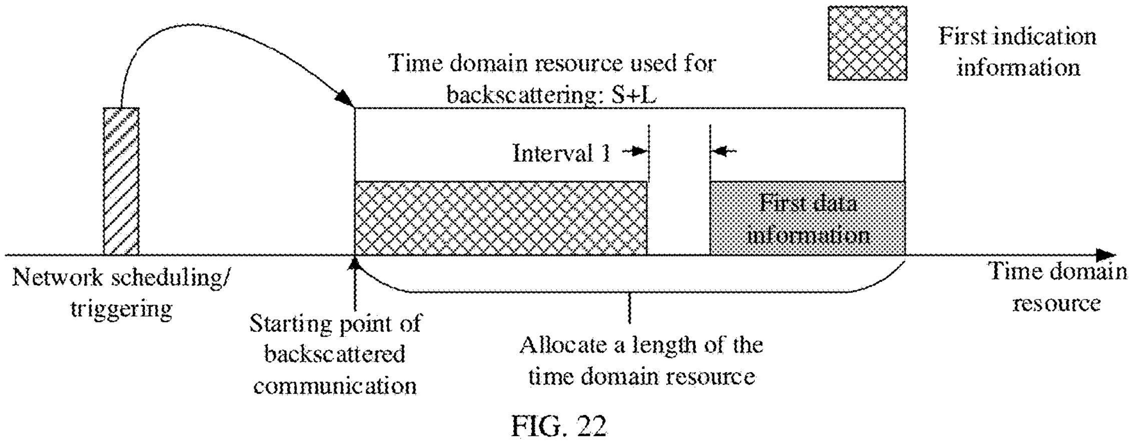
FIG. 22 is yet another schematic composition diagram of a target information set in mode 1 provided in the embodiments of the present application.

Taking the mode 1 as an example, as shown in FIG. 22, the terminal device receives a scheduling signal from the network device, and the scheduling signal is used to schedule or trigger the starting position(S) and the length (L) of the time domain resource used for backscattering, then when performing the backscattering communication, the terminal device may generate first indication information with a corresponding length according to the length of the time domain resource and the size of the to-be-transmitted data, then start sending the first indication information at the starting position of the time domain resource to identify the starting of the data transmission, and then send the to-be-transmitted data. After the to-be-transmitted data is sent completely, the data transmission ends.

In some embodiments, as shown in FIG. 21 and FIG. 22, there is a first time interval (denoted as an interval 1) between the first indication information and the first data information.

Optionally, the first time interval may be 0, that is, the first indication information and the first data information are adjacent to each other.

In some embodiments, the first time interval is predefined or configured by the network device.

It should be understood that in the embodiment of the present application, the unit of the first time interval may be any time unit, and the present application does not limit this. As an example but not a limitation, a unit of the first time interval is a minimum time unit for the terminal device to perform data communication, or a unit of the first time interval may be a microsecond (μs), a millisecond (ms), a second(s), a time slot, a subframe, a frame, etc.

Manner 4: the target information set includes the first indication information, the first data information, and the second indication information, where the first indication information precedes the first data information, and the second indication information follows the first data information.

That is, in this manner 4, the terminal device uses the first indication information to indicate the starting position of the data transmission, and uses the second indication information to indicate the ending position of the data transmission. In other words, in this manner 4, the terminal device indicates the starting position of the data transmission based on rule 1, and indicates the ending position of the data transmission based on rule 2.

Optionally, in this manner 4, a complete data transmission includes the first indication information, all of the to-be-transmitted data, and the second indication information.

Optionally, in a case where the terminal device indicates the starting position of the data transmission based on the aforementioned rule 1, and indicates the ending position of the data transmission based on the aforementioned rule 2, and the length of the first time domain resource is greater than the required length of the to-be-transmitted data, the target information set includes the first indication information, the first data information and the second indication information.

Further optionally, in a case where the terminal device indicates the starting position of the data transmission based on the aforementioned rule 1, and indicates the ending position of the data transmission based on the aforementioned rule 2, and the first time domain resource is sufficient to transmit all of the to-be-transmitted data, the first indication information and the second indication information, the target information set includes the first indication information, the first data information and the second indication information.

In some embodiments, the length of the second indication information may be variable.

In some embodiments, the length of the second indication information is determined according to a length of a remaining available resource after the first indication information and all of the to-be-transmitted data are sent completely by using the first time domain resource. For example, a second sequence with a corresponding length is generated according to the length of the remaining available resource, thereby completing the padding of the first time domain resource.

Figure 23:
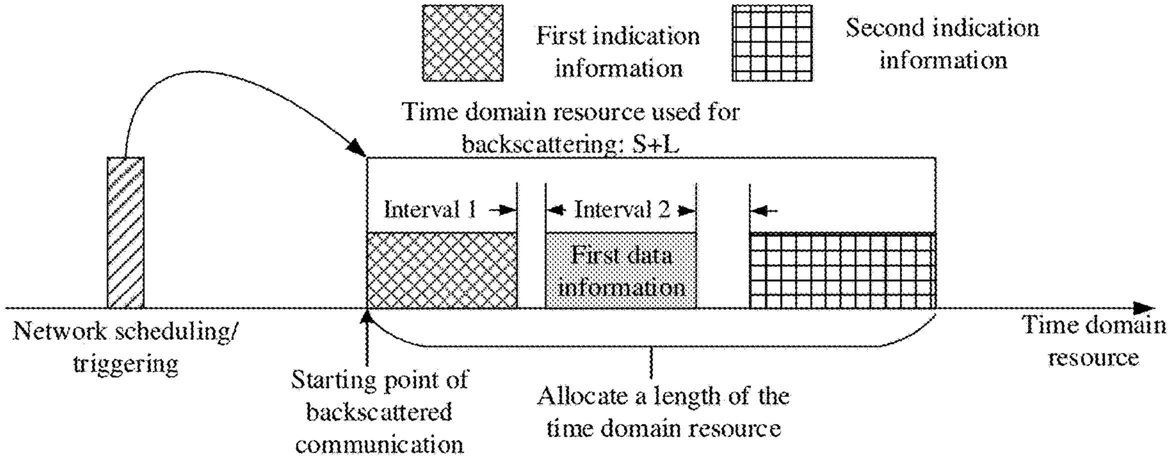
FIG. 23 is yet another schematic composition diagram of a target information set in mode 1 provided in the embodiments of the present application.

Taking the mode 1 as an example, as shown in FIG. 23, the terminal device receives a scheduling signal from the network device, and the scheduling signal is used to schedule or trigger the starting position(S) and the length (L) of the time domain resource used for backscattering, then when performing the backscattering communication, the terminal device may send the first indication information at the starting position of the time domain resource to identify the starting of the data transmission, then send the to-be-transmitted data, send second indication information with a corresponding length to identify the ending of the data transmission after the to-be-transmitted data is sent completely.

In some embodiments, the length of the second indication information may be fixed.

As an example, the data transmission is ended regardless of whether there is a remaining available resource after the first indication information, all of the to-be-transmitted data, and the second indication information are sent completely. Optionally, in this implementation, a length of the remaining available resource after the first indication information and the to-be-transmitted data are sent completely by using the first time domain resource is greater than or equal to the required length of the second indication information.

Figure 24:
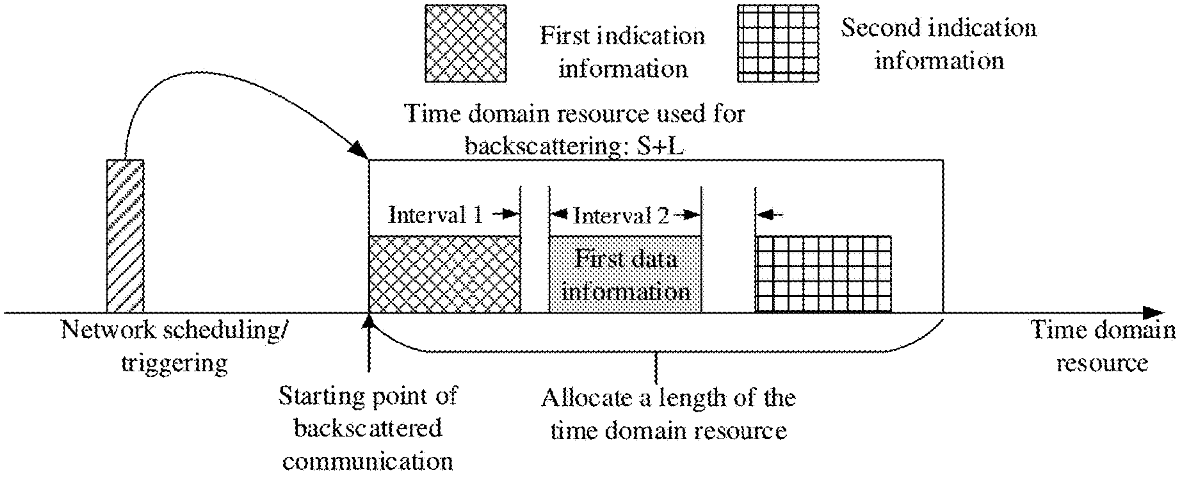
FIG. 24 is yet another schematic composition diagram of a target information set in mode 1 provided in the embodiments of the present application.

Taking mode 1 as an example, as shown in FIG. 24, the terminal device receives a scheduling signal from the network device, and the scheduling signal is used to schedule or trigger the starting position(S) and the length (L) of the time domain resource used for backscattering, then when performing the backscattering communication, the terminal device may send the first indication information at the starting position of the time domain resource to identify the starting of the data transmission, then send the to-be-transmitted data, send second indication information with a fixed length to identify the ending of the data transmission after the to-be-transmitted data is sent completely, without padding completely the first time domain resource.

As another example, if the length of the remaining available resource after the first indication information and the to-be-transmitted data are sent completely by using the first time domain resource is greater than the required length of the second indication information, the second indication information is extended and the extended second indication information is further sent, where a length of the extended second indication information may be determined according to the length of the remaining available resource. As an example, extending the second indication information may include but is not limited to repetition or partial repetition.

As another example, if the length of the remaining available resource after the first indication information and the to-be-transmitted data are sent completely by using the first time domain resource is less than the required length of the second indication information, in this case, data padding may be performed by using the manner described in the manner 3, that is, the first indication information, all of the to-be-transmitted data and the padding data information are sent, and the second indication information are not sent.

It should be understood that in this manner 4, there may be a first time interval between the first indication information and the first data information, and there may be a second time interval between the first data information and the second indication information, where the implementation of the first time interval and the second time interval refers to the related description of the aforementioned embodiments, which will not be repeated herein.

Scenario 2: the starting position of the first time domain resource is indicated by the network device, recorded as mode 2.

That is, the network device only schedules the starting position of the time domain resource. In other words, the network device does not know the ending position of the data transmission.

Optionally, in this scenario 2, the terminal device needs to indicate the ending position of the data transmission based on the aforementioned rule 2.

Optionally, in this scenario 2, the terminal device may indicate the starting position of the data transmission based on the aforementioned rule 1 or rule 3.

In this scenario 2, information composition of the target information set may be any one of the aforementioned case 2 and case 3.

In the following, the indication manner of the starting and the ending of the data transmission, or, the sending manner of the target indication information in scenario 2, is described in combination with manner 5 and manner 6.

Manner 5: the target information set includes the first data information and the second indication information, where the first data information precedes the second indication information. That is, in manner 5, the terminal device only uses the second indication information to indicate the ending position of the data transmission.

In other words, in this manner 5, the terminal device indicates the ending position of the data transmission based on the aforementioned rule 2.

Optionally, in this manner 5, the terminal device may indicate the starting position of the data transmission based on the aforementioned rule 1 or rule 3. Or, the starting position of the data transmission may not be indicated.

Optionally, in this manner 5, the starting position of the data transmission may be determined according to the starting position of the first time domain resource.

Optionally, in this manner 5, a complete data transmission includes all of the to-be-transmitted data d and the second indication information.

Optionally, in this manner 5, the length of the second indication information may be fixed.

Optionally, in this manner 5, the second indication information may have a plurality of candidate lengths, or in other words, the second indication information may have a plurality of candidate lengths. Optionally, the terminal device may use the second indication information of which candidate length according to the size of the to-be-transmitted data.

Figure 25:
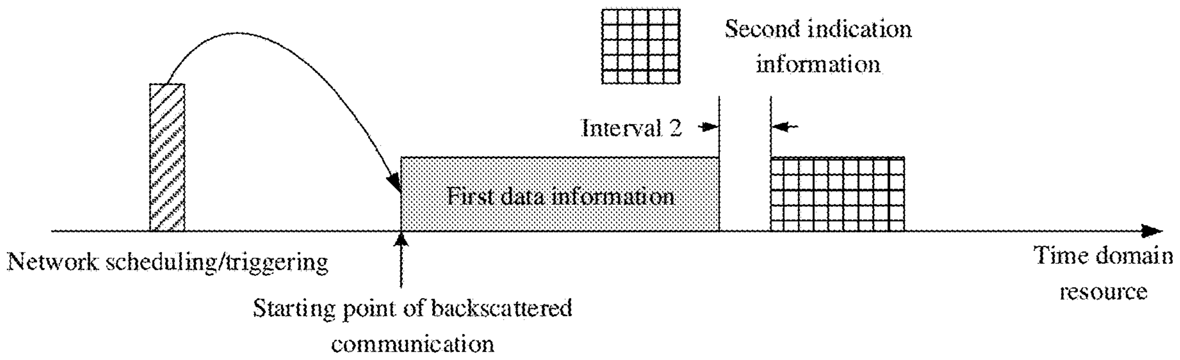
FIG. 25 is a schematic composition diagram of a target information set in mode 2 provided in the embodiments of the present application.

An example in combination with FIG. 25 is taken for explanation. As shown in FIG. 25, the terminal device receives a scheduling signal from the network device, and the scheduling signal is used to schedule the starting position of the time domain resource. Then, when performing the backscattering communication, the terminal device may start sending the to-be-transmitted data at the starting position of the first time domain resource, and send the second indication information to identify the end of data transmission after the to-be-transmitted data is sent completely.

Optionally, in this manner 5, there may also be a second time interval between the second indication information and the first data information. The implementation of the second time interval refers to the related description of the aforementioned embodiments, which will not be repeated herein for the sake of brevity.

Manner 6: the target information set includes the first indication information, the first data information, and the second indication information, where the first indication information precedes the first data information, and the second indication information follows the first data information.

That is, in this manner 6, the terminal device uses the first indication information to indicate the starting position of the data transmission, and uses the second indication information to indicate the ending position of the data transmission.

In other words, in this manner 6, the terminal device indicates the starting position of the data transmission based on rule 1, and indicates the ending position of the data transmission based on rule 2.

Optionally, in this manner 6, a complete data transmission includes the first indication information and all of the to-be-transmitted data, and the second indication information.

Figure 26:
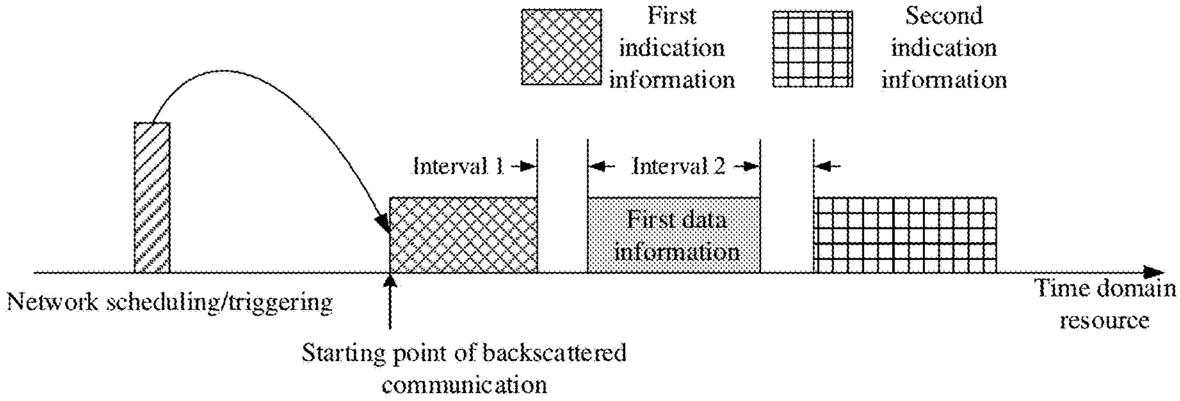
FIG. 26 is yet another schematic composition diagram of a target information set in mode 2 provided in the embodiments of the present application.

An example in combination with FIG. 26 is taken for explanation. As shown in FIG. 26, the terminal device receives a scheduling signal from the network device, and the scheduling signal is used to schedule the starting position of the time domain resource. Then, when performing the backscattering communication, the terminal device may start sending the first indication information at the starting position of the time domain resource to identify the starting of the data transmission, then send the to-be-transmitted data, and send the second indication information to indicate the ending of the data transmission after the to-be-transmitted data is sent completely.

Optionally, in this manner 6, there may be a first time interval between the first indication information and the first data information, and there may be a second time interval between the first data information and the second indication information, where the implementation of the first time interval and the second time interval refers to the related description of the aforementioned embodiments, which will not be repeated herein.

Optionally, in manner 6, the length of the first indication information may be fixed.

Optionally, in this manner 6, the first indication information may have a plurality of candidate lengths, or in other words, there may be first indication information of a plurality of candidate lengths. Optionally, the terminal device may use the first indication information of which candidate length to use according to the size of the to-be-transmitted data.

Optionally, in this manner 6, the length of the second indication information may be fixed.

Optionally, in this manner 6, the second indication information may have a plurality of candidate lengths, or in other words, there may be second indication information of a plurality of candidate lengths. Optionally, the terminal device may use the second indication information of which candidate length to use according to the size of the to-be-transmitted data.

Scenario 3: the first time domain resource being a time domain resource selected by the terminal device. Corresponding to the aforementioned mode 4.

That is, the network device does not know a resource for the terminal device to perform data transmission, in other words, the network device do not know the starting position and the ending position of the data transmission.

For example, in some dangerous or emergency scenarios, the terminal device needs to report alarm information timely. In this case, the terminal device may independently select a resource to send the alarm information.

Optionally, in this scenario 3, the terminal device indicates the starting position of the data transmission based on rule 1, and indicates the ending position of the data transmission based on rule 2.

In the following, the indication manner of the starting and the ending of the data transmission, or, the sending manner of the target indication information in the scenario 3, is described in combination with manner 7.

Manner 7: the target information set includes the first indication information, the first data information, and the second indication information, where the first indication information precedes the first data information, and the second indication information follows the first data information.

That is, in this manner 7, the terminal device uses the first indication information to indicate the starting position of the data transmission, and uses the second indication information to indicate the ending position of the data transmission.

In other words, in this manner 7, the terminal device indicates the starting position of the data transmission based on the rule 1, and indicates the ending position of the data transmission based on the rule 2.

Figure 27:
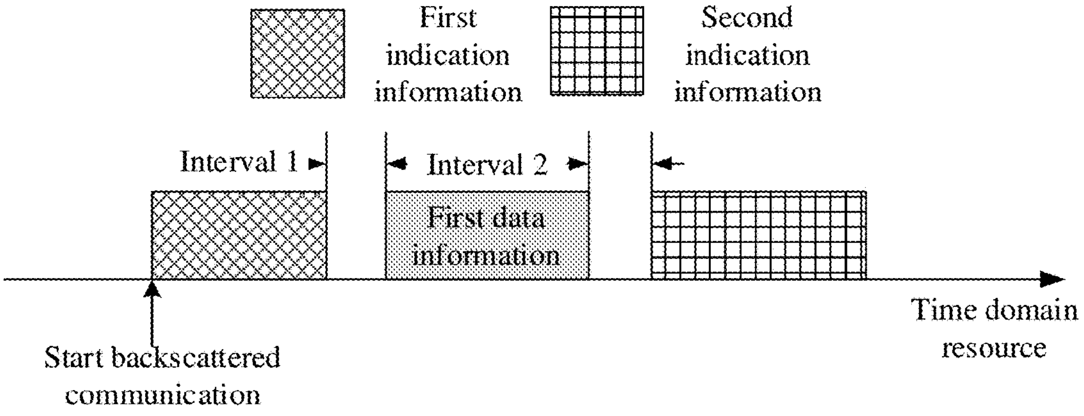
FIG. 27 is yet another schematic composition diagram of a target information set in mode 4 provided in the embodiments of the present application.

An example in combination with FIG. 27 is taken for explanation. As shown in FIG. 27, when the terminal device is performing the backscattering communication, the terminal device may start sending the first indication information at the starting position of an autonomously selected time domain resource to identify the starting of the data transmission, then send the to-be-transmitted data, and send the second indication information to identify the ending of the data transmission after the to-be-transmitted data is sent completely.

Optionally, in this manner 7, there may be a first time interval between the first indication information and the first data information, and there may be a second time interval between the first data information and the second indication information, where the implementation of the first time interval and the second time interval refers to the related description of the aforementioned embodiments, which will not be repeated herein.

Optionally, in this manner 7, the length of the first indication information may be fixed.

Optionally, in this manner 7, the first indication information may have a plurality of candidate lengths, or in other words, there may be first indication information of a plurality of candidate lengths. Optionally, the terminal device may use the first indication information of which candidate length to use according to the size of the to-be-transmitted data.

Optionally, in this manner 7, the length of the second indication information may be fixed.

Optionally, in this manner 7, the second indication information may have a plurality of candidate lengths, or in other words, there may be second indication information of a plurality of candidate lengths. Optionally, the terminal device may use the second indication information of which candidate length to use according to the size of the to-be-transmitted data.

In the above, in embodiment 1, the indication of the normal data transmission state (i.e., the starting of the data transmission and the ending of the data transmission) is described. In the following, in embodiment 2, the indication of the abnormal data transmission state is described.

Embodiment 2: Indication of Abnormal Data Transmission State

It should be understood that in the embodiments of the present application, the terminal device may indicate the data transmission abnormality through explicit indication information, or the terminal device may also implicitly indicate the data transmission abnormality, for example, implicitly indicate the data transmission abnormality by not sending the indication information that must be sent or by a timing for sending the indication information, etc.

Optionally, the data transmission abnormality herein may be a d data transmission abnormality caused by a power problem, such as a data transmission abnormality caused by power fluctuation, or a data transmission abnormality caused by insufficient power.

Manner 1: if the terminal device indicates the ending position of the data transmission based on the aforementioned rule 2, but the target information set sent by the terminal device does not include the second indication information, or in other words, the second indication information is not sent after the to-be-transmitted data is sent, in this case, the data transmission may be considered abnormal.

In some embodiments, in a case where the data transmission is normal, the terminal will send the second indication information to indicate the ending of the data transmission after the terminal device sends the to-be-transmitted data completely. In a case where the data transmission is abnormal, such as a data sending abnormality due to a power fluctuation (a sudden interruption of the data sending), the terminal device does not send the second indication information after sending the to-be-transmitted data, that is, the target information set does not include the second indication information. Therefore, the network device may determine whether the data transmission is abnormal according to whether the received target information set has the second indication information.

Optionally, this manner 1 may be applied to the aforementioned mode 2 and mode 4, or may also be applicable to mode 1 and mode 3.

Figure 28:
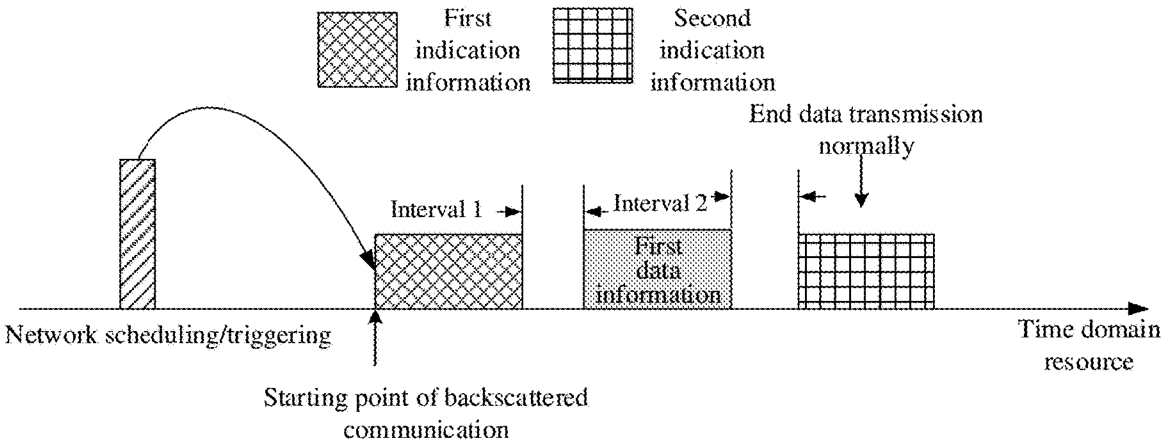
FIG. 28 is a schematic diagram of normal data transmission in mode 2 provided in the embodiments of the present application.

Taking the mode 2 as an example, FIG. 28 is a schematic diagram of a normal data transmission. As shown in FIG. 28, the terminal device receives a scheduling signal from the network device, and the scheduling signal is used to schedule the starting position of the time domain resource used for backscattering. When performing the backscattering communication, the terminal device may send the first indication information at the starting position of the time domain resource to identify the starting of the data transmission, then send the to-be-transmitted data, and send the second indication information to identify the ending of data transmission after the to-be-transmitted data is sent completely.

Figure 29:
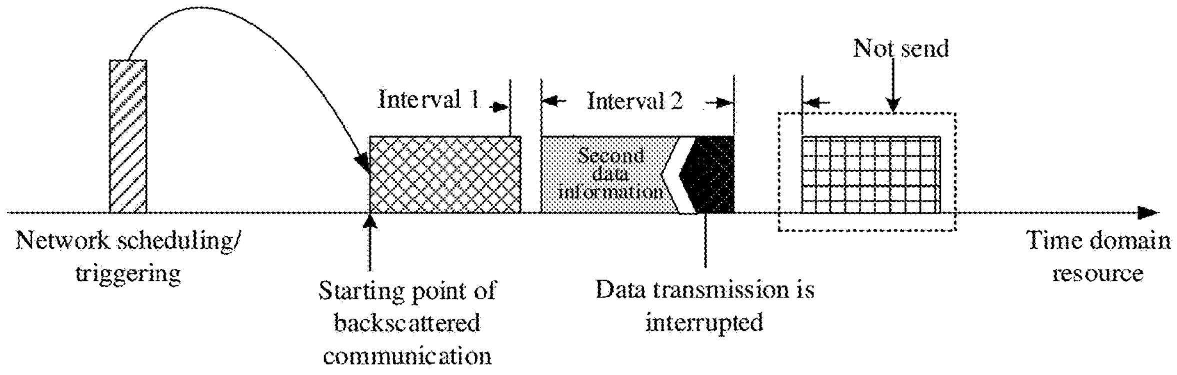
FIG. 29 is a schematic diagram of abnormal data transmission in mode 2 provided in the embodiments of the present application.

Taking the mode 2 as an example, FIG. 29 is a schematic diagram of an abnormal data transmission. As shown in FIG. 29, the terminal device receives a scheduling signal from the network device, and the scheduling signal is used to schedule the starting position of the time domain resource used for backscattering. When performing the backscattering communication, the terminal device may send the first indication information at the starting position of the time domain resource to identify the starting of the data transmission, and then send the to-be-transmitted data. When a part of the to-be-transmitted data is sent, the terminal device does not send the second indication information due to an interruption of the data transmission caused by a power fluctuation. In this case, the target information set received by the network device does not include the second indication information, and therefore the network device determines that data transmission abnormality occurs at the terminal device.

Manner 2: if the terminal device indicates the starting position of the data transmission based on the aforementioned rule 1, but the target information set including a plurality pieces of first indication information indicates that the data transmission is abnormal.

Optionally, this manner 2 may be applied to the aforementioned mode 2, or, may also be applied to mode 4, mode 1 and mode 3.

For example, the terminal device sends a first information set on the first time domain resource, where the first information set includes the first indication information and the second data information, and the second data information includes a part of the to-be-transmitted data; then the data transmission is interrupted due to a power fluctuation; after the power stabilizes, the terminal device sends a second information set on the first time domain resource. The second information set includes the first indication information, the first data information, and the second indication information, where the first indication information precedes the first data information, and the second indication information follows the first data information, and the first data information includes all of the to-be-transmitted data.

In some embodiments, in a case where the data transmission is normal, the terminal device may perform data transmission in an order of first sending the first indication information, then sending the data to be transmitted, and finally sending the second indication information. In a case of a power fluctuation, the terminal device interrupts the data transmission; and in a case where the power returns to normal, the terminal device may send the to-be-transmitted data again on the first time domain resource. When the to-be-transmitted data is sent again, the terminal device may still perform data transmission in the order of the first indication information, the to-be-transmitted data, and the second indication information. Therefore, the network device may determine whether the data transmission is abnormal according to information composition in the received target information set. For example, when the target information set includes a plurality pieces of first indication information, the network device may determine that the data transmission on the first time domain resource is abnormal.

It should be understood that the embodiments of the present application do not limit a number of data transmission abnormalities that may occur on the first time domain resource. For example, a plurality of power fluctuations may occur on the first time domain resource. When the power returns to stability, the terminal device may have sent the first indication information many times. The present application only takes the occurrence of one power fluctuation and the target information set including two pieces of first indication information as an example for explanation, but the present application is not limited thereto.

Figure 30:
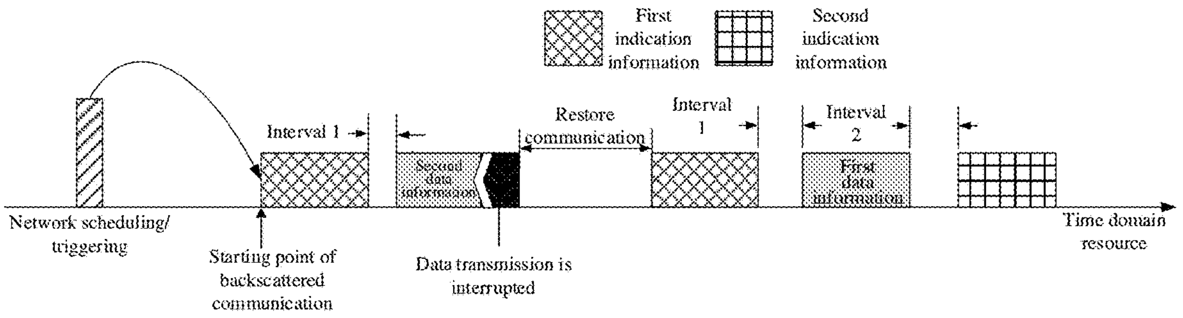
FIG. 30 is another schematic diagram of abnormal data transmission in mode 2 provided in the embodiments of the present application.

The normal data transmission shown in FIG. 28 is taken for comparison. In a case where the data transmission is abnormal, a process of the data transmission may also be as shown in FIG. 30. In some embodiments, the terminal device receives a scheduling signal from the network device, and the scheduling signal is used to schedule the starting position of the time domain resource for backscattering. When performing the backscattering communication, the terminal device may send the first indication information at the starting position of the time domain resource to identify the starting of the data transmission, and then send the to-be-transmitted data. When sending a part of the to-be-transmitted data, since the data transmission is interrupted due to a power fluctuation, the terminal device continues to send the first indication information on the time domain resource to identify the starting of the data transmission when the power is stabilized and the communication is restored, then sends the to-be-transmitted data and sends the second indication information to identify the ending of the data transmission after all of the to-be-transmitted data is sent completely.

Manner 3: the data transmission abnormality due to a power fluctuation is indicated through the third indication information.

In this case, the target information set includes the second data information and the third indication information. The second data information is sent before a power fluctuation occurs; and the third indication information is sent in a case where the power is stabilized and is used to indicate that: the data transmission is abnormal or the data sent last time is not complete data.

That is, in a case where the power fluctuates, the terminal device only sends a part of the to-be-transmitted data, and further sends the third indication information to indicate that the data transmission is abnormal when the power is stabilized.

Optionally, the target information set further includes the first indication information, where the first indication information precedes the second data information.

Correspondingly, in a case where the network device receives the second data information and the third indication information, the second data information may be considered to be not complete to-be-transmitted data, or that the transmission of the second data information is interrupted due to a power fluctuation.

In some embodiments, the starting position and the length of the first time domain resource are indicated by the network device, or the first time domain resource is preconfigured, or the starting position of the first time domain resource is indicated by the network device. That is, manner 3 may be applied to the data transmission abnormality in mode 1, mode 2 and mode 3.

In some embodiments, this manner 3 may be applied to a terminal device with a strong energy harvesting capability, or a terminal device with high charging efficiency, or a terminal device that is closer to the energy supply signal. That is, the terminal device may quickly obtain energy for communication and usually does not have a problem of an energy shortage. Therefore, after the power is stabilized, the terminal device may continue to send the third indication information on the resource allocated by the network device or the pre-allocated resource to indicate to the network device that a last data transmission was abnormal due to a power fluctuation.

Figure 31:
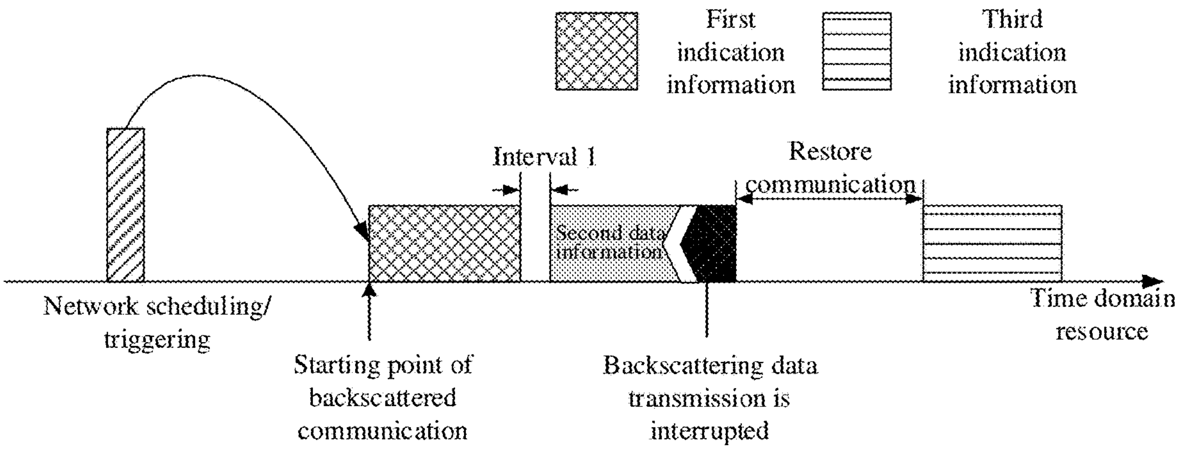
FIG. 31 is yet another schematic diagram of abnormal data transmission in mode 2 provided in the embodiments of the present application.

The normal data transmission shown in FIG. 28 is taken for comparison. In a case where the data transmission is abnormal, a process of the data transmission may be as shown in FIG. 31. In some embodiments, the terminal device receives a scheduling signal from the network device, and the scheduling signal is used to schedule the starting position of the time domain resource used for backscattering. When performing the backscattering communication, the terminal device may send the first indication information at the starting position of the time domain resource to identify the starting of the data transmission, then send the to-be-transmitted data. When sending a part of the to-be-transmitted data, since the data transmission is interrupted due to a power fluctuation, the terminal device sends the third indication information on the time domain resource to identify that a previous data transmission is abnormal when the power is stabilized and the communication is restored.

Manner 4: the data transmission abnormality due to a power shortage is indicated through the fourth indication information.

Optionally, the terminal device sends the target information set on the first time domain resource, and in a case where the power of the terminal device is insufficient to complete a complete data transmission, the target information set includes the second data information and the fourth indication information.

Optionally, the first indication information may be further included before the second data information.

Optionally, the terminal device sends the target information set on the first time domain resource, and when a power of the terminal device is insufficient to complete a complete data transmission, the target information set may only include the fourth indication information.

In some embodiments, the starting position and the length of the first time domain resource are indicated by the network device, or the first time domain resource is preconfigured, or the starting position of the first time domain resource is indicated by the network device. That is, manner 4 may be applied to the data transmission abnormality in mode 1, mode 2 and mode 3.

In some embodiments, this manner 4 may be applied to a terminal device with a poor energy harvesting capability, or a terminal device with low charging efficiency, or a terminal device that is far away from the energy supply signal. In a case where the energy is insufficient to complete a complete data transmission, the terminal device sends the fourth indication information to indicate to the network device that: the data transmission is interrupted due to a power shortage, or the data sent at this time is incomplete.

In some embodiments, for a zero-power terminal with low charging efficiency, or a terminal that is far away from an energy supply signal source, an energy storage module is required to store energy. After a certain time of energy storage, when enough power for communication is collected, the backscattering communication is performed. When the backscattering communication is performed, the downlink signal (such as a trigger signal, a scheduling signal, etc.) of the network device needs to be monitored, and when the scheduling signal of the network device is received, the backscattering communication is performed. Since the terminal device is energy-limited, there may be a case where the energy is insufficient to complete the backscattering communication. In this case, the terminal device needs to inform the network device that its own power is insufficient to complete a complete data transmission, or that the data transmitted in this backscattering communication is incomplete.

Figure 32:
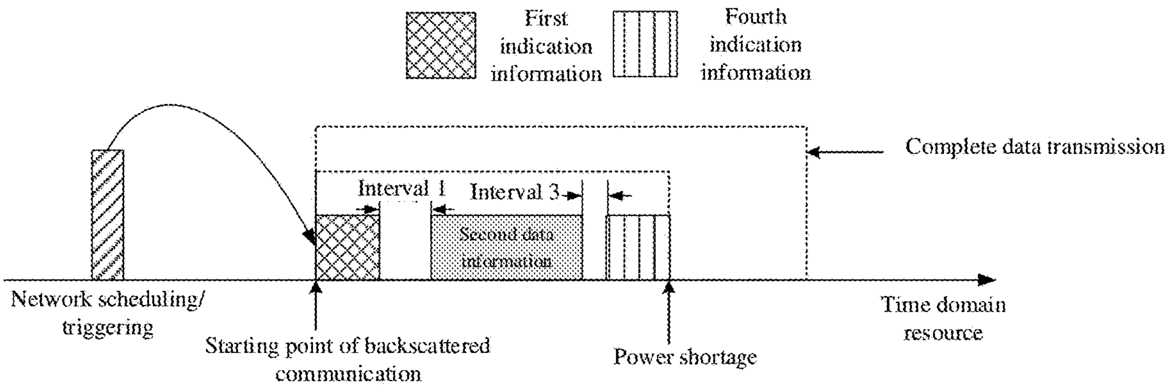
FIG. 32 is yet another schematic diagram of abnormal data transmission in mode 2 provided in the embodiments of the present application.

The normal data transmission shown in FIG. 28 is taken for comparison. In a case where the data transmission is abnormal, a process of the data transmission may be as shown in FIG. 32. In some embodiments, the terminal device receives a scheduling signal from the network device, and the scheduling signal is used to schedule the starting position of the time domain resource used for backscattering. When performing the backscattering communication, the terminal device may send the first indication information at the starting position of the time domain resource to identify the starting of the data transmission, and then send the to-be-transmitted data. When sending a part of the to-be-transmitted data, if the power is insufficient to complete a complete data transmission, the terminal device will send the fourth indication information on the time domain resource to identify that the data transmission is interrupted due to a power shortage.

In some embodiments, as shown in FIG. 32, there is a third time interval between the fourth indication information and the second data information.

In some embodiments, the third time interval is 0. That is, the fourth indication information is adjacent to the second data information.

In some embodiments, the third time interval is predefined or configured by the network device.

In some embodiments, a unit of the third time interval may be any time unit, which is not limited in the present application. As an example but not a limitation, a unit of the third time interval is a minimum time unit for the terminal device to perform data communication, or a unit of the third time interval may be a microsecond (μs), a millisecond (ms), a second(s), a time slot, a subframe, a frame, etc.

In some embodiments, when the power is insufficient to complete a complete data transmission, that is, recharging is required after the current backscattering communication, the terminal device may send the fourth indication information after sending a part of the data, or only send the fourth indication information to represent that the current backscattering communication is terminated due to a power shortage, and recharging needs to be waited to be completed before the next backscattering communication may be performed.

In some embodiments of the present application, the method 200 further includes:

in a case where there is data transmission abnormality on the terminal device, indicating a data transmission abnormality state of the terminal device by using the third indication information or the fourth indication information according to an energy harvesting capability of the terminal device.

For example, in a case where the terminal device has a first energy harvesting capability, indicating the data transmission abnormality by using the third indication information, or in a case where the terminal device has a second energy harvesting capability, indicating the data transmission abnormality by using the fourth indication information, where the first energy harvesting capability is higher than the second energy harvesting capability.

Optionally, the terminal device with the first energy harvesting capability may refer to a terminal device with a high energy harvesting capability, or a terminal device with high charging efficiency, or a terminal device that is closer to the energy supply signal; and the terminal device with the second energy harvesting capability may refer to a terminal device with a low energy harvesting capability, or a terminal device with low charging efficiency, or a terminal device that is farther away from the energy supply signal.

That is, the terminal device with the first energy harvesting capability can quickly obtain energy for communication, and the terminal device with the second energy harvesting capability needs a longer time to obtain energy for communication.

Therefore, for a terminal device with a higher energy harvesting capability, in a case where the data transmission is abnormal, the third indication information may be used to indicate the data transmission abnormality to the network device. For a terminal device with a lower energy harvesting capability, in a case where the data transmission is abnormal, the fourth indication information may be used to indicate the data transmission abnormality to the network device.

In some embodiments, if the network device receives the third indication information, the network device may send a third scheduling signal to the terminal device after receiving the third indication information or after a second duration after receiving the third indication information. The third scheduling signal is used to schedule the terminal device to retransmit data.

In some embodiments, if the network device receives the fourth indication information, the network device may send a fourth scheduling signal to the terminal device after a third duration after receiving the fourth indication information. The fourth scheduling signal is used to schedule the terminal device to retransmit data. The second time duration is less than the third time duration.

In some embodiments, a terminal device with a higher energy harvesting capability usually uses the third indication information to indicate the data transmission abnormality; a terminal device with a lower energy harvesting capability usually uses the fourth indication information to indicate the data transmission abnormality; and for the terminal device with the higher energy harvesting capability, energy for communication may be obtained quickly; and for the terminal device with the lower energy harvesting capability, a longer time is required to obtain energy for communication. Therefore, the network device may schedule the terminal device with the higher energy harvesting capability as early as possible, and needs to wait for a period of time before scheduling the terminal device with the lower energy harvesting capability.

In some embodiments, the second duration and the third duration are predefined.

In some other embodiments, the second duration and the third duration are determined according to an energy harvesting capability of the terminal device.

In some scenarios, the terminal device is unable to respond to the scheduling of the terminal device due to energy shortage. After obtaining energy for communication, or after energy storage and charging are completed to be capable of communicating, the terminal device may inform the network device that it is ready to communicate, or is in an activated state, or has a data transmission requirement, so that the network device may schedule the terminal device timely.

The above only illustrates the indication manner of data transmission abnormality in the two scenarios of power fluctuation and circuit shortage. In actual applications, other indication information may also be designed to indicate other abnormal communication situations. The design manners are similar, and thus, the present application is not limited thereto.

In some embodiments of the present application, the target indication information includes a second type of indication information, where the second type of indication information is used to indicate a data transmission requirement state of the terminal device.

It should be understood that the second type of indication information may be related to energy storage of the terminal device, or may be unrelated to energy storage of the terminal device. For example, after the energy storage is completed, the terminal device may send the second type of indication information to indicate that the terminal device has a data transmission requirement, or the terminal device may also send the second type of indication information in any scenario where there is a data transmission requirement. For example, in a scenario, such as an alarm, dangerous situation monitoring, etc., the terminal device needs to report information to the network device timely. In this case, the terminal device may send the second type of indication information to the network device.

In the following, an indication manner of the transmission requirement state of the terminal device is described in combination with embodiment 3.

Embodiment 3: indication of transmission requirement state of the terminal device.

Embodiment 3-1: the second type of indication information includes fifth indication information, where the fifth indication information is used to indicate that the terminal device has a data transmission requirement.

Optionally, for a delay-insensitive data transmission, the terminal device may request a transmission resource from the network device through the fifth indication information.

Optionally, for a delay-sensitive data transmission, the terminal device may adopt manner 7 in the aforementioned manner 4 for the data transmission.

That is, when the terminal device has urgent data to transmit, the terminal device may independently select a resource for data transmission, where the first indication information and the second indication information indicate the starting position and the ending position of the data transmission.

In some embodiments, the fifth indication information may be a fifth sequence.

In some embodiments, types, lengths, and generation manners of the fifth sequence and the aforementioned first sequence, second sequence, third sequence, and fourth sequence may be the same, or may be different, and the present application does not limit thereto.

In some embodiments, the fifth indication information is also used to indicate identification information of the terminal device, such as a UE ID.

For example, the fifth indication information is the fifth sequence, and the fifth sequence may be generated according to an identifier of a cell to which the terminal device belongs and an identifier of the terminal device. Therefore, the network device may distinguish which terminal device has a data transmission requirement according to the fifth sequence.

Figure 33:
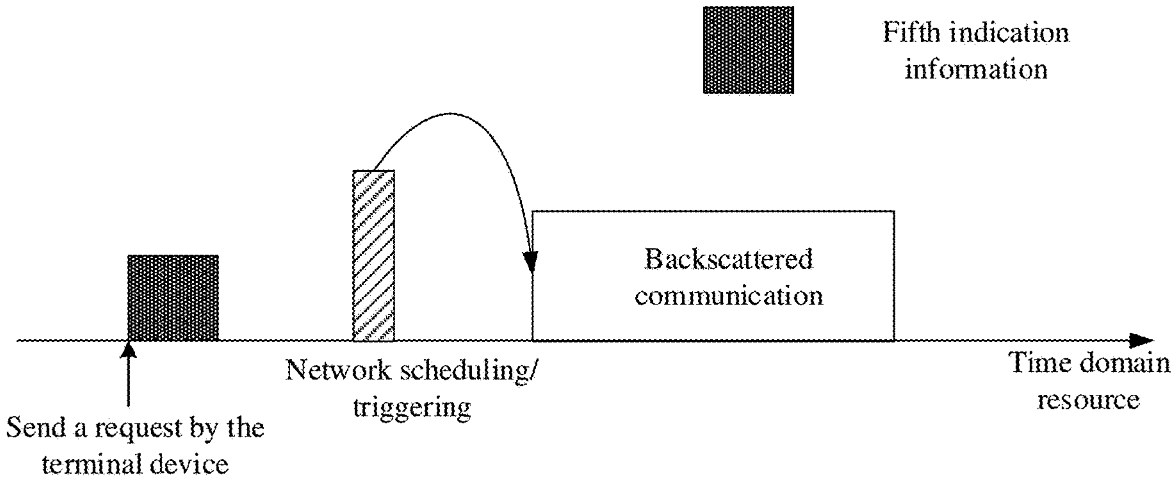
FIG. 33 is a schematic diagram for indicating a data transmission requirement through fifth indication information provided in the embodiments of the present application.

As shown in FIG. 33, when the terminal device has a data transmission requirement, the terminal device may send fifth indication information to the network device. The fifth indication information may be used to identify the identification information of the terminal device. When the network device receives the fifth indication information, the network device may send a first scheduling signal to the terminal device to indicate transmission resource information for the terminal device to perform data transmission.

In some embodiments, the identification information of the terminal device may be carried by separate information. For example, after sending the fifth indication information, the terminal device sends third data information to the network device, where the third data information includes the identifier of the terminal device. Optionally, the third data information may be small packet data information. Therefore, the network device may learn which terminal device has a data transmission requirement according to the fifth indication information and the third data information.

In some embodiments, there is a fourth time interval between the fifth indication information and the third data information.

In some embodiments, the fourth time interval is 0. That is, the fifth indication information is adjacent to the third data information.

In some embodiments, the fourth time interval is predefined or configured by the network device.

In some embodiments, a unit of the fourth time interval may be any time unit, which is not limited in the present application. As an example but not a limitation, a unit of the third time interval is a minimum time unit for the terminal device to perform data communication, or a unit of the third time interval may be a microsecond (μs), a millisecond (ms), a second(s), a time slot, a subframe, a frame, etc.

Figure 34:
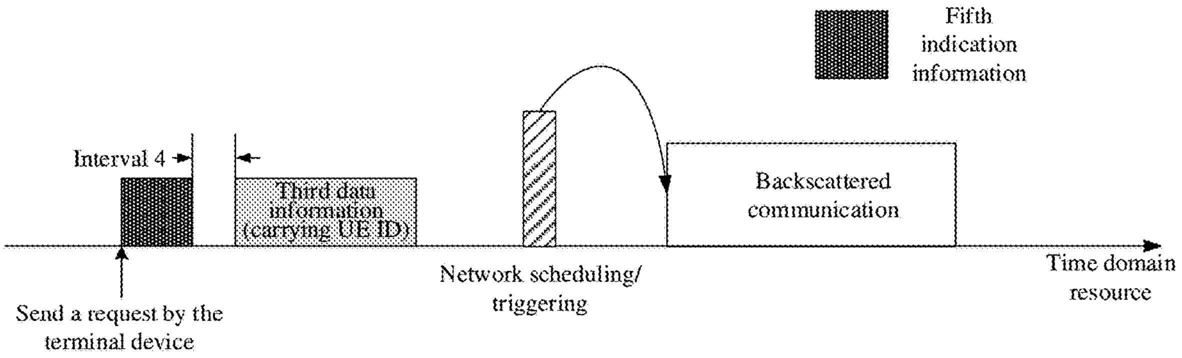
FIG. 34 is a schematic diagram for indicating a data transmission requirement through fifth indication information and third data information provided in the embodiments of the present application.

As shown in FIG. 34, when the terminal device has a data transmission requirement, the terminal device may send the fifth indication information to the network device, and further, send the third data information to the network device. The third data information includes the identification information of the terminal device. In a case where the network device receives the fifth indication information and the third data information, the network device may learn the target terminal device that a data transmission requirement, and further send the first scheduling signal to the target terminal device for indicating the transmission resource information used for the target terminal device to perform data transmission.

In some embodiments, if the fifth indication information is not used to indicate the identification information of the terminal device, and the terminal device does not send the third data information carrying the identification information of the terminal device, the network device cannot learn the terminal device with the data transmission requirement after the network device receives the fifth indication information. In this case, the network device may broadcast a second scheduling signal, and the second scheduling signal includes a transmission resource for data transmission. The second scheduling signal may be a specially designed signal, and the terminal device that sends only the fifth indication information may use the transmission resource scheduled by the second scheduling signal.

It should be understood that the embodiments of the present application do not limit the sending occasion for the fifth indication information. For example, the terminal device may send the fifth indication information at any time when there is a data transmission requirement.

In some embodiments, the fifth indication information is sent by the terminal device in a case where the energy harvesting is completed (or the charging is completed). That is, in a case where the terminal device is fully charged and has a data transmission requirement, the terminal device may send the fifth indication information to the network device.

In other embodiments, the terminal device monitors scheduling information of the network device in a first duration after an energy harvesting is completed, and in a case where the scheduling information of the network device is not monitored and data transmission is required, the terminal device sends the fifth indication information to the network device.

Figure 35:
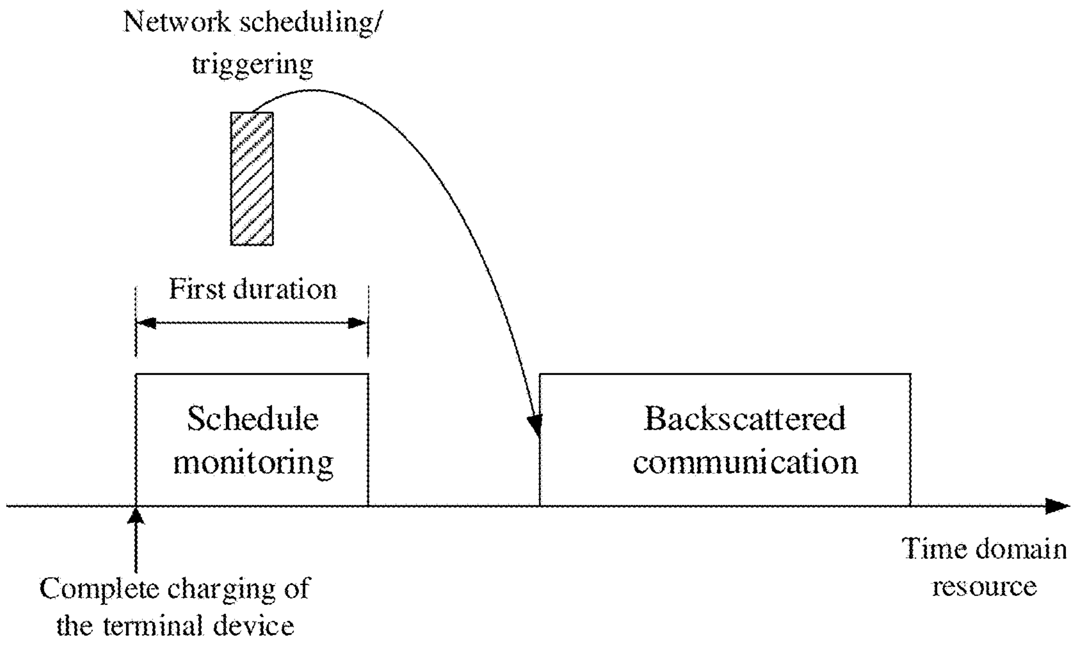
FIG. 35 is a schematic diagram of a sending occasion of fifth indication information provided in the embodiments of the present application.
Figure 36:
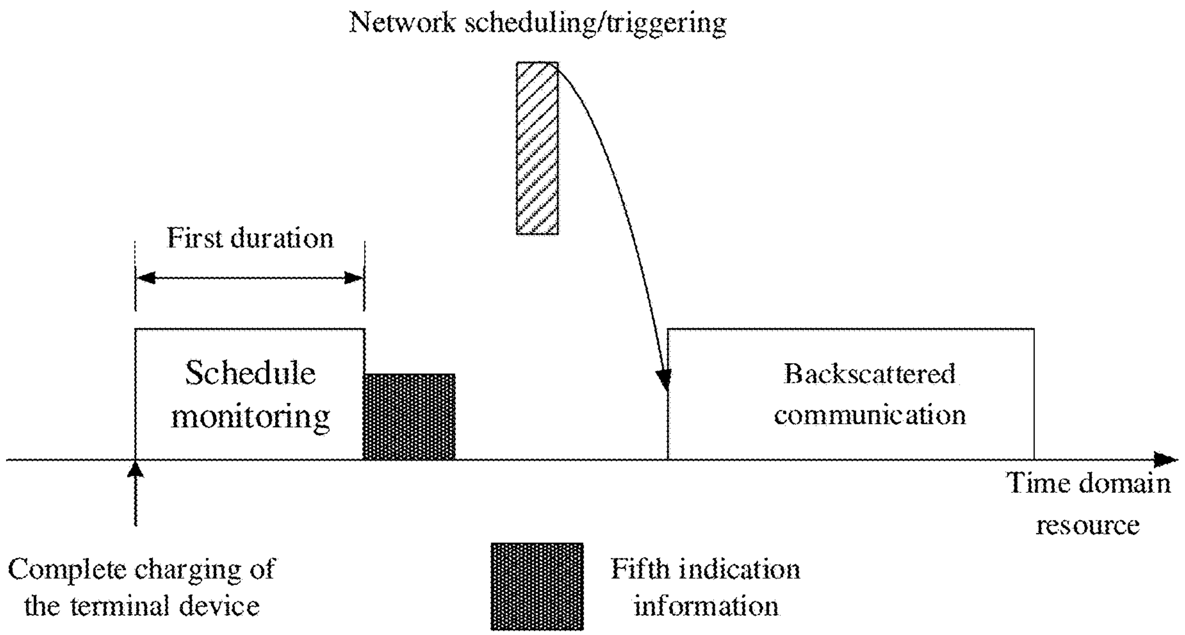
FIG. 36 is another schematic diagram of a sending occasion of fifth indication information provided in the embodiments of the present application.

As shown in FIGS. 35 and 36, after the terminal device is fully charged, the terminal device monitors the scheduling signal of the network device. As shown in FIG. 35, if a scheduling signal from the network device is received in the first duration, data transmission is performed based on the transmission resource indicated by the scheduling signal. Or, as shown in FIG. 36, if no scheduling signal from the network device is received in the first duration, the fifth indication information is sent to indicate to the network device that there is a data transmission requirement.

Embodiment 3-2: the second type of indication information includes sixth indication information, where the sixth indication information is used to indicate that the terminal device performs data transmission on an available time domain resource successfully and there is to-be-transmitted data.

For example, when a size of a time domain resource scheduled by the network device is less than the required length of the to-be-transmitted data, or a size of a resource that is schedule-free is less than the required length of the to-be-transmitted data, the terminal device sends the sixth indication information after using all available resources to send the data, so as to indicate that the data transmission on the available resource is successful and that there is still data to be transmitted.

In some embodiments, the sixth indication information includes a sixth sequence.

In some embodiments, types, lengths, and generation manners of the sixth sequence, the aforementioned first sequence, second sequence, third sequence, fourth sequence and fifth sequence may be the same, or may be different, and the present application does not limit thereto.

In some embodiments of the present application, the method 200 further includes:

sending, by the terminal device, a third information set on a second time domain resource, when a length of the second time domain resource is less than the required length of the to-be-transmitted data, the third information set includes fourth data information and the sixth indication information, where the sixth indication information follows the fourth data information, and the fourth data information includes a part of to-be-transmitted data;

Further, the terminal device sends a fourth information set on a third time domain resource, where the fourth information set includes remaining to-be-transmitted data, and the third time domain resource follows the second time domain resource.

In some embodiments, the second time domain resource and the third time domain resource are resources scheduled by the network device.

For example, after receiving the sixth indication information on the second time domain resource, the network device may schedule the terminal device to send the remaining to-be-transmitted data on the third time domain resource.

In some other embodiments, the second time domain resource and the third time domain resource are schedule-free resources.

For example, after sending the sixth indication information on the second time domain resource that is schedule-free, the terminal device further sends the remaining to-be-transmitted data on the third time domain resource that is schedule-free.

Optionally, the third information set may also include the aforementioned first type of indication information, and the fourth information set may also include the aforementioned first type of indication information to indicate the starting and the ending of the data transmission. The indication manner of the first type of indication information refers to the related description of the aforementioned embodiments, which will not be repeated herein.

Embodiment 3-3: if the terminal device indicates the ending position of the data transmission based on the aforementioned rule 2, but the terminal device does not send the second indication information after sending the data information, in this case, the terminal device is considered to still has data to be transmitted.

In some embodiments of the present application, the target indication information may also include a third type of indication information to indicate an energy storage state of the terminal device, for example, charging is completed, or a energy harvesting is completed, etc.

Optionally, in a case where the terminal device is completely charged or completes an energy harvesting, the terminal device may be considered to be in an activated state and may perform data transmission.

In some embodiments, when the network device receives the third type of indication information from the terminal device, the network device may learn that the terminal device may perform data transmission. Further, when there is downlink data to be sent, the network device may schedule the terminal device to receive the downlink data.

In summary, the terminal device indicates the communication state of the terminal device to the network device through the target indication information, which is beneficial for the network device to timely learn the communication state of the terminal device, assist the communication between the network device and the terminal device, and further promote the communication performance.

For example, before data transmission, the terminal device may first send first indication information to inform the network device that the data transmission starts, and then perform data transmission after a first time interval.

For another example, the terminal device may send the second indication information after a second time interval after completing the data transmission to inform the network device that the data transmission is ended.

For another example, when the data transmission cannot be completed due to a power fluctuation or other abnormality, the third indication information is sent after the communication is restored, so as to inform the network device that an interruption of the communication occurred before due to an abnormality.

For another example, when the terminal device is unable to send completely all of the to-be-transmitted data due to an energy shortage, the terminal device sends the fourth indication information before interrupting the data transmission, to inform the network device that the power is insufficient and the completing of the charging needs to be waited to perform subsequent data transmission.

For another example, after completing the energy harvesting and not receiving a scheduling signal from the network device in a certain time, the terminal device may send the fifth indication information to inform the network device that the terminal device is in an activated state and may perform data transmission.

For another example, after the terminal device completes data transmission based on the resource scheduled by the network device and if there is still data to be sent, the terminal device may send sixth indication information at the ending of the data transmission to indicate to the network device that there is still data to be transmitted.

The above, in combination with FIGS. 6 to 36, describes in detail a communication state indication method according to an embodiment of the present application from the perspective of the terminal device. The following, in combination with FIG. 37, describes in detail a communication state indication method according to another embodiment of the present application from the perspective of the network device. It should be understood that the description on a network device side corresponds to the description on a terminal device side, and similar descriptions may be referred to above, which will not repeated herein to avoid repetition.

Figure 37:
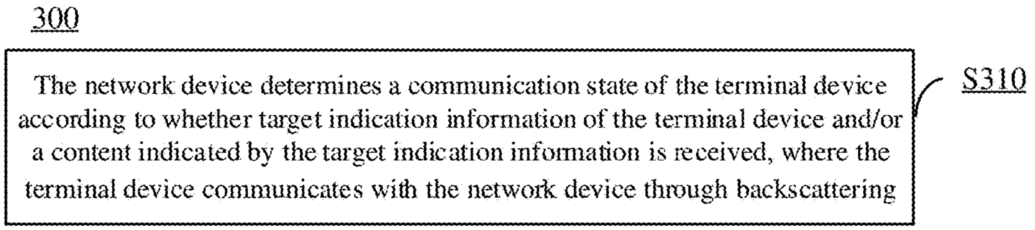
FIG. 37 is a schematic diagram of another communication state indication method provided according to the embodiments of the present application.

FIG. 37 is a schematic flow diagram of method 300 for indicating a communication state according to another embodiment of the present application. The method 300 may be performed by the network device in the communication system shown in FIG. 1. As shown in FIG. 37, the method 300 includes the following content:

S310, determining, by a network device, a communication state of a terminal device according to whether target indication information of the terminal device and/or a content indicated by the target indication information is received, where the terminal device communicates with the network device through backscattering.

In some other embodiments, the target indication information includes a first type of indication information, where the first type of indication information is used to indicate a data transmission state of the terminal device.

It should be understood that in the embodiments of the present application, the communication state of the terminal device may include a state related to data transmission, for example, starting data transmission, ending data transmission, a data transmission abnormality, etc. Or the communication state of the terminal device may also include a power-related state, for example, a certain data transmission state due to a power problem of the terminal device, for example, interruption of data transmission due to power shortage or a power fluctuation of the terminal device. Or the communication state of the terminal device may also include a transmission demand state or a communication demand state, etc., which is not limited in the present application.

In the method 300, the implementation of the target indication information and the first type of indication information refers to the related implementation in the method 200, which will not repeated herein for the sake of brevity.

In some embodiments, the data transmission state of the terminal device includes at least one of:

- a start of data transmission, an end of data transmission, or data transmission abnormality.

In some embodiments, the first type of indication information includes at least one of:

- first indication information, used to indicate the terminal device to start data transmission;
- second indication information, used to indicate the terminal device to end data transmission;
- third indication information, used to indicate that data transmission abnormality is caused due to power fluctuation; or
- fourth indication information, used to indicate the data transmission abnormality is caused due to insufficient power.

It should be understood that the design of the first indication information, the second indication information, the third indication information and the fourth indication information refers to the related descriptions in the method 200, which will not repeated herein for the sake of brevity.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments of the present application, the determining, by the network device, the communication state of the terminal device according to whether the target indication information of the terminal device and/or the content indicated by the target indication information is received, includes:

receiving a target information set on a first time domain resource, where the target information set is configured to transmit target data information;

determining a data transmission state of the terminal device according to whether the target information set includes the first type of indication information or a content indicated by the first type of indication information.

In some embodiments, the network device receives the target information set on a first time domain resource. Various implementations of the information composition of the target information set refer to the implementation in the method 200, which will not be repeated herein.

In some embodiments, the determining the data transmission state of the terminal device according to whether the target information set includes the first type of indication information or the content indicated by the first type of indication information, includes:

determining, by the network device, a starting position of data transmission according to the first indication information in the target information set, or a starting position of the first time domain resource; and/or determining an ending position of data transmission according to the second indication information in the target information set or an ending position of the first time domain resource.

In some embodiments, in a case where the target information set includes the first indication information, take a position of a first time interval after the first indication information in the target information set as a starting position of data transmission; or, in a case where the target information set does not includes the first indication information, taking a starting position of the first time domain resource as the starting position of data transmission.

In some embodiments, if the terminal device needs to indicate the starting position of data transmission through the first indication information (that is, the terminal device indicates the starting position of the data transmission based on the aforementioned rule 1), and the target information set only includes one piece of first indication information, a position of a first time interval after the first indication information in the target information set is used as the starting position of the data transmission.

In some embodiments, if the terminal device needs to indicate the starting position of the data transmission through the first indication information (that is, the terminal device indicates the starting position of the data transmission based on the aforementioned rule 1), and the target information set includes a plurality pieces of first indication information, a position of a first time interval after a last piece of the first indication information in the target information set is used as the starting position of the data transmission.

In some embodiments, if the terminal device needs to indicate the starting position of the data transmission through the first indication information (that is, the terminal device indicates the starting position of the data transmission based on the aforementioned rule 1), and the target information set includes a plurality pieces of first indication information, the data transmission abnormality is determined.

In some embodiments, if the target information set includes the second indication information, a position of a second time interval before the second indication information in the target information set is used as the ending position of the data transmission; or, if the target information set does not include the second indication information, an ending position of the first time domain resource is used as the ending position of the data transmission.

In some embodiments, if the terminal device needs to indicate the ending position of the data transmission through the second indication information (that is, the terminal device indicates the ending position of the data transmission based on the aforementioned rule 2), and the target information set includes the second indication information, a position of a second time interval before the second indication information in the target information set is used as the ending position of the data transmission.

In some embodiments, if the terminal device needs to indicate the ending position of data transmission through the second indication information (that is, the terminal device indicates the ending position of data transmission based on the aforementioned rule 2), but the target information set does not include the second indication information, the data transmission abnormality is determined, or there is still data to be transmitted.

The following describes a manner for determining the data transmission state of the terminal device in combination with a scenario.

Scenario 1: the network device is able to learn the starting position and the ending position of the first time domain resource.

Scenario 1 may include mode 1 and mode 3, where a resource configuration manner of mode 1 and mode 3 refers to the related description of the method 200, which will not repeated herein.

Optionally, in this scenario 1, if the terminal device indicates the starting position of the data transmission based on the aforementioned rule 1, and the target information set includes the first indication information, a position of a first time interval after the first indication information in the target information set is used as the starting position of the data transmission.

Optionally, in this scenario 1, if the terminal device indicates the starting position of the data transmission based on the aforementioned rule 3, in a case where the target information set does not include the first indication information, the starting position of the first time domain resource is used as the starting position of the data transmission; or, in a case where the target information set includes the first indication information, a position of a first time interval after the starting position of the first time domain resource is used as the starting position of the data transmission.

Optionally, in this scenario 1, if the terminal device indicates the ending position of the data transmission based on the aforementioned rule 2, and the target information set includes the second indication information, a position of a second time interval before the second indication information in the target information set is used as the ending position of the data transmission.

Optionally, in this scenario 1, if the terminal device indicates the ending position of the data transmission based on the aforementioned rule 4, in a case where the target information set does not include the second indication information, an ending position of the first time domain resource is used as the ending position of the data transmission; or, in a case where the target information set includes the second indication information, a position of a second time interval before the ending position of the first time domain resource is used as the ending position of the data transmission.

Optionally, in this scenario 1, if the terminal device indicates the ending position of the data transmission based on the aforementioned rule 2, but the target information set does not include the second indication information, the data transmission abnormality is determined, or there is still data to be transmitted.

The implementation of the first time interval and the second time interval in the method 300 refers to the implementation of the first time interval and the second time interval in method 200, which will not be repeated herein for the sake of brevity.

Optionally, in this scenario 1, if the target information set includes data information and the third indication information, the data transmission abnormality due to power fluctuation is determined. In this case, the network device considers that the data information is not complete data.

Optionally, in this scenario 1, if the target information set includes data information and the fourth indication information, the data transmission abnormality due to a power shortage is determined. In this case, the network device considers that the data information is not complete data.

Optionally, in this scenario 1, if the target information set includes the fourth indication information, the data transmission abnormality due to a power shortage is determined. In this case, the network device considers that the terminal device does not perform data transmission due to a power shortage. In this case, the network device may reschedule a resource for the data transmission of the terminal device.

Scenario 2: the starting position of the first time domain resource is indicated by the network device, corresponding to mode 2 in method 200.

Optionally, in this scenario 2, if the terminal device indicates the starting position of the data transmission based on the aforementioned rule 1, and the target information set includes the first indication information, a position of a first time interval after the first indication information in the target information set is used as the starting position of the data transmission.

Optionally, in this scenario 2, if the terminal device indicates the starting position of the data transmission based on the aforementioned rule 1, in a case where the target information set does not include the first indication information, a starting position of the first time domain resource is used as the starting position of the data transmission, or, a position of a first time interval after ta starting position of the first time domain resource is used as the starting position of the data transmission, or, in a case where the target information set includes the first indication information, a position of a first time interval after the first indication information is used as the starting position of the data transmission.

Optionally, in this scenario 2, if the terminal device indicates the starting position of the data transmission based on the aforementioned rule 1, and indicates the ending position of the data transmission based on the aforementioned rule 2, and the target information set includes a plurality pieces of first indication information, the data transmission abnormality is determined; and/or a position of a first time interval after a last piece of the first indication information in the target information set is used as the starting position of the data transmission, and a position of a second time interval before the second indication information in the target information set is used as the ending position of the data transmission.

Optionally, in this scenario 2, if the terminal device indicates the ending position of the data transmission based on the aforementioned rule 2, and the target information set includes the second indication information, a position of a second time interval before the second indication information in the target information set is used as the ending position of the data transmission.

Optionally, in this scenario 2, if the terminal device indicates the ending position of the data transmission based on the aforementioned rule 2, but the target information set does not include the second indication information, the data transmission abnormality is determined, or there is still data to be transmitted.

Optionally, in this scenario 2, if the target information set includes data information and the third indication information, the data transmission abnormality due to power fluctuation is determined. In this case, the network device considers that the data information is not complete data.

Optionally, in this scenario 2, if the target information set includes data information and the fourth indication information, the data transmission abnormality due to a power shortage is determined. In this case, the network device considers that the data information is not complete data.

Optionally, in this scenario 2, if the target information set includes the fourth indication information, the data transmission abnormality due to a power shortage is determined. In this case, the network device considers that the terminal device does not perform data transmission due to a power shortage. In this case, the network device may reschedule a resource for the data transmission of the terminal device.

Scenario 3: the first time domain resource being a time domain resource selected by the terminal device. In other words, the first time domain resource is neither a resource scheduled by the network device nor a pre-allocated resource, corresponding to mode 4 in method 200.

Optionally, in this scenario 3, if the terminal device indicates the starting position of the data transmission based on the aforementioned rule 1, and indicates the ending position of the data transmission based on the aforementioned rule 2, and the target information set includes the first indication information and the second indication information, a position of a first time interval after the first indication information in the target information set is used as the starting position of the data transmission, and a position of a second time interval before the second indication information in the target information set is used as the ending position of the data transmission.

Optionally, in this scenario 3, if the terminal device indicates the starting position of the data transmission based on the aforementioned rule 1, and indicates the ending position of the data transmission based on the aforementioned rule 2, and the target information set includes a plurality pieces of first indication information, the data transmission abnormality is indicated; and/or a position of a first time interval after a last piece of the first indication information in the target information set is used as the starting position of the data transmission, and a position of a second time interval before the second indication information in the target information set is used as the ending position of the data transmission.

Optionally, in this scenario 3, if the target information set includes data information and the third indication information, the data transmission abnormality due to power fluctuation is determined. In this case, the network device considers that the data information is not complete data.

Optionally, in this scenario 3, if the target information set includes data information and the fourth indication information, the data transmission abnormality due to a power shortage is determined. In this case, the network device considers that the data information is not complete data.

Optionally, in this scenario 3, if the target information set includes the fourth indication information, the data transmission abnormality due to a power shortage is determined. In this case, the network device considers that the terminal device does not perform data transmission due to a power shortage. In this case, the network device may reschedule a resource for the data transmission of the terminal device.

In some embodiments, there is a third time interval between the fourth indication information and the data information. The implementation of the third time interval refers to the related description of method 200, which will not be repeated herein for the sake of brevity.

In some embodiments of the present application, the method 300 further includes:

in a case where the target information set includes data information and the third indication information, sending, by the network device, a third scheduling signal to the terminal device after receiving the third indication information or after a second duration, where the third scheduling signal is used to schedule the terminal device to retransmit data; or in a case where the target information set includes data information and the fourth indication information, sending, by the network device, a fourth scheduling signal to the terminal device after a third duration, where the fourth scheduling signal is used to schedule the terminal device to retransmit data, and the second duration is less than the third duration.

In some embodiments, a terminal device with a higher energy harvesting capability usually uses the third indication information to indicate the data transmission abnormality; a terminal device with a lower energy harvesting capability usually uses the fourth indication information to indicate the data transmission abnormality; and for the terminal device with the higher energy harvesting capability, energy for communication may be obtained quickly; and for the terminal device with the lower energy harvesting capability, a longer time is required to obtain energy for communication. Therefore, the network device may schedule the terminal device with the higher energy harvesting capability as early as possible, and needs to wait for a period of time before scheduling the terminal device with the lower energy harvesting capability.

In some embodiments, the second duration and the third duration are predefined; or the second duration and the third duration are determined according to an energy harvesting capability of the terminal device.

In some embodiments of the present application, the target indication information includes a second type of indication information, where the second type of indication information is used to indicate a data transmission requirement state of the terminal device.

For example, the network device determines whether the terminal device has a data transmission requirement according to whether the second type of indication information is received.

As an example, in a case where the second type of indication information is received, the terminal device is determined to have a data transmission requirement; and in a case where the second type of indication information is not received, the terminal device is determined to have no data transmission requirement.

In some embodiments, the second type of indication information includes fifth indication information, where the fifth indication information is used to indicate that the terminal device has a data transmission requirement.

In some embodiments, the fifth indication information is a fifth sequence.

In some embodiments, the fifth indication information is further used to indicate identification information of the terminal device.

For example, the fifth indication information is a fifth sequence, and the fifth sequence is generated according to the identifier of the cell to which the terminal device belongs and/or the identifier of the terminal device.

In some embodiments, the method 300 further includes:

after receiving the fifth indication information, receiving, by the network device, third data information sent from the terminal device, where the third data information includes an identifier of the terminal device.

In some embodiments, there is a fourth time interval between the fifth indication information and the third data information. The implementation of the fourth time interval refers to the implementation in method 200 and will not be repeated herein.

In some embodiments, the method 300 further includes:

sending, by the network device, a first scheduling signal to the terminal device, where the first scheduling signal includes transmission resource information for data transmission. In this embodiment, the network device may learn which terminal device has a data transmission request, for example, the fifth indication information is used to indicate the identification information of the terminal device, or, after the fifth indication information, the terminal device further sends the third indication information.

In some embodiments, the method 300 further includes:

broadcasting, by the network device, a second scheduling signal, where the second scheduling signal includes transmission resource information for data transmission, where a transmission resource indicated by the second scheduling information is only used for data transmission by the terminal device that sends the fifth indication information. In this embodiment, the network device is unaware of the terminal device having a data transmission request, and therefore, the network device broadcasts the second scheduling signal, and only the terminal device sending the fifth indication information may use the resource scheduled by the second scheduling signal for data transmission.

In some embodiments, the second type of indication information includes sixth indication information, where the sixth indication information is used to indicate that the terminal device performs data transmission on an available time domain resource successfully and there is to-be-transmitted data.

Optionally, in a case where the sixth indication information is received, the network device may send a scheduling signal to the terminal device to schedule the terminal device to transmit remaining to-be-transmitted data.

In some embodiments, the method 300 further includes:

receiving, by the network device on a second time domain resource, a third information set sent from the terminal device, where the third information set includes fourth data information and the sixth indication information, where the sixth indication information follows the fourth data information, and the fourth data information includes a part of to-be-transmitted data;

Further, the network device sends a fourth scheduling signal to the terminal device according to the sixth indication information, and the fourth scheduling signal is used to indicate a third time domain resource. Then, the network device receives a fourth information set sent by the terminal device on the third time domain resource, and the fourth information set includes remaining to-be-transmitted data.

Optionally, the third information set may also include the aforementioned first type of indication information, and the fourth information set may also include the aforementioned first type of indication information to indicate the starting and the ending of the data transmission. The indication manner of the first type of indication information refers to the related description of the aforementioned embodiments, which will not be repeated herein.

In some embodiments, the sixth indication information includes a sixth sequence.

In some embodiments, types, lengths, and generation manners of the sixth sequence, the aforementioned first sequence, second sequence, third sequence, fourth sequence and fifth sequence may be the same, or may be different, and the present application does not limit thereto.

In some embodiments, if the terminal device indicates the ending position of the data transmission based on the aforementioned rule 2, but the terminal device does not send the second indication information after sending the data information, in this case, the terminal device is considered to still has data to be transmitted.

That is, if the second indication information is not included after the data information in the target information set, in this case, the network device may consider that the terminal device still has data to be transmitted.

In summary, the network device determines the communication state of the terminal device by whether the network device receives the target indication information of the terminal device or the content indicated by the target indication information, and may further assist the communication between the network device and the terminal device according to the communication state of the terminal device, so as to promote the communication performance. For example, the network device may determine the starting position of the data transmission according to the first indication information, or determine the ending position of the data transmission according to the second indication information, or determine the data transmission abnormality according to the third indication information or the fourth indication information, or determine that the terminal device has a data transmission requirement according to the fifth indication information or the sixth indication information, etc.

The embodiments of methods of the present application is described in detail above in combination with FIGS. 15 to 37, and embodiments of apparatuses of the present application is described in detail below in combination with FIGS. 38 to 42. It should be understood that the embodiments of apparatuses correspond to the embodiments of methods, and similar descriptions may refer to the descriptions of embodiments of methods.

Figure 38:
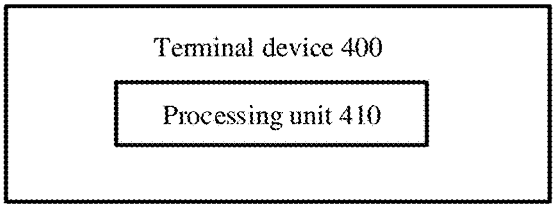
FIG. 38 is a schematic block diagram of a terminal device provided according to the embodiments of the present application.

FIG. 38 illustrates a schematic block diagram of a terminal device 400 according to the embodiments of the present application. As shown in FIG. 38, the terminal device 400 includes:

a processing unit 410, configured to indicate, by whether to send target indication information and/or a content indicated by the target indication information, the communication state of the terminal device to a network device, where the terminal device communicates with the network device through backscattering.

In some embodiments, the target indication information includes a first type of indication information, where the first type of indication information is used to indicate a data transmission state of the terminal device.

In some embodiments, the data transmission state of the terminal device includes at least one of:

a start of data transmission, an end of data transmission, or data transmission abnormality.

In some embodiments, the first type of indication information includes at least one of:

first indication information, used to indicate the terminal device to start data transmission;

second indication information, used to indicate the terminal device to end data transmission;

third indication information, used to indicate that data transmission abnormality is caused due to power fluctuation; or fourth indication information, used to indicate the data transmission abnormality is caused due to insufficient power.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments, the terminal device further includes:

a communication unit, configured to send a target information set on a first time domain resource;

where the target information set includes first data information and the first type of indication information, and the first data information includes all of to-be-transmitted data; or, the target information set includes second data information and the first type of indication information, and the second data information includes a part of the to-be-transmitted data.

In some embodiments, in a case where the target information set includes the first data information, the target information set further includes padding data information.

In some embodiments, the padding data information includes at least one of:

zero data, check data, or a part of the to-be-transmitted data.

In some embodiments, the target information set includes the first indication information and the first data information, where the first indication information precedes the first data information; or the target information set includes the first indication information, the first data information and padding data information, where the first indication information precedes the first data information and the padding data information follows the first data information; or the target information set includes the first data information and the second indication information, where the first data information precedes the second indication information; or the target information set includes the first indication information, the first data information, and the second indication information, where the first indication information precedes the first data information, and the second indication information follows the first data information.

In some embodiments, a starting position and a length of the first time domain resource are indicated by the network device; or the first time domain resource is preconfigured; or a starting position of the first time domain resource is indicated by the network device through a scheduling signal; or the first time domain resource is selected by the terminal device.

In some embodiments, there is a first time interval between the first indication information and the first data information.

In some embodiments, the first time interval is 0.

In some embodiments, the first time interval is predefined or configured by the network device.

In some embodiments, a unit of the first time interval is a minimum time unit for the terminal device to perform data communication.

In some embodiments, there is a second time interval between the first data information and the second indication information.

In some embodiments, the second time interval is 0.

In some embodiments, the second time interval is predefined or configured by the network device.

In some embodiments, a unit of the second time interval is a minimum time unit for the terminal device to perform data communication.

In some embodiments, a length of the second indication information is fixed; or a length of the second indication information is variable.

In some embodiments, a length of the first indication information is fixed; or a length of the first indication information is variable.

In some embodiments, in a case where the terminal device needs to indicate an ending position of data transmission through the second indication information, but the target information set does not include the second indication information, the data transmission abnormality is represented, or there is to-be-transmitted data.

In some embodiments, in a case where the terminal device needs to indicate a starting position of data transmission through the first indication information, and the target information set includes a plurality pieces of first indication information, the data transmission abnormality is represented.

In some embodiments, the target information set includes a first information set and a second information set, where the first information set is sent by the terminal device before a power fluctuates, and the second information set is sent by the terminal device after a power stabilizes, where the first information set includes the second data information, and the second information set includes the first data information.

In some embodiments, the first information set further includes the first indication information.

In some embodiments, the second information set further includes the first indication information and the second indication information, where the first indication information precedes the first data information, and the second indication information follows the first data information.

In some embodiments, a starting position and a length of the first time domain resource are indicated by the network device; or the first time domain resource is preconfigured; or a starting position of the first time domain resource is indicated by the network device through a scheduling signal; or the first time domain resource is selected by the terminal device.

In some embodiments, the target information set includes the second data information and the third indication information, the second data information is sent by the terminal device in a case where a power fluctuates, and the third indication information is sent by the terminal device in a case where a power stabilizes.

In some embodiments, the target information set further includes the first indication information, where the first indication information precedes the second data information.

In some embodiments, a starting position and a length of the first time domain resource are indicated by the network device through a scheduling signal; or the first time domain resource is preconfigured; or, a starting position of the first time domain resource is indicated by the network device through a scheduling signal.

In some embodiments, in the case of power shortage, the target information set includes the second data information and the fourth indication information, or the target information set includes the fourth indication information.

In some embodiments, there is a third time interval between the fourth indication information and the second data information.

In some embodiments, the third time interval is 0.

In some embodiments, the third time interval is predefined or configured by the network device.

In some embodiments, a unit of the third time interval is a minimum time unit for the terminal device to perform data communication.

In some embodiments, the processing unit 410 is further configured to:

in a case where there is data transmission abnormality on the terminal device, indicate a data transmission abnormality state of the terminal device by using the third indication information or the fourth indication information according to an energy harvesting capability of the terminal device.

In some embodiments, the processing unit 410 is further configured to:

in a case where the terminal device has a first energy harvesting capability, indicate the data transmission abnormality by using the third indication information, or in a case where the terminal device has a second energy harvesting capability, indicate the data transmission abnormality by using the fourth indication information, where the first energy harvesting capability is higher than the second energy harvesting capability.

In some embodiments, the target indication information includes a second type of indication information, where the second type of indication information is used to indicate a data transmission requirement state of the terminal device.

In some embodiments, the second type of indication information includes fifth indication information, where the fifth indication information is used to indicate that the terminal device has a data transmission requirement.

In some embodiments, the fifth indication information is sent by the terminal device in a case where an energy harvesting is completed.

In some embodiments, the terminal device further includes:

a communication unit, configured to: monitor scheduling information of the network device in a first duration after an energy harvesting is completed, and in a case where the scheduling information of the network device is not monitored and data transmission is required, send the fifth indication information to the network device.

In some embodiments, the terminal device further includes:

a communication unit, configured to: after sending the fifth indication information, send third data information to the network device, where the third data information includes an identifier of the terminal device.

In some embodiments, there is a fourth time interval between the fifth indication information and the third data.

In some embodiments, the fourth time interval is 0.

In some embodiments, the fourth time interval is predefined or configured by the network device.

In some embodiments, a unit of the fourth time interval is a minimum time unit for the terminal device to perform data communication.

In some embodiments, the fifth indication information is further used to indicate identification information of the terminal device.

In some embodiments, the fifth indication information includes a fifth sequence, where the fifth sequence is generated according to a cell identifier to which the terminal device belongs and/or an identifier of the terminal device.

In some other embodiments, the terminal device 400 further includes:

a communication unit, configured to: receive a first scheduling signal sent from the network device to the terminal device, where the first scheduling signal includes transmission resource information for data transmission.

In some embodiments, the terminal device 400 further includes:

a communication unit, configured to: receive a second scheduling signal broadcast by the network device, where the second scheduling signal includes a transmission resource for data transmission.

In some embodiments, the second type of indication information includes sixth indication information, where the sixth indication information is used to indicate that the terminal device performs data transmission on an available time domain resource successfully and there is to-be-transmitted data.

In some embodiments, the terminal device further includes:

a communication unit, configured to: send a third information set on a second time domain resource, where the third information set includes fourth data information and the sixth indication information, where the sixth indication information follows the fourth data information, and the fourth data information includes a part of to-be-transmitted data;

send a fourth information set on a third time domain resource, where the fourth information set includes remaining to-be-transmitted data, and the third time domain resource follows the second time domain resource.

In some embodiments, the second time domain resource and the third time domain resource are resources scheduled by the network device; or the second time domain resource and the third time domain resource are schedule-free resources.

In some embodiments, the sixth indication information includes a sixth sequence.

In some embodiments, the terminal device obtains energy for communication through energy harvesting.

Optionally, in some embodiments, the above-mentioned communication unit may be a communication interface or transceiver, or an input/output interface of a communication chip or a system on a chip. The above processing unit may be one or more processors.

It should be understood that the terminal device 400 according to the embodiments of the present application may correspond to the terminal device of the method embodiments of the present application, and the above and other operations and/or functions of various units in the terminal device 400 are respectively to implement the corresponding procedure of the terminal device in the method 200 shown in FIG. 15 to FIG. 36, which will not be repeated herein for the sake of brevity.

Figure 39:
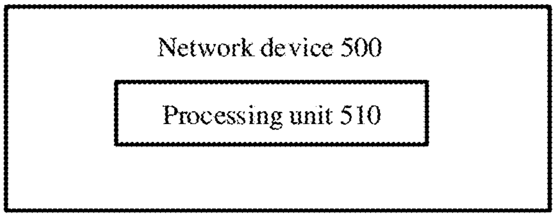
FIG. 39 is a schematic block diagram of a network device provided according to the embodiments of the present application.

FIG. 39 is a schematic block diagram of a network device according to the embodiments of the present application. The network device 500 of FIG. 39 includes:

a processing unit 510, configured to: determine a communication state of a terminal device according to whether target indication information of the terminal device and/or a content indicated by the target indication information is received, where the terminal device communicates with the network device through backscattering.

In some embodiments, the target indication information includes a first type of indication information, where the first type of indication information is used to indicate a data transmission state of the terminal device.

In some embodiments, the data transmission state of the terminal device includes at least one of:

a start of data transmission, an end of data transmission, or data transmission abnormality.

In some embodiments, the first type of indication information includes at least one of:

first indication information, used to indicate the terminal device to start data transmission;

second indication information, used to indicate the terminal device to end data transmission;

third indication information, used to indicate that data transmission abnormality is caused due to power fluctuation; or fourth indication information, used to indicate the data transmission abnormality is caused due to insufficient power.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments, the network device further includes:

a communication unit, configured to: receive a target information set on a first time domain resource, where the target information set is configured to transmit target data information;

the processing unit 510 is further configured to: determine a data transmission state of the terminal device according to whether the target information set includes the first type of indication information or a content indicated by the first type of indication information.

In some embodiments, the processing unit 510 is further configured to:

in a case where the target information set includes the first indication information, take a position of a first time interval after the first indication information in the target information set as a starting position of data transmission; or in a case where the target information set does not include the first indication information, take a starting position of the first time domain resource as the starting position of data transmission.

In some embodiments, the processing unit 510 is further configured to:

in a case where the terminal device needs to indicate a starting position of data transmission through the first indication information, and the target information set includes only one piece of the first indication information, take a position of a first time interval after the first indication information in the target information set as the starting position of data transmission; or in a case where the terminal device needs to indicate the starting position of data transmission through the first indication information, and the target information set includes a plurality pieces of first indication information, take a position of a first time interval after a last first indication information in the target information set as the starting position of data transmission.

In some embodiments, the processing unit 510 is further configured to:

determine that data transmission is abnormal, in a case where the terminal device needs to indicate a starting position of data transmission through the first indication information and the target information set includes a plurality pieces of first indication information.

In some embodiments, the terminal device needing to indicate the starting position of data transmission through the first indication information, includes:

the terminal device needing to indicate the starting position of data transmission through the first indication information under at least one condition of:

a starting position and a length of the first time domain resource being scheduled by the network device;

the first time domain resource being preconfigured;

a starting position of the first time domain resource being indicated by the network device through a scheduling signal; or the first time domain resource being a time domain resource selected by the terminal device.

In some embodiments, the processing unit 510 is further configured to:

in a case where the target information set includes the second indication information, take a position of a second time interval before the second indication information in the target information set as an ending position of data transmission; or in a case where the target information set does not include the second indication information, take an ending position of the first time domain resource as an ending position of data transmission.

In some embodiments, the processing unit 510 is further configured to:

in a case where the terminal device needs to indicate an ending position of data transmission through the second indication information, and the target information set includes the second indication information, take a position of a second time interval before the second indication information in the target information set as an ending position of data transmission.

In some embodiments, the processing unit 510 is further configured to:

in a case where the terminal device needs to indicate an ending position of data transmission through the second indication information, but the target information set does not include the second indication information, determine that data transmission is abnormal, or there is to-be-transmitted data.

In some embodiments, the terminal device needing to indicate the ending position of data transmission through the second indication information, includes:

the terminal device needing to indicate the ending position of data transmission through the second indication information under at least one condition of:

a starting position and a length of the first time domain resource being scheduled by the network device;

the first time domain resource being preconfigured;

a starting position of the first time domain resource being indicated by the network device through a scheduling signal; or the first time domain resource being a time domain resource selected by the terminal device.

In some embodiments, the first time interval is 0.

In some embodiments, the second time interval is 0.

In some embodiments, the first time interval is predefined or configured by the network device.

In some embodiments, the second time interval is predefined or configured by the network device.

In some embodiments, a unit of the first time interval is a minimum time unit for the terminal device to perform data communication.

In some embodiments, a unit of the second time interval is a minimum time unit for the terminal device to perform data communication.

In some embodiments, a length of the second indication information is fixed; or a length of the second indication information is variable.

In some embodiments, a length of the first indication information is fixed; or a length of the first indication information is variable.

In some embodiments, the first indication information includes a first sequence, and the second indication information includes a second sequence, where the first sequence is different from the second sequence.

In some embodiments, the third indication information includes a third sequence, and the fourth indication information includes a fourth sequence, where the third sequence is different from the fourth sequence.

In some embodiments, the processing unit 510 is further configured to:

in a case where the target information set includes data information and the third indication information, determine that data transmission is abnormal due to power fluctuation; or, in a case where the target information set includes data information and the fourth indication information, determine that data transmission is abnormal due to insufficient power.

In some embodiments, there is a third time interval between the fourth indication information and the data information.

In some embodiments, the third time interval is 0.

In some embodiments, the third time interval is predefined or configured by the network device.

In some embodiments, a unit of the third time interval is a minimum time unit for the terminal device to perform data communication.

In some embodiments, the network device 500 further includes:

a communication unit, configured to: send a third scheduling signal to the terminal device after receiving the third indication information or after the second time period, where the third scheduling signal is used to schedule the terminal device to retransmit data; or send a fourth scheduling signal to the terminal device after receiving the third duration of the fourth indication information, where the fourth scheduling signal is used to schedule the terminal device to retransmit data, where the second duration is less than the third duration.

In some embodiments, the second duration and the third duration are predefined; or the second duration and the third duration are determined according to an energy harvesting capability of the terminal device.

In some embodiments, the target indication information includes a second type of indication information, where the second type of indication information is used to indicate a data transmission requirement state of the terminal device.

In some embodiments, the processing unit 510 is further configured to:

determine whether the terminal device has the data transmission requirement according to whether the second type of indication information is received.

In some embodiments, the processing unit 510 is further configured to:

in a case where the second type of indication information is received, determine that the terminal device has the data transmission requirement; or in a case where the second type of indication information is not received, determine that the terminal device has no data transmission requirement.

In some embodiments, the second type of indication information includes fifth indication information, where the fifth indication information is used to indicate that the terminal device has a data transmission requirement.

In some embodiments, the fifth indication information is further used to indicate identification information of the terminal device.

In some embodiments, the fifth indication information includes a fifth sequence, where the fifth sequence is generated according to a cell identifier to which the terminal device belongs and/or an identifier of the terminal device.

In some embodiments, the network device further includes:

a communication unit, configured to: after receiving the fifth indication information, receive third data information sent from the terminal device, where the third data information includes an identifier of the terminal device.

In some embodiments, there is a fourth time interval between the fifth indication information and the third data information.

In some embodiments, the fourth time interval is 0.

In some embodiments, the fourth time interval is predefined or configured by the network device.

In some embodiments, a unit of the fourth time interval is a minimum time unit for the terminal device to perform data communication.

In some embodiments, the network device further includes:

a communication unit, configured to: send a first scheduling signal to the terminal device, where the first scheduling signal includes transmission resource information for data transmission.

In some embodiments, the network device further includes:

a communication unit, configured to: broadcast a second scheduling signal, where the second scheduling signal includes transmission resource information for data transmission, where a transmission resource indicated by the second scheduling information is only used for data transmission by the terminal device that sends the fifth indication information.

In some embodiments, the second type of indication information includes sixth indication information, where the sixth indication information is used to indicate that the terminal device performs data transmission on an available time domain resource successfully and there is to-be-transmitted data.

In some embodiments, the network device 500 further includes:

a communication unit, configured to: receive, on a second time domain resource, a third information set sent from the terminal device, where the third information set includes fourth data information and the sixth indication information, where the sixth indication information follows the fourth data information, and the fourth data information includes a part of to-be-transmitted data;

send a fourth scheduling signal to the terminal device according to the sixth indication information, where the fourth scheduling signal is used to indicate a third time domain resource; and receive, on the third time domain resource, a fourth information set sent from the terminal device, where the fourth information set includes remaining to-be-transmitted data.

In some embodiments, the sixth indication information includes a sixth sequence.

In some embodiments, the terminal device obtains energy for communication through energy harvesting.

Optionally, in some embodiments, the above communication unit may be a communication interface or a transceiver, or an input/output interface of a communication chip or a system on chip. The above processing unit may be one or more processors.

It should be understood that the network device 500 according to the embodiments of the present application may correspond to the network device of the method embodiments of the present application, and the above and other operations and/or functions of various units in the network device 500 are respectively to implement the corresponding procedure of the network device in the method shown in FIG. 37, which will not be repeated herein for the sake of brevity.

Figure 40:
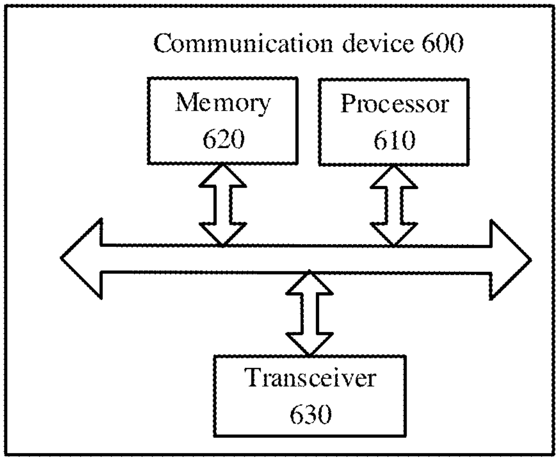
FIG. 40 is a schematic block diagram of a communication device provided according to the embodiments of the present application.

FIG. 40 is a schematic structural diagram of a communication device 600 provided in the embodiments of the present application. The communication device 600 shown in FIG. 40 includes a processor 610. The processor 610 may call and run a computer program from a memory to implement the methods in the embodiments of the present application.

Optionally, as shown in FIG. 40, the communication device 600 may further include a memory 620. The processor 610 can call and run a computer program from the memory 620 to implement the methods in the embodiments of the present application.

The memory 620 may be a separate device independent of the processor 610, or may be integrated into the processor 610.

Optionally, as shown in FIG. 39, the communication device 600 may further include a transceiver 630. The processor 610 can control the transceiver 630 to communicate with other devices, for example, to transmit information or data to other devices or to receive information or data transmitted by other devices.

The transceiver 630 may include a transmitter and a receiver. The transceiver 630 may further include an antenna, where one or more antennas can be provided.

Optionally, the communication device 600 may be a network device of an embodiment of the present application, and the communication device 600 may implement corresponding processes implemented by the network device in each method of the embodiment of the present application, which will not be described in detail here for the sake of brevity.

Optionally, the communication device 600 may be the mobile terminal/terminal device of the embodiments of the present application, and the communication device 600 may implement the corresponding processes implemented by the mobile terminal/terminal device and in the various methods of the embodiments of the present application, which will not be repeated herein for the sake of brevity.

Figure 41:
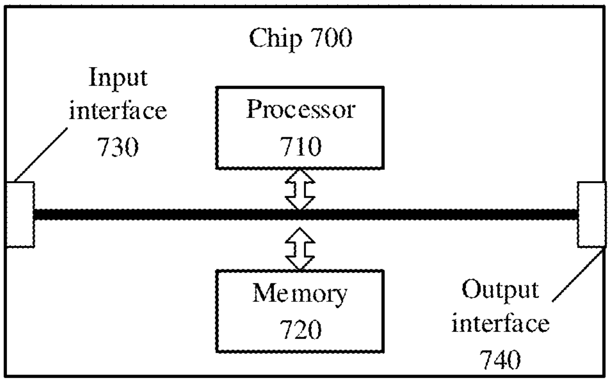
FIG. 41 is a schematic block diagram of a chip provided according to the embodiments of the present application.

FIG. 41 is a schematic structural diagram of a chip of the embodiments of the present application. The chip 700 shown in FIG. 41 includes a processor 710, which may call and run a computer program from a memory to implement the methods in the embodiments of the present application.

Optionally, as shown in FIG. 41, the chip 700 may further includes a memory 720. The processor 710 may call and run the computer program from the memory 720 to implement the methods in the embodiments of the present application.

The memory 720 may be a separate device independent of the processor 710, or may be integrated into the processor 710.

Optionally, the chip 700 may further include an input interface 730. The processor 710 can control the input interface 730 to communicate with other devices or chips, for example, to acquire information or data transmitted by other devices or chips.

Optionally, the chip 700 may further include an output interface 740. The processor 710 can control the output interface 740 to communicate with other devices or chips, for example, to output information or data to other devices or chips.

Optionally, the chip can be applied to the network device in the embodiments of the present application, and the chip can implement the corresponding processes implemented by the network device in the various methods of the embodiments of the present application. For the sake of brevity, the details will not be repeated herein.

Optionally, the chip may be applied to the mobile terminal/terminal device in the embodiments of the present application, and the chip may implement the corresponding processes implemented by the mobile terminal/terminal device and in the various methods of the embodiments of the present application, which will not be repeated herein for the sake of brevity.

It should be understood that the chips mentioned in the embodiments of this application can also be called system-level chip, system chip, chip system or system-on-chip chip.

Figure 42:
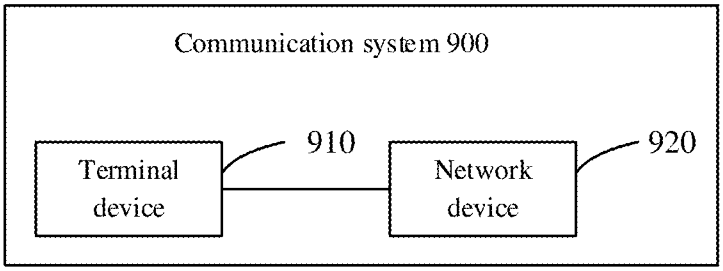
FIG. 42 is a schematic block diagram of a communication system provided according to the embodiments of the present application.

FIG. 42 is a schematic block diagram of a communication system 900 provided in embodiments of the present application. As shown in FIG. 42, the communication system 900 includes a terminal device 910 and a network device 920.

Herein, the terminal device 910 may be used to implement the corresponding functions implemented by the terminal device in the above method, and the network device 920 may be used to implement the corresponding functions implemented by the network device in the above method, which will not be repeated herein for the sake of brevity.

It should be understood that, the processor in the embodiments of the present application may be an integrated circuit chip and have a processing capability of signals. In the process of implementation, each step of the above-mentioned method embodiments can be implemented by an integrated logic circuit of hardware in a processor or an instruction in software form. The above-mentioned processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a discrete gate or a transistor logic device, a discrete hardware component. The disclosed methods, steps, and logical block diagrams in the embodiments of the present application can be implemented or executed. The general-purpose processor may be a microprocessor or any conventional processor. The steps of the method disclosed in combination with the embodiments of the present application may be directly embodied as being performed and completed by a hardware decoding processor, or by using a combination of hardware and software modules in the decoding processor. The software module may be located in the mature storage medium in the art such as a random memory, a flash memory, a read-only memory, a programmable read-only memory or an electrically erasable programmable memory, a register, etc. The storage medium is located in the memory, and the processor reads information in the memory and completes the steps in the above-mentioned methods in combination with its hardware.

It can be understood that the memory in the embodiments of the present application may be a volatile memory or a non-volatile memory, or may include both volatile and non-volatile memories. Herein, the non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (Random Access Memory, RAM), which is used as an external cache. By way of illustration, but not limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct rambus random access memory (Direct Rambus RAM, DR RAM). It should be noted that the memories of the systems and methods described herein is intended to include, but is not limited to, these and any other suitable types of memories.

It should be understood that the above-mentioned memory is an exemplary but not restrictive description. For example, the memory in the embodiments of this application can also be static random access memory (static RAM, SRAM), dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM), direct rambus random access memory (Direct Rambus RAM, DR RAM) etc. In other words, the memory in the embodiments of this application is intended to include, but is not limited to, these and any other suitable types of memories.

Embodiments of the present application provide a readable and writable storage medium for computer storage.

Optionally, the non-transitory computer readable storage medium may be applied to the network device in the embodiments of the present application, and the computer program causes a computer to perform the corresponding processes implemented by the network device and in the various methods of the embodiments of the present application, which will not be repeated herein for the sake of brevity.

Optionally, the non-transitory computer readable storage medium may be applied to the mobile terminal/terminal device in the embodiments of the present application, and the computer program causes a computer to perform the corresponding processes implemented by the mobile terminal/terminal device and in various methods of the embodiments of the present application, which will not be repeated herein for the sake of brevity.

The embodiments of the present application further provide a computer program product including computer program instructions.

Optionally, the computer program product may be applied to the network device in the embodiments of the present application, and the computer program instructions cause a computer to perform the corresponding processes implemented by the network device and in the various methods of the embodiments of the present application, which will not be repeated herein for the sake of brevity.

Optionally, the computer program product may be applied to the mobile terminal/terminal device in the embodiments of the present application, and the computer program instructions cause a computer to perform the corresponding processes implemented by the mobile terminal/terminal device and in various methods of the embodiments of the present application, which will not be repeated herein for the sake of brevity.

The embodiments of the present application further provide a computer program.

Optionally, the computer program may be applied to the network device in the embodiments of the present application, the computer program when being executed on a computer, causes the computer to perform the corresponding processes implemented by the network device and in various methods of the embodiments of the present application, which will not be repeated herein for the sake of brevity.

Optionally, the computer program may be applied to the mobile terminal/terminal device in the embodiments of the present application, the computer program when being executed on a computer, causes the computer to perform the corresponding processes implemented by the mobile terminal/terminal device and in various methods of the embodiments of the present application, which will not be repeated herein for the sake of brevity.

Those skilled in the art may realize that the units and algorithm steps of each example described in the disclosed embodiments can be implemented through electronic hardware, or a combination of computer software and electronic hardware. Whether these functions are performed by way of hardware or software depends on an application and a design constraint of the technical solution. A skilled person may use different methods for each application, to implement the described functions, but such implementation should not be considered beyond the scope of the present application.

Those skilled in the art may clearly understand that, for convenience and simplicity of description, the working processes of the system, the apparatus and the unit described above may refer to the corresponding processes in the above method embodiments, which may not be described repeatedly herein.

In several embodiments provided by the present application, it should be understood that the disclosed system, apparatus and method may be implemented in other ways. For example, the apparatus embodiments described above are only illustrative. For example, the division of units is only a logical function division, and there may be other division methods for actual implementation. For example, multiple units or components can be combined or integrated into another system, or some features may be ignored or may not be executed. On the other hand, the coupling or direct coupling or communicative connection between each other as shown or discussed above may be an indirect coupling or a communicative connection via some interfaces, apparatuses or units, which may be electrical, mechanical, or in other forms.

The units described as separate components may be or may not be physically separated, and the components shown as units may be or may not be physical units, that is, they may be located in one place or distributed across multiple network units. A portion or all of the units may be selected according to actual needs to implement the purpose of the embodiments.

In addition, the functional units in the embodiments of the present application may be integrated into a single processing unit or the functional units may exist physically and separately, or two or more units may be integrated into one unit.

If the described functions are implemented in a form of a software functional unit and sold or used as an independent product, they may be stored in a non-transitory computer readable storage medium. Based on this understanding, the technical solution of the present application, or the portion that contributes to the existing technology or the portion of the technical solution, can be reflected in the form of a software product. The computer software product is stored in a storage medium, including several instructions to enable a computer device (which may be a personal computer, server, or network device, etc.) to perform all or a portion of the steps of the methods described in the various embodiments of the present application. And the above described storage medium includes: a USB flash disk, a mobile hard disk, a read-only memory (Read-Only Memory, ROM), a random access memory (Random Access Memory, RAM), a disk or a CD, and other medium that can store program code.

The foregoing descriptions are merely exemplary implementation manners of the preset application, but the protection scope of the preset application is not limited thereto; Any person skilled in the art could readily conceive of changes or replacements within the technical scope of the preset application, which shall all be included in the protection scope of the preset application. Therefore, the protection scope of the present application shall be subject to the protection scope of the claims.

What is claimed is:

1. A communication state indication method, comprising:

indicating, by a terminal device by whether to send target indication information and/or a content indicated by the target indication information, a communication state of the terminal device to a network device, wherein the terminal device communicates with the network device through backscattering;

wherein the target indication information comprises a first type of indication information, wherein the first type of indication information is used to indicate a data transmission state of the terminal device;

wherein the data transmission state of the terminal device comprises at least one of:

a start of data transmission, an end of data transmission, or data transmission abnormality:

wherein the first type of indication information comprises at least one of:

first indication information, used to indicate the terminal device to start data transmission;

second indication information, used to indicate the terminal device to end data transmission;

third indication information, used to indicate that data transmission abnormality is caused due to power fluctuation; or fourth indication information, used to indicate the data transmission abnormality is caused due to insufficient power;

wherein the method further comprises:

sending, by the terminal device, a target information set on a first time domain resource;

wherein the target information set comprises first data information and the first type of indication information, and the first data information comprises all of to-be-transmitted data; or, the target information set comprises second data information and the first type of indication information, and the second data information comprises a part of the to-be-transmitted data.

2. The method according to claim 1, wherein a starting position and a length of the first time domain resource are indicated by the network device; or the first time domain resource is preconfigured; or the starting position of the first time domain resource is indicated by the network device through a scheduling signal; or the first time domain resource is selected by the terminal device.

3. The method according to claim 1, wherein there is a first time interval between the first indication information and the first data information; and there is a second time interval between the first data information and the second indication information.

4. The method according to claim 1, wherein, a length of the second indication information is fixed; or a length of the second indication information is variable; and a length of the first indication information is fixed; or a length of the first indication information is variable.

5. The method according to claim 1, wherein in a case where the terminal device needs to indicate an ending position of data transmission through the second indication information, but the target information set does not comprise the second indication information, the data transmission abnormality is represented, or there is still data to be transmitted;

in a case where the terminal device needs to indicate a starting position of data transmission through the first indication information, and the target information set comprises a plurality pieces of first indication information, the data transmission abnormality is represented.

6. The method according to claim 1, wherein the target information set comprises the second data information and the third indication information, the second data information is sent by the terminal device in a case where a power fluctuates, and the third indication information is sent by the terminal device in a case where a power stabilizes;

wherein the target information set further comprises the first indication information, wherein the first indication information precedes the second data information.

7. The method according to claim 1, wherein in a case of insufficient power, the target information set comprises the second data information and the fourth indication information; or in a case of insufficient power, the target information set comprises the fourth indication information;

wherein there is a third time interval between the fourth indication information and the second data information.

8. The method according to claim 6, wherein the method further comprises:

in a case where there is data transmission abnormality on the terminal device, indicating a data transmission abnormality state of the terminal device by using the third indication information or the fourth indication information according to an energy harvesting capability of the terminal device;

wherein the indicating the data transmission abnormality state by using the third indication information or the fourth indication information according to the energy harvesting capability of the terminal device comprises:

in a case where the terminal device has a first energy harvesting capability, indicating the data transmission abnormality by using the third indication information, or in a case where the terminal device has a second energy harvesting capability, indicating the data transmission abnormality by using the fourth indication information, wherein the first energy harvesting capability is higher than the second energy harvesting capability.

9. The method according to claim 1, wherein the target indication information comprises a second type of indication information, wherein the second type of indication information is used to indicate a data transmission requirement state of the terminal device.

10. The method according to claim 9, wherein the second type of indication information comprises fifth indication information, wherein the fifth indication information is used to indicate that the terminal device has a data transmission requirement;

wherein the fifth indication information is sent by the terminal device in a case where an energy harvesting is completed.

11. The method according to claim 10, wherein the terminal device monitors scheduling information of the network device in a first duration after an energy harvesting is completed, and in a case where the scheduling information of the network device is not monitored and data transmission is required, the terminal device sends the fifth indication information to the network device;

wherein the method further comprises:

after sending the fifth indication information, sending, by the terminal device, third data information to the network device, wherein the third data information comprises an identifier of the terminal device;

wherein there is a fourth time interval between the fifth indication information and the third data information, the fifth indication information is further used to indicate identification information of the terminal device;

wherein the fifth indication information comprises a fifth sequence, wherein the fifth sequence is generated according to a cell identifier to which the terminal device belongs and/or an identifier of the terminal device.

12. The method according to claim 11, wherein the method further comprises:

receiving, by the terminal device, a first scheduling signal sent from the network device to the terminal device, wherein the first scheduling signal comprises transmission resource information for data transmission.

13. A communication state indication method, comprising:

determining, by a network device, a communication state of a terminal device according to whether target indication information of the terminal device and/or a content indicated by the target indication information is received, wherein the terminal device communicates with the network device through backscattering;

wherein the target indication information comprises a first type of indication information, wherein the first type of indication information is used to indicate a data transmission state of the terminal device;

wherein the data transmission state of the terminal device comprises at least one of:

a start of data transmission, an end of data transmission, or data transmission abnormality:

wherein the first type of indication information comprises at least one of:

first indication information, used to indicate the terminal device to start data transmission;

second indication information, used to indicate the terminal device to end data transmission;

third indication information, used to indicate that data transmission abnormality is caused due to power fluctuation; or fourth indication information, used to indicate the data transmission abnormality is caused due to insufficient power;

wherein the method further comprises:

receiving, by the network device, a target information set on a first time domain resource;

wherein the target information set comprises first data information and the first type of indication information, and the first data information comprises all of to-be-transmitted data; or, the target information set comprises second data information and the first type of indication information, and the second data information comprises a part of the to-be-transmitted data.

14. A terminal device, comprising: a processor and a memory, wherein the memory is configured to store a computer program, the processor is configured to call and run the computer program stored in the memory to perform:

indicating, by whether to send target indication information and/or a content indicated by the target indication information, a communication state of the terminal device to a network device, wherein the terminal device communicates with the network device through backscattering;

wherein the target indication information comprises a first type of indication information, wherein the first type of indication information is used to indicate a data transmission state of the terminal device;

wherein the data transmission state of the terminal device comprises at least one of:

a start of data transmission, an end of data transmission, or data transmission abnormality;

wherein the first type of indication information comprises at least one of:

first indication information, used to indicate the terminal device to start data transmission;

second indication information, used to indicate the terminal device to end data transmission;

third indication information, used to indicate that data transmission abnormality is caused due to power fluctuation; or fourth indication information, used to indicate the data transmission abnormality is caused due to insufficient power;

wherein the processor is configured to call and run the computer program stored in the memory to further perform:

sending a target information set on a first time domain resource;

wherein the target information set comprises first data information and the first type of indication information, and the first data information comprises all of to-be-transmitted data; or, the target information set comprises second data information and the first type of indication information, and the second data information comprises a part of the to-be-transmitted data.

15. A network device, comprising: a processor and a memory, wherein the memory is configured to store a computer program, the processor is configured to call and run the computer program stored in the memory to perform the method according to claim 13.

16. The method according to claim 1, wherein in a case where the target information set comprises the first data information, the target information set further comprises padding data information;

wherein the padding data information comprises at least one of:

at least one zero, check data, and a part of the to-be-transmitted data.

17. The method according to claim 16, wherein the target information set comprises the first indication information and the first data information, wherein the first indication information precedes the first data information; or the target information set comprises the first indication information, the first data information and the padding data information, wherein the first indication information precedes the first data information and the padding data information follows the first data information; or the target information set comprises the first data information and the second indication information, wherein the first data information precedes the second indication information; or the target information set comprises the first indication information, the first data information, and the second indication information, wherein the first indication information precedes the first data information, and the second indication information follows the first data information.

18. The method according to claim 13, wherein in a case where the target information set comprises the first data information, the target information set further comprises padding data information;

wherein the padding data information comprises at least one of:

at least one zero, check data, and a part of the to-be-transmitted data.

19. The method according to claim 18, wherein the target information set comprises the first indication information and the first data information, wherein the first indication information precedes the first data information; or the target information set comprises the first indication information, the first data information and the padding data information, wherein the first indication information precedes the first data information and the padding data information follows the first data information; or the target information set comprises the first data information and the second indication information, wherein the first data information precedes the second indication information; or the target information set comprises the first indication information, the first data information, and the second indication information, wherein the first indication information precedes the first data information, and the second indication information follows the first data information.

20. The method according to claim 13, wherein a starting position and a length of the first time domain resource are indicated by the network device; or the first time domain resource is preconfigured; or the starting position of the first time domain resource is indicated by the network device through a scheduling signal; or the first time domain resource is selected by the terminal device.

* * * * *